United States Patent [19]

Armstrong et al.

[11] 4,283,500
[45] Aug. 11, 1981

[54] POLYMER/POLYISOCYANATES

[75] Inventors: George H. Armstrong; Richard M. Gerkin, both of Charleston; Frank E. Critchfield, South Charleston, all of W. Va.

[73] Assignee: Union Carbide Corporation, New York, N.Y.

[21] Appl. No.: 135,397

[22] Filed: Mar. 31, 1980

[51] Int. Cl.³ .............................................. C08G 18/14
[52] U.S. Cl. .................................. 521/137; 260/32.4; 260/32.6 N; 525/123; 525/127; 525/129; 525/455; 526/341; 526/342; 528/75
[58] Field of Search ........................ 260/32.4, 32.6 N; 525/455, 127, 129, 123; 526/341, 342; 528/75; 521/137

[56] References Cited

U.S. PATENT DOCUMENTS

| | | | |
|---|---|---|---|
| 2,609,349 | 9/1952 | Cass | 260/23 |
| 3,383,351 | 5/1968 | Stamberger | 260/33.2 |
| 3,422,165 | 1/1969 | Brotherton et al. | 260/30.8 |
| 3,431,227 | 3/1969 | Kastning et al. | 260/29.7 |
| 3,509,234 | 4/1970 | Barlant et al. | 204/159.15 |
| 3,654,106 | 4/1972 | Wagner et al. | 204/159.23 |
| 3,684,758 | 8/1972 | Honig et al. | 260/29.6 NR |
| 3,689,310 | 9/1972 | Johnson et al. | 525/440 |
| 3,700,752 | 10/1972 | Hutchinson | 260/37 N |
| 3,701,679 | 10/1972 | Johnson et al. | 525/404 |
| 3,705,164 | 12/1972 | Honig et al. | 260/29.6 NR |
| 3,716,505 | 2/1973 | Ohe et al. | 260/17 A |
| 3,859,381 | 1/1975 | Hutchinson | 260/37 N |
| 3,868,431 | 2/1975 | Hutchinson | 260/37 N |
| 3,968,089 | 7/1976 | Cascurida et al. | 525/440 |
| 4,064,194 | 12/1977 | Evans et al. | 427/385 R |
| 4,085,165 | 4/1978 | Odaka et al. | 525/440 |
| 4,122,049 | 10/1978 | Wagner | 521/136 |

FOREIGN PATENT DOCUMENTS

| | | |
|---|---|---|
| 50-149795 | 12/1975 | Japan . |
| 1239701 | 7/1971 | United Kingdom . |
| 1409281 | 10/1973 | United Kingdom . |
| 1409282 | 10/1973 | United Kingdom . |
| 1447273 | 8/1976 | United Kingdom . |
| 1447274 | 8/1976 | United Kingdom . |

*Primary Examiner*—Maurice J. Welsh
*Attorney, Agent, or Firm*—Eugene C. Trautlein; Gerald L. Coon; Richard J. Gallagher

[57] ABSTRACT

Novel improved polymer/polyisocyanate composition made by polymerizing acrylonitrile alone or with one or more ethylenically unsaturated monomers in situ in a polyisocyanate. The polyisocyanate comprises a diarylalkylene diisocyanate; a polymeric diarylalkylene polyisocyanate; a quasi-prepolymer of a diarylalkylene diisocyanate or a polymeric diarylalkylene diisocyanate with an active hydrogen organic compound having at least two active hydrogen atoms per molecule; a mixture of a diarylalkylene diisocyanate, its carbodiimide and its trifunctional trimeric cycloadduct; or a mixture of two or more such polyisocyanates, to form a highly stable dispersion of small polymer particles in said polyisocyante. The novel compositions are highly useful in the production of polyurethane products.

47 Claims, No Drawings

POLYMER/POLYISOCYANATES

BACKGROUND OF THE INVENTION

1. Field of the Invention

This invention relates to novel polymer/polyisocyanate compositions that are reactive with active hydrogen organic compounds having two or more active hydrogen containing atoms per molecule to produce polyurethane products. The invention also relates to novel methods for making such compositions and to methods for making polyurethane products therefrom.

2. Description of the Prior Art

Compositions containing polymers of ethylenically unsaturated monomers in polyisocyanates are described in U.S. and foreign patents and patent publications. Such prior art compositions have found little, if any, use commercially because of any one of many difficulties notably instability, excessive particle size, or the inability when reacted with active hydrogen-containing compounds to provide improved properties, e.g., high modulus to the resulting polyurethanes in those cases where the polymers were dissolved in or reacted with the polyisocyanate. In those instances where dispersions of polymer in polyisocyanate did result the dispersions were relatively unstable and lacked sufficient usefulness in most modern techniques of polyurethane manufacture.

Polymer/polyol dispersions have been and currently are being used in the production of polyurethane products by mixing with polyisocyanates and other polyurethane-forming reagents and reacted to form the polyurethane product and serve as a convenient, efficient and economical means for improving resultant polyurethane properties. This procedure and the resulting polymer/polyol dispersions have been widely accepted by the polyurethane industry and continue to be extensively used throughout the industry.

As mentioned above prior attempts have been made to make polymer dispersions in polyisocyanates and to use such dispersions in the manufacture of polyurethanes by reaction with active hydrogen compounds. It is believed that these attempts have met with little or no commercial success for a variety of reasons. When dispersions were obtained pursuant to the prior art teachings they lacked adequate stability to be commercially feasible. The development of more sophisticated, higher speed and larger volume equipment, machines and systems for handling, mixing and reacting the polyurethane-forming ingredients have created the need for improvement in polymer/polyisocyanate, polymer/polyol and other dispersions used. The need for more stable dispersions has developed so that they can be stored until used without undergoing any significant settling or separation. Another criterion imposed by sophisticated equipment is the need for small particle sizes because large particles tend to damage the pumps employed in such equipment.

At one time there was not much concern for the seediness, viscosity or filterability of the polyurethane-forming reactants, i.e., the polymer/polyol and other dispersions in actual commercial practice. However, the state of the art of polyurethane production now has advanced to the point where these considerations are very important. There is now much concern with filterability, seediness, and viscosity because of the more sophisticated machine systems now in use for large volume production. Also, the prior art dispersions could not be made in highly stable condition with the relatively low molecular weight polyisocyanates, thus rendering the lower molecular weight materials less desirable than the higher molecular weight materials as a component of the dispersions. The lower molecular weight materials, however, are of value in those instances where low viscosity is essential and for foams, coatings, adhesives and some types of sealants.

The present invention provides highly stable and highly filterable polymer/polyisocyanate compositions which are low in, or substantially free of, seediness. It provides better dispersion stability than can be obtained by earlier procedures and/or eliminates or minimizes the expenses and hazards or difficulties accompanying some of the earlier techniques. The present invention also provides means for providing highly stable or reasonably stable polymer/polyisocyanate compositions having high polymer contents by using relatively small amounts of monomers copolymerizable with the acrylonitrile forming the polymer of said compositions and the production of polyurethanes containing higher amounts of polymer particles, e.g., when polymer/polyols are also used. It also permits a wider selection of polyisocyanates and polymer contents to be used in the manufacture of stable polymer/polyisocyanate compositions. It also permits the use of polyisocyanates of lower viscosities and higher polymer contents in the dispersion without impairing stability. These and other advantages are obtained by employing acrylonitrile as the sole ethylenically unsaturated monomer or, preferably, with small amounts of other ethylenically unsaturated monomers copolymerizable therewith to form a polymer in situ in a polyisocyanate, which, in the case of acrylonitrile homopolymers, consists essentially of a diarylalkylene diisocyanate, e.g., diphenylmethylene diisocyanate, in the presence of, or absence of its corresponding carbodiimide which is capable of forming a trifunctional cycloadduct therewith and other polyisocyanates based on diarylalkylene diisocyanate.

Nowhere in the prior art currently known to us is there any disclosure or suggestion of the discovery of the advantages of the present invention in the use of acrylonitrile without, or preferably with monomers copolymerizable therewith, to form dispersed polymer particles in situ in a polyisocyanate component consisting essentially of a diarylalkylene diisocyanate, ADI, or other polyisocyanates based on ADI.

British Pat. No. 1,447,273 discloses compositions of a polymer of an ethylenically unsaturated monomer, e.g., acrylonitrile, in an isocyanate. The compositions disclosed in the Examples of this patent lack stability and are not suitable for the production of good elastomers. In one instance (Example 9) a major amount of 4,4'-diphenylmethane diisocyanate (MDI) was used in the polyisocyanate component and a solid product was formed thus leading the skilled worker away from the use of increased amounts of MDI (compare with Example 8). Furthermore, British Pat. No. 1,447,274 by the same patentee acknowledges that the preparation of compositions according to the '273 British patent is not particularly successful when a crude isocyanate is used.

British Pat. No. 1,447,274 discloses the preparation of the polymers of one or more ethylenically unsaturated monomers in an inert solvent, adding the polyisocyanate to the resulting polymer solution and distilling off the solvent to form a dispersion of polymer in the polyisocyanate which in one Example (Example 2) Solidifed on standing.

Japanese Patent Publication No. JA 50,149,795 discloses polymer-containing polyisocyanates made by heating certain vinyl monomers and a free radical catalyst in diphenylmethane diisocyanate. Japanese Patent Publication No. J 54/050,091 discloses urethane-polymer emulsions or dispersions essentially free of isocyanate groups suitable for making paints made by polymerizing vinyl monomers in a toluene-diluted polyurethane. There is no disclosure of forming a dispersion of an acrylonitrile polymer or copolymer in a polyisocyanate. No working Example in these publications utilizes acrylonitrile.

U.S. Pat. No. 3,654,106 discloses the formation of vinyl polymers grafted onto polyisocyanates to form telomers which are dissolved in the polyisocyanate when an excess of polyisocyanate is used.

U.S. Pat. No. 3,968,089 discloses the polymerization of ethylenically unsaturated monomers in a polyol-polyisocyanate prepolymer. Published West German patent application 2,609,355, published Aug. 9, 1977 (Derwent 65225Y/37 DT 2609355) has a similar disclosure.

U.S. Pat. No. 4,122,049 discloses the formation of sedimenting dispersions of aminoplasts in polyisocyanates by reacting a carbonyl compound, such as formaldehyde, with a nitrogen compound, such as urea, in situ in a polyisocyanate. The dispersions produced by the teachings of this patent are sedimenting which is the opposite of the stable dispersions of this invention.

U.S. Pat. No. 3,422,165 discloses polymer/polyisocyanate complex compositions formed by polymerizing ethylenically unsaturated monomers such as acrylonitrile in polyisocyanates such as tolylene diisocyanate ans also discloses the production of polyurethanes from such complex compositions. While the subject matter of this patent broadly encompasses part of our invention, there is no specific disclosure relating to the production of stable dispersions of polyacrylonitrile (or copolymers or terpolymers of acrylonitrile and other ethylenically unsaturated monomers) in polyisocyanates consisting essentially of a diarylalkylene diisocyanate, or its polymeric form, in the presence or absence of its corresponding carbodiimide and its trifunctional trimeric cycloadduct, derivatives thereof or mixtures of any two or more such polyisocyanates or derivatives.

SUMMARY OF THE INVENTION

The present invention provides polymer/polyisocyanate compositions that are highly stable and highly filterable. These compositions, in addition to being highly stable, can be highly fluid and substantially free of scrap and seeds. The polymer particles of the compositions of this invention are small in size, in a preferred embodiment less than 30 microns in diameter. Polymer/polyisocyanate compositions can be made, according to this invention, with exceptionally low viscosities. They can also be made with relatively high polymer contents. Polymer/polyisocyanate compositions of this invention can be readily converted to polyurethane products of exceptional properties, including improved flexural modulii and improved indentation load deflections in the case of foams.

The above-mentioned deficiencies of the prior art can be overcome by this invention by the forming in situ of a polymer of acrylonitrile, or a copolymer of acrylonitrile and an ethylenically unsaturated monomer copolymerizable therewith, in a polyisocyanate which, in the case of acrylonitrile homopolymers, and as a preference in the case of the acrylonitrile copolymer, consists essentially of (1) a diarylalkylene diisocyanate, preferably diphenylmethylene diisocyanate; (2) polymeric forms thereof having the formula:

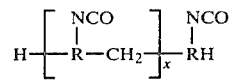

in which R is a trivalent aromatic group and x is a number having an average value of 1 to 5, preferably, polymeric diphenylmethylene diisocyanate having the formula:

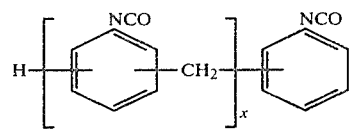

in which x is as defined above; (3) quasi-prepolymers of said diarylalkylene diisocyanate, preferably diphenylmethylene diisocyanate, or said polymeric forms thereof with active hydrogen organic compounds having two or more active hydrogen atoms per molecule; (4) mixtures of a diarylalkylene diisocyanate, preferably diphenylmethylene diisocyanate, a carbodiimide of the formula: OCNR'N=C=NR'NCO, preferably of the formula OCNR"N=C=NR"CO in which R" is a divalent —$C_6H_4CH_2C_6H_4$— group, and a diarylalkylene diisocyanate trifunctional trimeric cycloadduct of the formula:

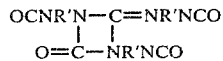

wherein R' is a divalent arylenealkylenearylene group, preferably having the formula:

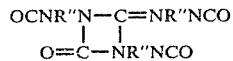

wherein R" is as defined above; or (5) mixtures of any two or more of polyisocyanates (1) through (4). These polyisocyanates are collectively referred to hereinafter as ADI, its polymers or derivatives. The copolymers of acrylonitrile with effective ethylenically unsaturated monomers, e.g., the ethylenically unsaturated copolymers of methyl methacrylate and allyl acrylate, provide highly stable, high quality dispersions of polymer particles (particles of the copolymer of acrylonitrile and said methyl methacrylate - allyl acrylate copolymer) when formed in situ in polyisocyanates containing up to eighty wt. percent of polyisocyanates other than those listed as (1) through (5) above, such as, toluene diisocyanate, and as little as 20 wt.% of the polyisocyanates (1) through (5). The polyisocyanates employed in making the compositions of this invention have an FNCO content of at least 10% and preferably at least 20%.

In its broad aspect, this invention achieves the above-mentioned advantages by providing stable liquid polymer/polyisocyanate compositions which are convertible by reaction with poly (active hydrogen) organic compounds to polyurethane products wherein the polymer/polyisocyanate composition is normally liquid at the temperature at which the composition is converted to the polyurethane product and the polymer of the polymer/polyisocyanate composition is formed in situ from one or more polymerizable ethylenically unsaturated monomers. (The term "monomer" is used herein in its broadest sense to include polymers and copolymers that contain one or more ethylenically unsaturated groups per molecule.) The polymer/polyisocyanate compositions of this invention are preferably liquid at 25° C. The invention, in its preferred form, provides stable dispersions of small particles of solid polymers in the polyisocyanate by the in situ polymerization of a mixture of monomers including acrylonitrile in the polyisocyanate which comprises preferably about 25 to about 100 wt. percent of one or more of the polyisocyanates (1) through (5) described above and about 0 to 75 wt. percent of another different polyisocyanate, e.g., toluene diisocyanate. Azo catalysts or peroxide catalysts can be used as described or required and catalysts that are safer and easier to use are preferably selected.

It has been found as a result of this invention that polyacrylonitrile (i.e. homopolymer), as well as copolymers of acrylonitrile possess such unique solubility characteristics in diphenylmethane diisocyanate, MDI, or polymers or derivatives thereof (i.e., the polyisocyanates (1) through (5) described above), as to result in an unexpectedly stable dispersion of polymer particles in the isocyanate. In contrast, dispersions of polyacrylonitrile homopolymer in toluene diisocyanate, i.e., TDI, have been found to be unstable and unsuitable for storage over relatively short periods of time because the polymer particles separate, move upwardly and form a hard crust or cake which cannot be redispersed by conventional procedures. This unfortunate phenomenon appears to be due to the solvency characteristics of polyacrylonitrile homopolymer in TDI which adversely affects the characteristics of the dispersions. The polymer/polyisocyanate compositions of this invention do not form a crust or cake over relatively short periods of time and, thus, possess unexpected stability which is believed to be due to the unique solubility characteristics of polyacrylonitrile homopolymer and copolymers in MDI and its polymers and derivatives.

It is known in the dispersion polymerization of vinyl monomers to form vinyl polymers that if the dispersion medium has too great a tendency to dissolve the polymer, a large amount of the polymer remains dissolved as it grows through polymerization until it reaches a large enough size to form an insoluble particle. As a consequence fewer but larger particles are formed which tend to agglomerate and separate more readily from the dispersion medium. This theory is capable of explaining the lack of stability of polyacrylonitrile in TDI but the considerably improved stability of polyacrylonitrile in MDI, or its polymers or derivatives.

This invention is further based on the discovery that the copolymerization of even small amounts of comonomers with acrylonitrile in situ in MDI, or its polymers or derivatives enhances even further the stability of the resulting polymer/polyisocyanate and permits the use of up to major amount of TDI in the polyisocyanate component. While the mechanism explaining this discovery is unclear, it has been found that the comonomers in an effective amount (1) improve the affinity of the polymer particles (resulting from the polymerization of acrylonitrile and comonomer) for the MDI (or its polymers or derivatives as defined herein), and (2) restrict the agglomeration of said polymer particles in the MDI, its polymers or derivatives, to provide dispersions which form films containing less than 10% seeds, the remaining area of the film being glossy, or 5% or less seeds, the remaining area of the film being semiglossy (percentages are on an area basis).

The invention, in addition, concerns the discovery that polymer/polyisocyanates of improved stability can be produced by copolymerizing acrylonitrile and an effective comonomer in a polyisocyanate medium containing major amounts of TDI, e.g., 70 wt.% or more TDI and the balance MDI, its polymers or derivatives as defeined herein.

The invention also relates to the process for making the above-mentioned polymer/polyisocyanate compositions and the process for making polyurethane products using same. Polymer/polyisocyanate compositions of this invention can be converted by reaction with poly(active hydrogen) organic compounds to high flex modulus polyurethane elastomers and high ILD polyurethane foams. In addition, the polymer component of compositions made pursuant to this invention also can function as a filler to add bulk to, decrease the FNCO content of and/or increase the viscosity of the polyisocyanate component thereof in those instances where it is desired to do so.

DESCRIPTION OF SPECIFIC EMBODIMENTS

The novel polymer/polyisocyanate compositions of this invention are generally liquid, stable dispersions of acrylonitrile-based polymers in amounts ranging from about 4 to about 45 wt.%, preferably about 15 to about 40 wt.%, in a polyisocyanate containing at least about 20 wt.%, preferably about 25 wt.% ADI, its polymers and/or derivatives, the percentages being based on the total weight of the polymer/polyisocyanate composition. Suitable ethylenically unsaturated comonomers for polymerization with acrylonitrile contain at least one ethylenically unsaturated group per molecule copolymerizable with acrylonitrile and are composed of carbon and hydrogen or of carbon, hydrogen and at least one of oxygen, halogen, nitrogen or sulfur to provide polymer dispersions in the polyisocyanate which form films containing less than 10% seeds, the remaining areas of of the film being glossy or shiny, or 5% or less seeds, the remaining areas of the film being semiglossy and include acrylamide, methacrylamide, acrylic acid, methacrylic acid, hydroxypropylmethacrylate, hydroxyethylacrylate, maleic anhydride monoesters of polyoxypropylene diol monoethers, allyl acrylate, divinyl benzene, methyl methacrylate—allyl acrylate copolymers, vinylidene chloride, dodecyl methacrylate, and the like. These comonomers can be further categorized as being molecules which contain, in addition to the ethylenically unsaturated group, another group which demonstrates an affinity for or compatibility with the polyisocyanate dispersing medium, e.g., an active hydrogen containing group, a group having surfactant effects such as the dodecyl group or the $>CCl_2$ group, or an additional ethylenically unsaturated group.

The comonomer is used in an amount effective for producing dispersions of improved stability and which form glossy films having less than 10% seeds, or semiglossy films having 5% or less seeds, on an area basis.

In most cases only a small amount of comonomer is needed to polymerize with acrylonitrile in the polyisocyanate medium to provide dispersions of improved stability. On the basis of the total weight of acrylonitrile and comonomer(s), as little as 1 wt.% of the comonomer(s) was found to be effective, for example. In the case of vinylidene chloride as a copolymer, as much as 90 wt.%, preferably 40 wt.% was found to be effective. In some instances, viz. hydroxyethyl acrylate as a comonomer, as little as 0.5 wt.% was found to be effective. Generally, representative ratios of acrylonitrile and some of the comonomers employed to produce polymer/polyisocyanate compositions pursuant to this invention are set forth as follows on a wt. basis:

| | |
|---|---|
| 94–99% | acrylonitrile |
| 6–1% | ethylenically unsaturated copolymer of 1 to 6 wt. % allyl acrylate and 99 to 94 wt. % methyl methacrylate |
| 89–97% | acrylonitrile |
| 8–2% | acrylamide |
| 3–1% | acrylic acid |
| 60–90% | acrylonitrile |
| 40–10% | vinylidene chloride |
| 80–99% | acrylonitrile |
| 20–1% | acrylamide |
| 85–99.5% | acrylonitrile |
| 15–0.5% | acrylic acid |
| 90–99% | acrylonitrile |
| 10–1% | methacrylic acid |
| 90–99% | acrylonitrile |
| 10–1% | divinyl benzene |
| 98–99.5% | acrylonitrile |
| 2–0.5% | hydroxyethyl acrylate |
| 97–99% | acrylonitrile |
| 3–1% | hydroxypropyl acrylate |
| 95–99% | acrylonitrile |
| 5–1% | dodecyl methacrylate |
| 90–97% | acrylonitrile |
| 7–2% | acrylamide |
| 3–1% | hydroxypropyl methacrylate |
| 91–97.5% | acrylonitrile |
| 7–2% | acrylamide |
| 2–0.5% | hydroxyethyl acrylate |
| 90–99% | (preferred) acrylonitrile |
| 10–1% | (preferred) acrylamide |
| 94–97% | (more preferred) acrylonitrile |
| 6–3% | (more preferred) acrylamide |
| 94–99.5% | (preferred) acrylonitrile |
| 6–0.5% | (preferred) acrylic or methacrylic acid |
| 96–98% | (more preferred) acyrlonitrile |
| 4–2% | (more preferred) acrylic or methacrylic acid |

Any of the known polymerizable comonomers that are effective can be used and the comonomers listed above are illustrative and not restrictive of the comonomers suitable for use in this invention. Any of the known chain transfer agents can be used, if desired.

Catalysts useful in producing the polymer/polyisocyanate compositions of this invention are the free radical type of vinyl polymerization catalysts such as the peroxides, persulfates, perborates, percarbonates and the azo compounds or any other suitable free radical catalyst specified in the abovementioned patents and application. Illustrative of a few such catalysts re 2,2'-azo-bis-isobutyronitrile, 2,2'-azo-bis (2,4-dimethyl-valeronitrile), dibenzoyl peroxide, lauroyl peroxide, di-t-butyl peroxide, diisopropyl peroxydicarbonate, t-butyl peroxy-2-ethylhexanoate, t-butylperpivalate, 2,5-dimethylhexane-2,5-di-per-2-ethyl hexoate, t-butylperneodecanoate, t-butylperbenzoate, t-butylpercrotonate, t-butyl perisobutyrate, di-t-butyl perphthalate and the like. Azo bis (isobutyronitrile) is the preferred catalyst since it does not impart any objectionable product odor or require special handling in the plant because of possible hazards.

The catalyst concentration is not critical and can be varied within wide limits. As a representative range in forming the polymer/polyisocyanate compositions, the concentration can vary from about 0.1 to about 5.0 weight percent, based upon the total feed (polyisocyanate, acrylonitrile and comonomer) to the reactor. Up to a certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

The temperature range used in producing preformed polymer isocyanate and the final polymer/isocyanate composition is not narrowly critical and may vary from about 50° C. or less to about 130° C. or perhaps greater, the preferred range being from 70° C. to 105° C. The catalyst and temperature should be selected so that the catalyst has a reasonable rate of decomposition with respect to the hold-up time in the reactor for a continuous flow reactor or the feed time for a semi-batch reactor.

The preferred process used in producing the polymer/polyisocyanate compositions of this invention involves polymerizing the monomer(s) (e.g., acrylonitrile, with or without one or more comonomer(s)) in the polyisocyanate while maintaining a low monomer to polyisocyanate ratio throughout the reaction mixture during the polymerization. This provides in the preferred case polymer/polyisocyanate compositions in which essentially all of the polymer particles have diameters of less than 30 microns and generally less than one micron. Such low ratios are achieved by employing process conditions that provide rapid conversion of monomer to polymer. In practice, a low monomer to polyisocyanate ratio is maintained, in the case of semi-batch and continuous operation, by control of the temperature and mixing conditions and, in the case of semi-batch operation, also by slowly adding the monomers to the polyisocyanate. The process can be carried out in various manners such as by a semi-batch reactor, a continuous back-mixed stirred tank reactor, etc. For the latter, a second stage may be used to incrementally increase the conversions of monomers. The mixing conditions employed are those attained using a back-mixed reactor (e.g., a stirred flask or stirred autoclave). Such reactors keep the reaction mixture relatively homogeneous and so prevent localized high monomer to polyisocyanate ratios such as occur in certain tubular reactors (e.g., in the first stages of "Marco" reactors when such reactors are operated conventionally with all the monomer added to the first stage).

When using a semi-batch process, the feed times can be varied (as well as the proportion of polyisocyanate in the reactor at the start versus polyisocyanate fed with the monomer) to effect changes in the product viscosity. Generally, longer feed times result in higher product viscosities.

The preferred temperature used in producing the polymer/polyisocyanate compositions in accordance with this invention is any temperature at which the half life of the catalyst at that temperature is no longer than about 25 percent of the residence time of the reactants and catalyst in the reactor. As an illustration, the half life of the catalyst at a given reaction temperature may be no longer than six mixtures (preferably no longer than from 1.5 to 2 minutes) when the residence time is 24 minutes or greater. The half lives of the catalysts become shorter as the temperature is raised. By way of illustration, azo-bis-isobutyronitrile has a half life of 6 minutes at 100° C. and, thus, the residence time should be at least 24 minutes. The maximum temperature used is not narrowly critical but should be lower than the temperature at which significant decomposition of the reactants or discoloration of the product occurs.

In the process used to produce the polymer/polyisocyanate compositions of this invention, the monomers are polymerized in the polyisocyanate. Usually, the monomers are soluble in the polyisocyanate. When the monomers are not soluble in the polyisocyanates, known techniques (e.g., dissolution of the insoluble monomers in another solvent) may be used to disperse the monomers in the polyisocyanate prior to polymerization. The conversion of the monomers to polymers achieved by this process is remarkably high (e.g., conversions of at least 72% to 95% of the monomers are generally achieved).

The process of this invention produces polymer/polyisocyanate compositions which are highly stable, have small polymer particle sizes, are free from troublesome scrap and seeds, have good filterability and/or are convertible to highly useful polyurethane elastomers and foams. The viscosities (25° C.—Brookfield) of the polymer/polyisocyanate composition of this invention are less than 60,000 cps, preferably not greater than 30,000 cps, more preferably not greater than 20,000 cps and most preferably not greater than 5,000 cps. The polymer/polyisocyanate compositions of this invention are stable dispersions such that essentially all of the polymer particles remain suspended on standing over periods of several months without showing any significant settling.

The final polymer/polyisocyanate compositions of the present invention comprise dispersions in which the polymer particles (the same being either individual particles or agglomerates of individual particles) are relatively small in size and, in the preferred embodiment are all essentially less than 30 microns or even as small as 1 micron or less. Thus, in the preferred embodiment, essentially all of the product (viz. about 99 percent or more) will pass through the filter employed in the filtration test that will be described in conjunction with the Examples. This insures that the polymer/polyisocyanate products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50 percent of the product passes through the filter. Some applications may also find useful products in which only about 20 percent passes through. Accordingly, the polymer/polyisocyanates of the present invention contemplate products in which at least 20 percent pass through the filter, preferably at least 50 percent, and most preferably, essentially all.

The polymer concentration of the final polymer/polyisocyanate compositions of this invention can be adjusted by the addition of additional polyisocyanate to provide the polymer concentration suitable for the desired end use. In this manner, the polymer/polyisocyanate compositions can be produced at polymer concentrations of, for example, 20% and reduced to polymer concentrations as low as 4% by the addition of more polyisocyanate or, alternatively, the composition can be made directly with a polymer concentration of 4% by the method of this invention.

The present invention also provides novel polyurethane products made with the novel polymer/polyisocyanate compositions and novel methods for producing such products. The novel polyurethane products are prepared by reacting (a) a polymer/polyisocyanate composition of this invention, (b) a poly(active hydrogen) organic compound, and (c) a catalyst for the reaction of (a) and (b) to produce the polyurethane product, and, when a foam is being prepared, a blowing agent and usually a foam stabilizer. The reaction and foaming operations can be performed in any suitable manner, preferably by the one-shot technique, although the prepolymer technique can be used if desired.

The poly(active hydrogen) organic compound useful for reaction with the polymer/polyisocyanate compositions of this invention include any compatible organic compound containing two or more active hydrogen atoms per molecule. The poly(active hydrogen) compounds are well known to those skilled in the polyurethane art and include the polycarboxylic organic acids, polyamino compounds, and polyhydroxy compounds, e.g., polyhydroxy polyesters, organic polyols and the like.

Substantially any of the polyols previously used in the art to make polyurethanes can be used and are preferred as the poly(active hydrogen) organic compounds in this invention. Illustrative of the polyols useful in producing polyurethanes in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;

(b) Alkylene oxide adducts of non-reducing sugars and sugar derivatives;

(c) Alkylene oxide adducts of phosphorus and polyphosphorus acids;

(d) Alkylene oxide adducts of polyphenols;

(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenol) propanes, condensation products of various phenolic compounds and glyoxal, glutaraldehyde, and other dialdehydes, the simplest members of this class being the 1,1,2,2-tetrabis(hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyols employed can have hydroxyl numbers which vary over a wide range. In general, the hydroxyl numbers of the polyols employed in this invention can range from about 20, and lower, to about 1200, and higher. The hydroxyl number is defined as the number of milligrams of potassium hydroxide required for the complete hydrolysis of the fully phthalated derivative prepared from 1 gram of polyols. The hydroxyl number can also be defined by the equation:

$$OH = \frac{56.1 \times 1000 \times f}{m.w.}$$

where
 OH=hydroxyl number of the polyol
 f=functionality, that is, average number of hydroxyl groups per molecule of polyol
 m.w.=molecular weight of the polyol.

The exact polyol employed depends upon the end-use of the polyurethane product to be produced. The molecular weight of the hydroxyl number is selected properly to result in flexible or semiflexible polyurethane foams or elastomers. The polyols preferably possess a hydroxyl number of from about 50 to about 150 for semi-flexible foams, and from about 25 to about 70 for flexible foams. Such limits are not intended to be restrictive, but are merely illustrative of the large number of possible combinations of the above polyol coreactants.

The most preferred class of polyols employed in this invention are the ethylene oxide and propylene oxide adducts including ethylene glycol, diethylene glycol, the poly (oxyethylene) glycols, the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. Unsaturation in itself does not affect in any adverse way the formation of the polyurethanes in accordance with the present invention.

The catalysts that are useful in producing polyurethanes in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2.] octane, pyridine oxide and the like, (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicyclaldehyde, cyclopentanone-2-carboxylate, acetyl-acetoneimine, bis-acetylacetonealkylenediimines, salicyclaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

The organotin compounds deserve particular mention as catalysts for catalyzing the polyurethane-forming reactions. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts, or combinations of metal catalysts, may also be employed as the accelerating agents, without the use of amines. The catalysts for catalyzing the polyurethane-forming reaction are employed in small amounts, for example, from about 0.001 percent to about 5 percent, based on the combined weight of the polyisocyanate and the polyol.

As mentioned above, other additives can be used in the manufacture of the polyurethanes of this invention.

% or percent: percent by weight unless otherwise specified.
parts: parts by weight unless otherwise specified.
ratios: are on a weight basis unless otherwise specified.
temperatures: are given in °C. unless otherwise stated.
ppm: parts by weight per million parts by weight.
psig: pounds per square inch gauge pressure.
pli: pounds per linear inch.
monomer: ethylenically unsaturated monomer.
Residual monomers: unreacted monomers.
rpm: revolutions per minute.
TMSN: tetramethylsuccionitrile, a decomposition product of VAZO-64.
Cat: catalyst.
VAZO-64 or VAZO: 2,2'-azo-bis-isobutyronitrile.
VAZO-52: 2,2'-azo-bis(2,4-dimethylvaleronitrile)
TBPO: 50 wt-% t-butyl per-2-ethylhexoate in dioctyl phthalate
LU-11: t-butyl peroxypivalate.
Numbered Examples illustrate this invention.
Lettered Examples are comparative Examples which do not illustrate the invention or are Examples illustrating the preparation of precursors used in numbered Examples.
Runs illustrate attempts to carry out the invention which were not successful for one reason or another.
G-C: gas chromatographic analysis.
GPC: gel permeation chromatographic analysis.
hydroxyl number: calculated hydroxyl number based on total polymer content, if present, and polyol content.
FNCO: free NCO content in weight percent based on weight of the polyisocyanate.
ΔNCO: difference between FNCO calculated and FNCO measured.

Ethylenically unsaturated monomers used in the Examples are identified as follows:
A: acrylonitrile.
AM: acrylamide.
AA: acrylic acid.
MAA: methacrylic acid.
Al: allyl acrylate.
AlA: allyl amine.
DMA: dodecyl methacrylate.
HPMA: hydroxypropyl methacrylate.
HEA: hydroxyethyl acrylate.
DVB: divinylbenzene.
VCl₂: vinylidene chloride.
S: styrene.
MMA: methyl methacrylate.
MAM: methacrylamide.
MAN: methacrylonitrile.
MAME-I: maleic anhydride mono-ester formed by reacting a monohydroxyl polyoxypropylene having a molecular weight of about 2600 with maleic anhydride in equimolar amounts to form the mono-ester which has one ethylenic unsaturation and one carboxyl group per molecule.
MAME-II: maleic anhydride mono-ester similar to MAME-I wherein, however, the mono-hydroxy polyoxypropylene reactant had a molecular weight of 700.

The polyisocyanates used in the Examples are identified as follows:
FNCO: (free isocyanate content) is the weight percent of NCO in the polyisocyanate.
MDI: 4,4'-diphenylmethylene diisocyanate.
Liquid MDI: modified 4,4'-diphenylmethylene diisocyanate modified with carbodiimide linkages to liquefy same.
Polymeric MDI: polymeric diphenylmethylene diisocyanates having the formula

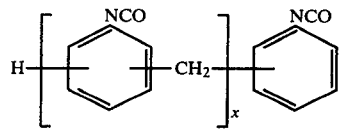

wherein x has an average value of 1 to 5.
TDI: a mixture of 80% 2,4-tolylene diisocyanate and 20% 2,6-tolylene diisocyanate.
I9: quasi-prepolymer of 22 wt.% of polyoxypropylene glycol having a theoretical number average molecular weight of about 400 and a hydroxyl number of 245 and 78 wt.% of I191.
I10: quasi-prepolymer of 12 wt.% tripropylene glycol and 88 wt.% of I191.
I11: Blend of 63.5 wt.% of a mixture of 80 wt.% TDI and 20 wt.% of the non-volatile residue from TDI production; 26.7 wt.% TDI; 7.8 wt.% of the reaction product of 30.2 wt.% of the above-mentioned mixture and 69.8 wt.% Polyol 1; and 2 wt.% of a silicone surfactant comprising a poly(dimethylsiloxane)-poly(oxyalkylene) block copolymer.
I158: blend of 80 pbw TDI and 20 pbw of a polymeric MDI having an equivalent weight of 133, a free NCO content of 31.5 wt.% and a Brookfield viscosity of 275 cps at 25° C.
I35: polymeric MDI having a calculated equivalent weight of about 135, an FNCO of about 31.5, a viscosity of 250 cps and sold as PAPI-135 by Upjohn.
I143L: liquid MDI having a calculated equivalent weight of 144 and an FNCO of 29.2 wt.% sold by Upjohn Company as Isonate 143L.
I181: a quasi-prepolymer of MDI and a low molecular weight glycol having a calculated equivalent weight of 181 and an FNCO of 23.2 wt.% sold by Upjohn as Isonate-181.
I191: a polymeric MDI having a calculated equivalent weight of about 140 and an FNCO of about 30 wt.% sold by Upjohn as Isonate-191.
I198D: an experimental polyisocyanate having a calculated equivalent weight of 148 and an FNCO of 28 wt.% and a viscosity of 36 cps (Brookfield-25° C.) supplied by Upjohn.
I901: polymeric MDI having a calculated equivalent weight of 140 and an FNCO of 30 wt.% sold by Upjohn as PAPI-901.

Polyols used in the Examples are identified as follows:
Polyol 1: Diol made from propylene glycol starter and 50 wt.% ethylene oxide and 50 wt.% propylene oxide and having a hydroxyl number of 38.
Polyol 2: A triol made from propylene and ethylene oxides and glycerine and having a theoretical number average molecular weight of about 4700 and a hydroxyl number of about 34. The alkylene oxide units are present primarily in blocks and the end units are substantially all ethylene oxide units, i.e., the ethylene oxide is used to cap the triol. Based on its total weight, the triol contains about 14 wt.% C₂H₄O.
Polyol 3: A 50/50 wt. blend of ethylene glycol and an adduct of about 2.4 moles ethylene oxide per mole of For example, other fillers, such as calcium carbonate can be added for the purpose of enhancing modulus or reducing cost. The amounts of fillers used can range from 0 to 250 pph (parts per hundred parts) of polymeric materials (e.g., poly (active hydrogen) compound and polymer/polyisocyanate). Additionally, mold release agents, such as zinc stearate, can be used in amounts ranging from 2 to 4 pph based on the combined weights of polymeric materials. Additionally, reinforcing agents, such as glass powder, tiny glass bubbles, and preferably glass fibers 1/32" to ¼" long can be added. The amount of reinforcing agents ranges from 0 to 70 wt.%, preferably about 5 to 70 wt.%, based on the combined weight of the three above-mentioned reactants. Thickeners such as MgO can also be used in amounts ranging from 0 to 2 pph based on the combined weight of the three above-mentioned reactants. Any other additives such as pigments conventionally employed in polyurethane technology can be added in conventional proportions. The pph's and weight percentages given above for the additives are merely representative and amounts of additives outside of these ranges can provide acceptable results.

The distinction between polyurethane foams and elastomers is not sharply defined because all foams and most elastomers contain a gas phase. The foams in general have densities of less than 10 pounds per cubic foot and elastomers, in general, have densities above that value. Microcellular elastomers intended for energy absorbing applications, e.g., as automotive bumpers, generally are made with densities of 10 to 40 pounds per cubic foot whereas microcellular elastomers intended for other applications, e.g., bumper rub strips, bumper guards, side moldings, appliques and the like where energy absorption is not the prime consideration generally are made with densities of 40 to 60 pounds per cubic foot. Solid, unfoamed polyurethanes usually have a density of about 72 pounds per cubic foot. The densities of the above-described polyurethanes can be increased by the addition of inert fillers such as glass fibers. Such inert fillers provide improved physical properties such as increased modulus. All of these compositions, i.e., foams, microcellular and solid, filled or unfilled, can be made by the present invention.

When the product being formed is microcellular or solid, an extender can also be added to improve the load bearing and modulus properties of the composition. Extenders are not normally used in the production of flexible foams, although they can be added, if desired. Suitable extenders include low molecular weight polyols including ethylene glycol, diethylene glycol, 1,4-butanediol and the aromatic glycols, reaction products of alkylene oxides with aromatic amines or alcohols having two active hydrogens. Suitable aromatic glycols are the reaction products of alkylene oxides with amino aryl compounds and dihydroxyaryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and phenol-aromatic amine-aldehyde resins which are made by the reaction of a phenol-aromatic amine-aldehyde resins which in turn are made by the reaction of a phenol such as phenol or substituted phenols having at least one unsubstituted reactive position on the aromatic nucleus, an aldehyde such as formaldehyde or other aliphatic aldehydes and an aromatic amine such as aniline or other aromatic amines having at least one or two amino hydrogens and no or one nitrogen-bonded alkyl group and at least one unsubstituted position ortho or para to the amino group.

When the product being formed is a polyurethane foam product, this may be accomplished by employing a small amount of a blowing agent, such as $CO_2$ produced by water included in the reaction mixture (for example, from about 0.1 to about 5 weight percent of water, based upon total weight of the total reaction mixture, i.e., poly(active hydrogen) compound, polymer/polyisocyanates, catalysts and other additives), or through the use of blowing agents which are vaporized by the exotherm of the reaction, or by a combination of the two methods. Illustrative blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating, such as N,N'-dimethyl-N,N'-dinitrosoterephthalmide, and the like. The quantity of blowing agent employed will vary with factors such as the density desired in the foamed product.

It is also within the scope of the invention to employ small amounts, e.g., about 0.01 percent to 5.0 percent by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. No. 3,505,377; U.S. patent application Ser. No. 888,067, filed Dec. 24, 1969, and British Patent Specification No. 1,220,471. These various polysiloxane-polyoxyalkylene block copolymers preferably contain from 5 to 50 weight percent of polysiloxane polymer with the remainder being polyoxyalkylene polymer.

Polyurethanes produced according to this invention are useful in the applications in which conventional polyurethanes are employed such as in the manufacture of arm rests, crash pads, mattresses, automobile bumpers and carpet underlays. The flex modulus of polyurethanes made with polymer/polyisocyanate compositions of this invention is improved in those instances where the polymer portion of said compositions has a glass transition temperature, $T_G$, of about 85° C. or more. When the polymer component has a $T_G$ of less than 85° C., polyurethane products having other useful properties are obtained. Changes in the $T_G$ can be brought about by changes in polymer composition.

The following Examples are presented. The following designations used in the Examples and elsewhere herein have the following meanings:
Calc: calculated.
cps: centipoise.
viscosity: viscosity in cps as determined at 25° C. on a
  Brookfield viscosimeter, unless otherwise indicated.
gm: grams.
ml: milliliter.
wt: weight.
hr: hour.
pbw: parts by weight.

aniline, the adduct having a theoretical number average molecular weight of about 198 and a hydroxyl number of about 565 and the blend having a theoretical number average molecular weight of about 95 and hydroxyl number of about 1180.

Polyol 4: a polymer/polyol containing about 21 wt.% of polyacrylonitrile polymerized in Polyol 2.

Polyol 5: A polymer/polyol containing about 22.35 wt.% polyacrylonitrile in Polyol 2.

Polyol 6: A 50/50 weight blend of ethylene glycol and an adduct of 2 moles of ethylene oxide and 1 mole of aniline.

Surfactants used in the Examples are identified as follows:

S1: a block copolymer of poly(dimethylxiloxane) having mono methyl ether poly(oxypropyleneoxyethylene) blocks bonded to the siloxane back bone and having a molecular weight of approximately 19,000.

S2: a material prepared in the manner described in Run jj.

S3: a material prepared as described in Run kk.

OA: oleic acid.

The properties of the products of the Examples and Runs were determined by the following tests:

Free monomer analysis

Samples were taken at the end of the reactions, before vacuum stripping, for determination of % unreacted monomer. The samples were diluted with methanol which reacted with the polyisocyanate and precipitated the polymer. The supernatent liquid was then analyzed by GC to determine the amount of unreacted monomer.

Free NCO:

The polymer/polyisocyanate sample was reacted with excess dibutylamine and back-titrated with standard HCl reagent to determine the amount of unreacted dibutylamine.

Glass Slide Film Appearance:

In this test a glass microscope slide was dipped in the sample being tested and was placed in a small jar which was purged with nitrogen. The jar was closed, the sample was allowed to drain from the glass slide and it was then inspected. A smooth, glossy or shiny film indicates good dispersion properties whereas a dull, grainy film indicates poor dispersion properties. Examples of poor films indicative of unacceptable products are those that (1) are granular or coarse in appearance and contain about 10% or more seeds, i.e., 10% or more of the area viewed are seeds and the remaining area can be described as grainy, flat or dull; (2) are grainy, flat, dull or coarse in appearance whether or not seeds are also present; (3) have a matte appearance, i.e., an appearance that is not shiny or glossy but is duller although not granular or coarse to the extent of (1) or (2), in other words, it is semi-glossy; (4) are shiny or glossy but contain 10% or more seeds; or (5) have a matte finish but about 8% or more seeds. Acceptable products produce films that (1) are shiny or glossy with no seeds or less than 10% seeds or (2) have a matte finish but no more than about 5% seeds. In the Examples, unacceptable glass slide film appearances are designated by the symbols "gr", i.e., grainy; "sd", i.e., seedy; and "gr/sd", i.e., grainy and seedy. Acceptable film appearances are designated by "sm/gl", i.e., smooth and glossy, "sm", i.e., smooth; "sm/sl/sd", i.e., smooth slightly seedy; "sl/gr", i.e., slightly grainy and "sl/sd", i.e., slightly seedy.

Visual Inspection

This test was conducted in most cases immediately following vacuum stripping. In some cases the test was also conducted after allowing the sample to stand for a period of two weeks or more and the results of these tests are identified in the Examples by the designations "Shelf Stability" and "Visual Inspection, Standing". The test involves observing the composition in a glass vessel (e.g., closed glass jar). The formation of two or more thick layers indicates an unstable material. However, the formation of a small, thin, top layer is not unusual and does not indicate instability since the small layer can be easily dispersed by light agitation and does not grow appreciably on standing; these acceptable conditions are designated in the Examples by "ok/sl", "ok/l", "good/sl" or "sl". A deep top layer indicates the separation of the polymer particles from the polyisocyanate dispersing medium and is designated in the Examples by the symbols "us" or "us/l". In an extreme case of instability the top layer solidifies with the passage of time to form a cake.

A clear product indicates that a solution rather than a dispersion was formed. A hazy or uniformly opaque product indicates a desirable dispersion. By tilting the glass vessel containing the product and then tilting back, a film of the product is formed on the walls. This film is observed for the characteristics, e.g., smoothness and glossiness which characterize a good quality dispersion or grains, seeds and/or lumps which characterize a poor quality product.

The rating "very good" means a low viscosity liquid dispersion having no layer formation; smooth, glossy film formation; no grains or graininess; no seeds; no lumps, low viscosity, and uniform opacity. The rating of "good" means not more than a small top layer or none at all, substantially uniform opacity, not more than a slight amount of graininess or seeds or lumps, in bulk or film form, and/or low to moderate viscosity, e.g., a creamy consistency. The ratings of "fair" and "ok" are essentially equivalent and mean no gross layering, seeds, graininess, lumps and/or extremely high viscosities. Fair or o.k. films are grainy or coarse. The rating of "poor" means any one of gross layering, large amounts of seeds or lumps, dull, grainy film formation, or extremely high viscosities. Semi-solids, irreversible gels, pastes or solutions, of course, are not usually desirable, although in some instances the liquid form can be obtained by warming the composition.

Centrifugible Solids

The polymer/polyisocyanate composition is centrifuged for about 24 hours at about 3000 rpm and 1470 radial centrifugal "g" force. At the end of this period, the tube is inverted and allowed to drain for four hours and any non-flowing cake in the bottom of the tube is weighed and expressed as a percentage of initial sample weights. If a hard cake was formed in the top layer after centrifuging and before draining, centrifugible solids were not calculated since there usually are none in such cases; however, the volume percent (heighth) of each layer was measured.

Filterability or Filtration

The preferred compositions of this invention are essentially free of polymer particles having diameters over 30 microns. A composition meets this criteria if over 99 wt.% of the composition passes successively through a 150-mesh screen and a 700-mesh screen in the following test. A 200 gram sample of the composition being tested is diluted with 400 grams of anhydrous dioxane (or polyisocyanate as specified) to reduce viscosity effects. The diluted sample is passed a through a 2.4 square inch 150-mesh screen and then through a 2.4 square inch 700-mesh screen. (The screens are cleaned, dried and weighed before the test.) Then the screens are washed with dioxane (or polyisocyanate as specified) to remove any polyisocyanate, dried and weighed. The difference between the final and initial screen weights corresponds to the amount of polymer that did not pass through the screens. The 150-mesh screen has a square mesh with average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazoo, Mi. The amounts which pass through are reported in percent, a percentage of 100% being preferred. Trace solids will generally always be present, but a value of 100% indicates that over 99 weight percent passes through the screen.

was added dropwise to the mixture in the flask over a period of three hours. Then the resulting mixture was stirred for an additional two hours (cook-out time). A small sample was removed after the cook-out period and was analyzed for free monomer by gas chromatographic, G-C, analysis. Thereafter, the product was vacuum stripped for 1 to 2 hours at 60° C. A small sample was then taken for electron microscope analysis and the remaining product was tested for the properties listed in Table 1 below and the measurements for such properties are listed in Table 1.

As shown in Table 1, the filterability of each of the Examples 1 through 8 was good to excellent. Also, each composition had a very good appearance and films of each composition were smooth, glossy and non-seedy. The electron microscope analysis showed that the polymer particles of each composition were smaller in size and more uniform in size than similar compositions under this invention as described hereinafter.

The results for Examples A and B were obtained by measuring the percent free NCO and filterability of the polyisocyanate I191.

TABLE 1

| | Example No. | | | | | | | | | |
|---|---|---|---|---|---|---|---|---|---|---|
| | 1 | 2 | 3 | 4 | 5 | 6 | 7 | 8 | A | B |
| Monomer Ratio A/AM/AA | 92/6/2 | 94/4/2 | 94/4/2 | 94/5/1 | 94/6/0 | 100/0/0 | 94/4/2 | 93/6/1 | | |
| Residual Acrylonitrile[1] | 1.94 | 1.9 | 1.77 | 1.99 | 2.29 | 1.72 | 2.05 | 2.14 | — | — |
| % Conversion A[2] | 90 | 90 | 91 | 90 | 88 | 92 | 90 | 89 | — | — |
| Total % Conversion[3] | 90 | 90 | 91 | 90 | 88 | 92 | 90 | 89 | — | — |
| % Polymer Content[3] | 19 | 19 | 19 | 19 | 19 | 20 | 19 | 19 | — | — |
| % Free NCO, Measured | 22.0 | 22.1 | 22.1 | 22.0 | 22.0 | 22.3 | 22.3 | 22.1 | — | — |
| % Free NCO, Calculated | 24.3 | 24.3 | 24.3 | 24.3 | 24.3 | 24.0 | 24.3 | 24.3 | 30 | 30 |
| Δ NCO | 2.3 | 2.1 | 2.3 | 2.3 | 2.4 | 2.0 | 2.0 | 2.2 | — | — |
| Polymer/Isocyanate Properties | | | | | | | | | | |
| Visual Inspection | Very good | → | → | → | → | → | → | → | → | → |
| Brookfield Viscosity at 25° C. | 2,550 | 2,650 | 1,300 | 3,800 | 20,000 | 7,600 | 4,400 | 2,100 | — | — |
| Filterability[4] | | | | | | | | | | |
| 150 Mesh | 100 | 100 | 100 | 100 | 100 | 100 | 100 | 100 | 100 | 100 |
| 325 Mesh | 100 | 100 | 100 | 100 | 100 | 5 | 75 | 47 | 100 | 100 |
| 700 Mesh | 28 | 23 | 7 | 82 | 42 | — | 10 | — | 58 | 15 |

[1] Residual A was determined by G-C analysis. Residual amounts of AM and AA were calculated to be in the same proportion as residual A.
[2] The % conversion of A was calculated based on the total weight of A used.
[3] The % conversion of all monomers and the polymer content were calculated based on the % conversion of A.
[4] Diluted with I191.

EXAMPLES 1 THROUGH 8

In Examples 1 through 8, polyisocyanate I191 was added to a two liter four neck reaction flask equipped with a stirrer, dropping funnel, water-cooled condenser stacked with a dry ice condenser and a nitrogen inlet and outlet. The flask was heated with a heating mantle equipped with a temperature controller. When the flask occasionally became overheated, it was cooled by a blast of dry air on the flask.

A monomer mixture was made up in each case from acrylonitrile, acrylamide and acrylic acid in the ratios shown in Table 1 below and VAZO catalyst was added to the monomer mixture. The total amount of monomers in the monomer mixture totaled 21% of the total weight of polyisocyanate and monomers used in each Example. The amount of catalyst used was 1 wt.% based on the total weight of polyisocyanate and monomers.

The polyisocyanate, I191, was added to the flask and heated to and held at a temperature of 90° C. to the end of the cook-out time. About 2 wt.% of the monomer mixture was added to the flask as a seed and the resulting mixture was stirred at a high rate of speed for 30 minutes. Thereafter, the remaining monomer mixture

EXAMPLES 9 THROUGH 11

Examples 9 through 11 were conducted continuously in a 550 cubic centimeter continuously stirred tank reactor fitted with baffles and an impeller generally run at 800 rpm. The feed components were pumped to the reactor continuously after going through an in-line mixer to assure complete mixing of the feed components before entering the reactor. The internal temperature of the reactor was controlled to within one degree Centigrade by applying controlled heating or cooling to the outside of the reactor. The product from the reactor flowed out through a back pressure regulator. Then the product flowed through a water cooled tubular heat exchanger to a product receiver. Portions of the crude product were vacuum stripped at 2 millimeters pressure and 120° to 130° C. for testing. Conversions were determined by gas chromatographic analysis of the amount of unreacted monomers present in the crude product before stripping.

The reaction conditions and results of these Examples are tabulated in Table 2. As shown in the Table, the polymer/polyisocyanate compositions of these Examples had good filterability and relatively low viscosities. This illustrates the advantage of the continuous process in providing compositions having relatively low viscosities and relatively high polymer contents.

TABLE 2

| | Example No. | | |
|---|---|---|---|
| | 9 | 10 | 11 |
| Isocyanate feed rate, gm/hr, I191 | 2208 | 2108 | 1935 |
| Monomer feed rate, gm/hr | 717 | 669 | 855 |
| Product rate, gm/hr | 2888 | 2754 | 2766 |
| Residence time, min. | 11 | 12 | 12 |
| Catalyst conc., wt. % | 0.75 | 0.75 | 0.69 |
| Monomer content in feed, wt. % | 24.5 | 24.1 | 30.6 |
| A/AA/AM ratio, wt. % | 94/6/0 | 94/1/5 | 94/1/5 |
| Material balance % | 98.7 | 99.2 | 99.2 |
| Residual acrylonitrile, wt. % | 5.0 | 4.3 | 5.2 |
| Residual AA, wt. % | <.1 | <.1 | <.1 |
| Residual AM, wt. % | — | — | — |
| Residual TMSN, wt. % | 0.14 | 0.19 | 0.20 |
| Total volatiles from stripping | 5.34 | 4.24 | 5.11 |
| Conversions | | | |
| Acrylonitrile, % | 78.6 | 81.0 | 82.1 |
| AA, wt. % (assumed) | 100 | 100 | 100 |
| AM, wt. % (assumed) | — | 100 | 100 |
| Combined wt. % | 79.9 | 82.1 | 83.1 |
| Combined wt. % (from stripping data) | 78.4 | 89.4 | 83.3 |
| Stripped Product | | | |
| Polymerized A, wt. % | 19.06 | 19.17 | 24.94 |
| Polymerized AM by calc. | 1.55 | 0.25 | 0.32 |
| Polymerized AM by calc. | 0 | 1.26 | 1.66 |
| Total polymer by calc. | 20.61 | 20.68 | 26.88 |
| Total polymer (from stripping data) | 20.48 | 20.73 | 26.9 |
| Calculated free NCO, wt. % | 23.80 | 23.17 | 21.36 |
| Measured free NCO, wt. % | 22.97 | 22.22 | 21.89 |
| Δ NCO | 0.83 | 0.93 | 0.53 |
| Brookfield viscosity, cps at 25° C. | 1692 | 287 | 670 |
| Filtration (2/1 Dilution with I191) | | | |
| 150 mesh screen, sec. % thru | 100 | 100 | 100 |
| 325 mesh screen, sec. % thru | 84 | 18 | 45 |

EXAMPLES 12 THROUGH 34

In Examples 12 through 34 and Runs a through e, the procedure described in regard to Examples 1 through 8 was used except that the reaction temperatures, polyisocyanates, amounts of acrylonitrile and comonomers, ratios of acrylonitrile to comonomer, types of comonomers, wt. % of seed monomers, and seed times specified in Table 3 below were used. The properties of the resulting products for each Example and Run are also presented in Table 3.

In Runs f, g and h, the HEA was added to the polyisocyanate initially (in the amount of respectively 1, 0.5 and 1 wt.% of HEA based on the total weight of the polyisocyanate and monomers used) and the resulting mixture was stirred and heated for one hour at 90° C. Then, a monomer-catalyst mixture prepared from 20 wt.% A and 1 wt.% VAZO was added as seed monomer in an amount providing about 6 wt.% and the resulting mixture was stirred and heated for ½ hour. The weight percentages for HEA, A and VAZO given above are based on the total weight of polyisocyanate, A and HEA. Thereafter, the remaining monomer-catalyst mixture was added dropwise and the remaining procedure was carried out as described in respect to Examples 1–8.

Examples C, D and E provide, for comparison purposes, the filterability measurements for the polyisocyanates, P135, P901 and I191 used in Examples 12–34.

Examples 12–34 illustrate the production of polymer/polyisocyanate compositions having good dispersion characteristics as evidenced by little or no graininess or seediness displayed in films of said compositions and/or good filterability. The viscosities of the compositions of Examples 12–34 were for the most part in the desirably low range. The formation of solids or semisolids or poor dispersion characteristics of Runs a through h are the result of large polymer particle formation or agglomeration which probably resulted, in the case of Run a, from the use of higher concentrations of terpolymer in Run a and could be offset by a slight reduction in the amount of comonomer used.

In Run b the allyl groups of the allyl acrylate are less reactive than the acrylate groups which probably resulted in the agglomeration of the polymer particles into larger aggregates which were unable to pass through the screen in the filterability test and smaller amounts of allyl acrylate could offset the agglomeration. Runs d and e resulted in the formation of semisolids having poor dispersion characteristics and appear to be the result of the higher functionality of the P901 and P135 compared to I191. Higher amounts of AM and AA in these runs could avoid semisolids and poor appearance ratings (see Examples 23 and 24). Semisolids, gels or pastes resulted in the compositions of Runs f, g and h because of the presence of too much HEA which is believed to have resulted in excessive unnecessary cross-linking of the polymer particles.

Also, it is noted that in Examples 19 and 20 the filterability can probably be raised by utilizing higher amounts of MAA. Also, it is noted that the filterability of the composition of Example 32 and the appearance thereof was improved by the use of higher amounts of hydroxy propyl methacrylate as illustrated in Example 33. Examples C, D and E were carried out to determine the filterability of P135, I191 and P901.

TABLE 3

| Example No. | | | 12 | 13 | | 14 | 15 | 16 | |
|---|---|---|---|---|---|---|---|---|---|
| Runs | a | b | | | c | | | | d |
| Reaction Temp. | 90 | 90 | 90 | 90 | 90 | 60 | 90 | 90 | 90 |
| Isocynate | I191 | I191 | I191 | I191 | I191 | I191 | P901 | P135 | P901 |
| Wt., % monomer | 25 | 21 | 21 | 21 | 21 | 21 | 23 | 23 | 21 |
| Comonomer(s) | AM/AA | Al | DMA | AM/HPMA | AlA | AM/AA | AM/AA | AM/AA | AM/AA |
| Ratio acrylonitrile/comonomer(s) | 93/6/1 | 97/3 | 92/8 | 94/4/2 | 97/3 | 94/5/1 | 95.5/4/0.5 | 95.5/4/0.5 | 95.5/4/0.5 |
| Wt., % seed monomer | 3 | → | → | → | → | → | → | → | → |
| Seed time (hr) | ½ | → | → | → | → | → | → | → | → |
| Residual acrylonitrile, wt. %[1] | 2.15 | 2.49 | 1.58 | 2.08 | 2.64 | — | 2.59 | 2.99 | — |
| Conversion acrylonitrile, wt. %[2] | 90.7 | 87.8 | 91.8 | 89.4 | 87 | — | 92.9 | 86.4 | — |
| Total conversion of monomers, wt. %[3] | " | " | " | " | " | — | " | " | — |
| Polymer content | 23.2 | 19.0 | 19.6 | 19.2 | 18.8 | — | 21.7 | 20.2 | — |
| % Free NCO, measured | 20.62 | — | — | 21.9 | — | 23.0 | 22.48 | — | — |
| % Free NCO, calculated | 23.8 | 24.3 | 24.1 | 24.3 | 24.4 | — | 23.5 | 23.9 | — |
| Polymer/Isocyanate Properties | | | | | | | | | |

TABLE 3-continued

| Visual inspection | Poor | Poor | Good | ok | | Poor | Good | Good | Good | Poor |
|---|---|---|---|---|---|---|---|---|---|---|
| Brookfield viscosity at 25° C. | Semisolid | 3,750 | 3,280 | 9,000 | | 8,900 | 9,300 | 9,750 | 60,000 | Semisolid |
| Filterability | | | | | | | | | | |
| 80 mesh | | | | | | | | | 100 | |
| 150 mesh | 100 | 7 | 100 | 100 | | 1 | 100 | 100 | 88 | |
| 325 mesh | 56 | — | 44 | 83 | | — | 100 | 3 | | |
| 700 mesh | — | — | — | — | | — | 12 | | | |

| Example No. | | 17 | 18 | 19 | 20 | 21 | 22 | 23 | 24 |
|---|---|---|---|---|---|---|---|---|---|
| Runs | e | | | | | | | | |
| Reaction Temperature | 90 | 90 | 90 | 90 | 90 | 90 | 90 | 90 | 90 |
| Isocyanate | P135 | I191 | I191 | I191 | I191 | P901 | I191 | P901 | P901 |
| Wt., % monomer | 21 | 21 | 21 | 21 | 21 | 21 | 21 | 21 | 21 |
| Comonomer(s) | AM/AA | DVB | DVB | MAA | MAA | AM/AA | None | AM/AA | AM/AA |
| Ratio acrylonitrile/comonomer | 95/4/0.5 | 97/3 | 98.5/1.5 | 97/3 | 99/1 | 94/4/2 | — | 94/4/2 | 94/5/1 |
| Wt., % seed monomer | 3 | → | → | → | → | → | → | → | → |
| Seed Time (hr) | ½ | → | → | → | → | → | → | → | → |
| Residual acrylonitrile, wt. %[1] | 3.02 | 1.73 | 1.86 | 2.57 | 2.54 | 2.14 | 1.72 | — | — |
| Conversion acrylonitrile, wt. %[2] | 84.9 | 91.5 | 91.0 | 87.4 | 87.8 | 89.1 | 91.8 | — | — |
| Total conversion of monomers, wt. %[3] | " | " | " | " | " | " | " | — | — |
| Polymer content | 18.5 | 19.6 | 19.5 | 18.8 | 18.9 | 19.1 | 19.6 | — | — |
| % Free NCO, measured | | 22.85 | 22.96 | 23.07 | 23.00 | 23.59 | 22.98 | 21.93 | 21.77 |
| % Free NCO, calculated | 24.4 | 24.1 | 24.1 | 20.3 | 24.3 | 24.3 | 24.1 | — | — |
| Polymer/Isocyanate Properties | | | | | | | | | |
| Visual inspection | Poor | ok | ok | Good | Good | Good | ok | Good | Good |
| Brookfield viscosity at 25° C. | Semisolid | 5,800 | 5,820 | 3,330 | 3,180 | 22,913 | 7,600 | 12,000 | 8,000 |
| Filterability | | | | | | | | | |
| 80 mesh | | | | | | | | | |
| 150 mesh | | 100 | 100 | 12 | 3 | 51 | 100 | 100 | 100 |
| 325 mesh | | 55 | 3 | | | | 5 | 100 | 100 |
| 700 mesh | | | | | | | | 64 | 45 |

| Example No. | C | D | E | 25 | 26 | 27 | 28 | 29 |
|---|---|---|---|---|---|---|---|---|
| Reaction temperature | | | | 90 | 90 | | | |
| Isocyanate | P135 | I191 | P901 | I191 | I191 | I191 | I191 | I191 |
| Wt., % monomer | | — | | 21 | 21 | 21 | 21 | 21 |
| Comonomer(s) | | | | HPMA | AM/HEA | HEA | HEA | HEA |
| Ratio acrylonitrile/comonomer | | | | 97.5/2.5 | 93.5/6/.5 | 99.5/.5 | 99/1 | 98.5/1.5 |
| Wt., % seed monomer | | | | 3 | 2 | → | → | → |
| Seed Time (hr) | | | | ½ | → | → | → | → |
| Residual acrylonitrile, wt. %[1] | | | | 1.5 | 2.23 | 2.14 | 2.15 | 2.49 |
| Conversion acrylonitrile, wt. %[2] | | | | 92.6 | 88.6 | 89.8 | 89.7 | 88.0 |
| Total conversion of monomers, wt. %[3] | | | | " | " | " | " | " |
| Polymer content | | | | 20.8 | 19.1 | 19.3 | 19.2 | 18.9 |
| % Free NCO, measured | | | | 22.55 | 22.82 | 21.57 | 22.81 | 26.0 |
| % Free NCO, calculated | | | | 23.8 | 24.3 | 24.2 | 24.2 | 24.3 |
| Polymer/Isocyanate Properties | | | | | | | | |
| Visual inspection | | | | Fair | Good | ok | ok | Good |
| Brookfield viscosity at 25° C. | | | | 12,600 | 16,900 | 22,800 | 10,305 | 2,920 |
| Filterability | | | | | | | | |
| 80 mesh | 100 | — | | | | | | |
| 150 mesh | 58 | 100 | 100 | 100 | 100 | 92 | 100 | 100 |
| 325 mesh | — | 100 | 100 | 50 | 75 | 43 | 23 | 23 |
| 700 mesh | — | 58 | 100 | — | 2 | — | — | — |

| Example No. | 30 | 31 | 32 | 33 | 34 | | | |
|---|---|---|---|---|---|---|---|---|
| Run | | | | | | f | g | h |
| Reaction Temp. | | | | | | 90 | 90 | 90 |
| Isocyanate | I191 | I191 | I191 | I191 | I191 | I191 | 143L | 143L |
| Wt., % monomer | 21 | → | → | → | 23 | 21 | → | → |
| Comonomer(s) | AM/HEA | HEA | HPMA | HPMA | HEA | HEA | HEA | HEA |
| Ratio acrylonitrile/comonomer | 93.3/6/.7 | 99.3/.7 | 99/1 | 98.5/1.5 | 99/1 | 95/5 | 98/2 | 95/5 |
| Wt., seed monomer | 2 | → | → | → | 8 | 6 | → | → |
| Seed Time (hr) | ½ | → | → | → | → | → | → | → |
| Residual acrylonitrile, wt. %[1] | 2.13 | 2.02 | 2.23 | 1.91 | 4.8 | — | — | — |
| Conversion acrylonitrile, wt. %[2] | 89.1 | 90.3 | 89.3 | 90.8 | 79 | — | — | — |
| Total conversion of monomers, wt. %[3] | " | " | " | " | " | — | — | — |
| Polymer content | 19.1 | 19.4 | 19.2 | 19.4 | 19.1 | — | — | — |
| % Free NCO, measured | 21.74 | 22.8 | — | — | — | — | — | — |
| % Free NCO, calculated | 24.8 | 24.2 | 24.4 | 24.2 | 24.8 | — | — | — |
| Polymer/Isocyanate Properties | | | | | | | | |
| Visual inspection | ok | ok | ok | Good | ok | Gelled | Paste | Paste |
| Brookfield viscosity at 25° C. | 26,400 | 5,105 | 4,250 | 6,000 | 13,303 | Semisolid | | |
| Filterability | | | | | | | | |
| 80 mesh | | | | | | | | |
| 150 mesh | 100 | 100 | 60 | 100 | 100 | | | |
| 325 mesh | 16 | 9 | 9 | 36 | 98 | | | |

TABLE 3-continued

| | | | | | |
|---|---|---|---|---|---|
| 700 mesh | — | — | — | — | 32 |

[1], [2] and [3] same as in Table 1.

EXAMPLES 35 THROUGH 43

In Examples 35–43, and Run j, the procedure described in regard to Examples 1 through 8 was used except that the reaction temperatures, types and amounts of monomers and comonomers, wt.% of seed monomers and seed time were different as provided in Table 4 below. In each case, acrylonitrile was used with comonomers and the total amount of monomers including acrylonitrile is set forth for each Example and Run in Table 4. In each case VAZO-64 catalyst was used. The properties of the resulting product for each Example are provided in Table 4. Examples 35 through 43 illustrate the production of acceptable or good dispersions of acrylonitrile-vinylidene chloride copolymers in accordance with the procedures in the present invention. The viscosities of the polymer/polyisocyanate compositions provided by these Examples were quite low. Run j provided poor appearance results because of the absence of acrylonitrile in the copolymer particles. The polyisocyanate used in each Example and Run was I191.

surfactant was added to the reaction vessel and the other part to the monomers. In Examples 76 through 78 and Run bb, the surfactant was added to the reaction vessel through a separate funnel. The polyisocyanate was I191 in all of these Examples and Runs except Example 63 and Run u in which cases the polyisocyanate was 143L. In addition, the total amount of monomers was different in these Examples and Runs and such amounts are listed in Table 5 below. Reaction flask size in all Examples and Runs was 3000 milliliters except Examples 73 and 74 in which cases a 2000 milliliter flask was employed. In Run k the reaction temperature was 110° C. Seed time in all cases was ½ hour, except Run k where it was 1 hour, and wt.% seed monomer was 3 wt.% in all cases except Run v where it was 3½ wt.%. Cook-out time was 2 hours in all cases except Example 53 where it was 2½ hours.

The composition produced by Run k was semisolid and very seedy because of the presence of an excessive amount of acrylamide. The composition of Run m was made with a silicone surfactant and was a semisolid because it contained a higher amount of polymer than

TABLE 4

| Example No. Run | 35 | 36 | 37 | 38 | 39 | 40 | j | 41 | 42 | 43 |
|---|---|---|---|---|---|---|---|---|---|---|
| Reaction Temperature | 90 | 90 | 90 | 90 | 90 | 90 | 70 | 70 | 90 | 90 |
| Wt. % Catalyst | 1 | 1 | 1 | 1 | 1 | 1 | 2 | 2 | 1 | 1 |
| Wt. % Monomers | 20 | 25 | 23 | 20 | 23 | 23 | 20 | 20 | 23 | 23 |
| Comonomer | VCl$_2$ | → | → | → | → | → | → | → | → | → |
| Acrylonitrile/Comonomer Ratio | 70/30 | 70/30 | 70/30 | 70/30 | 60/40 | 50/50 | 0/100 | 20/80 | 90/10 | 80/20 |
| Seed Monomers (Wt. % of Reaction Mixture) | 3 | 3 | 4 | 4 | 4 | 4 | — | — | 2 | 2 |
| Seed Time (hr.) | 0.5 | 0.5 | 0.5 | 0.5 | 0.5 | 0.5 | — | — | 0.5 | 0.5 |
| Monomer Addition Time | | | 3 | 3 | 3 | 3 | 5 | 5 | 3 | 3 |
| Cookout Time (hr.) | 1.5 | 1.5 | 2 | 2 | 2 | 2 | 16 | 16 | 2 | 2 |
| Reaction Flask Size (ml) | 3,000 | 3,000 | 3,000 | 3,000 | 3,000 | 3,000 | 3,000 | 3,000 | 3,000 | 3,000 |
| Residual, Acrylonitrile[1] | 1.54 | 0.94 | 1.97 | 1.94 | 1.75 | 2.05 | — | 0.34 | 2.3 | 1.8 |
| Residual Comonomer | 0.5 | 0.26 | 0.70 | 0.65 | 0.95 | 1.30 | 0.73 | 0.73 | 0.51 | 0.22 |
| Percent Conversion of Acrylonitrile[2] | 89.0 | 94.6 | 87.8 | 86.1 | 87.4 | 82.2 | — | 91 | 88 | 91 |
| Comonomer | 91.7 | 96.5 | 89.9 | 89.2 | 89.7 | 88.7 | 96.5 | 95 | 89 | 90 |
| Combined Monomers | 89.8 | 95.2 | 88.4 | 86.4 | 88.6 | 85.4 | 96.5 | 94.7 | 88 | 91 |
| Polymer Content[3] | 18.3 | 24.1 | 20.8 | 17.9 | 20.9 | 20.3 | 19.4 | 19.1 | 21 | 21 |
| FNCO (measured) | — | — | — | — | — | — | — | — | — | — |
| Product Properties (Visual Inspection) | good | good | good | good | good | good | poor | ok | good | good |
| Hoeppler Viscosity at 25° C. | 4,850 | 7,665 | 1,577 | 955 | 1,194 | 2,138 | 7,828 | 7,334 | 1,091 | 1,165 |
| Filterability[4] | | | | | | | | | | |
| A 150 Mesh Screen | 100 | 49 | 56 | 37 | 100 | — | — | — | — | — |
| B 150 | — | — | — | — | — | — | 100 | 100 | 100 | 100 |
| 325 | — | — | — | — | — | — | 2 | 100 | 18 | 3 |
| 700 | — | — | — | — | — | — | — | 100 | — | — |

[1], [2], [3]Same as in Table 1
[4]A represents I191 diluted samples and B represents dioxane diluted samples in the filterability tests.

EXAMPLES 44 THROUGH 78

In Examples 44 through 78 and Runs k through bb, the procedure described in regard to Examples 1 through 8 was used in each case except that acrylamide was used as a comonomer in each case, the percentages of monomers, i.e., acrylonitrile and acrylamide used are as listed in Table 5 below and in some cases as indicated in Table 5 below a surfactant S1, S2 or S3, or precursor, MAME-I or MAME-II was used. In Examples 45 and 72 and Runs m and u, the surfactant in the amount shown in Table 5 was added to the reaction vessel. In Example 69 and Runs z and aa, the surfactant was added to the monomers. In Examples 74 and 75 part of the did Example 45 which was also prepared with a silicone surfactant. Run n resulted in a semisolid or gel because a slightly different procedure was used in that the acrylamide was added to the polyisocyanate all at once and then the acrylonitrile was added dropwise. This Run was stopped before completion because of the gelation effects. The compositions of Runs o, q, r, s, t, u, v, w, x, y, z, aa and bb did not amount to 100% through the 150 mesh screen and the reason for this cannot be specifically explained except that there may have been a possible defect in the polyisocyanate being employed such that large agglomerates resulted which cannot pass through the screen in the filterability test. The low filterability for Run v is believed to have been caused by the feed partially polymerizing in the feed tank. Also, in those instances in Run bb it is probable that the low filterability results could have been caused by higher than needed amounts of the surfactant S3 that was used. Nevertheless, the compositions of Runs s, t, v, and aa had filterabilities above 20% passing through and can be used in some applications to make polyurethane products.

The polymer/polyisocyanates of Examples 44–51, 50–60, 64–69, 71–74 and 76–78 produced glass slide films that were smooth and without a grainy appearance. The particle sizes of the polymers in the compositions produced in Examples 44–78 were generally smaller than the particle sizes of polyacrylonitrile in similar compositions produced from acrylonitrile in the absence of comonomer in subsequent Examples.

TABLE 5

| Example No. or Run | k | 44 | 45 | 46 | 47 | 48 | 49 | m | 50 | 51 | 52 | 53 |
|---|---|---|---|---|---|---|---|---|---|---|---|---|
| Wt., % Monomers | 18 | 23 | 23 | 23 | 27 | 25 | 25 | 25 | 27 | 23 | 23 | 23 |
| Ratio A/AM | 85/15 | 94/6 | 94/6 | 94/6 | 94/6 | 94/6 | 94/6 | 97/3 | 94/6 | 94/6 | 94/6 | 94/6 |
| Surfactant or precursor | — | — | S1 | — | — | — | — | S1 | — | — | — | — |
| Wt., % Surfactant or precursor | — | — | 2 | — | — | — | — | 2 | — | — | — | — |
| Monomer Addition Time (hr) | 2 | 3 | 3 | 3 | 4 | 4 | 4 | 3½ | 3½ | 3½ | 4 | 3 |
| Residual Acrylonitrile, Wt., %[1] | — | 1.62 | 1.70 | 1.88 | 2.6 | 3.1 | 3.7 | 2.1 | 3.6 | 3.4 | 3.8 | 2.7 |
| Total Grams of Product | — | 800 | 816 | 800 | 1,500 | 1,400 | 1,400 | 1,428 | 1,400 | 1,400 | 1,600 | 1,200 |
| Total Conversion of Monomer, Wt., %[2] | — | 93 | 92 | 91 | 90 | 87 | 84 | 91 | 86 | 84 | 82 | 88 |
| Polymer Content, Wt., %[3] | — | 22 | 21 | 21 | 25 | 22 | 22 | 23 | 24 | 20 | 20 | 21 |
| % Free NCO, Measured | — | 20.58 | 20.12 | 20.75 | 18.88 | 19.88 | 19.91 | — | 20.31 | 21.01 | 20.33 | 20.98 |
| % Free NCO, Calculated | — | 23.6 | 23.9 | 23.9 | 22.7 | 23.6 | 23.6 | 23.3 | 23.0 | 24.2 | 24.2 | 23.9 |
| Polymer/Isocyanate Properties | | | | | | | | | | | | |
| Visual Inspection | V.seedy | V.good | V.good | V.good | good | good | good | fair | good | good | fair | fair |
| Brookfield Viscosity at 25° C. | semisolid | 3,899 | 6,862 | 2,875 | V.high | 27,323 | 32,000 | semisolid | semisolid | 5,366 | 10,000 | 11,474 |
| Filterability[4] | | | | | | | | | | | | |
| A 150 Mesh | — | 100 | 100 | 100 | 100 | 100 | 100 | — | 100 | 100 | 100 | 100 |
| 325 Mesh | — | 100 | 100 | 100 | 100 | 27 | 34 | — | 27 | 43 | 20 | 100 |
| 700 Mesh | — | 100 | 100 | 40 | 19 | — | — | — | — | — | — | 37 |

| Example No. or Run | 54 | 55 | 56 | n | 57 | 58 | 59 | 60 | 61 | o | p |
|---|---|---|---|---|---|---|---|---|---|---|---|
| Wt., % Monomers | 23 | 23 | 23 | 21 | 23 | 23 | 20 | 23 | 23 | 23 | 23 |
| Ratio A/AM | 94/6 | 94/6 | 94/6 | 94/6 | 94/6 | 94/6 | 92/8 | 92/8 | 94/6 | 92/8 | 96/4 |
| Surfactant or precursor | — | — | — | — | — | — | — | — | — | — | — |
| Wt., % Surfactant or precur. | — | — | — | — | — | — | — | — | — | — | — |
| Monomer Addition Time (hr) | 3¼ | 3½ | 3¼ | 2 | 3 | 3 | 3 | 3 | 3 | 3 | 3 |
| Residual Acrylonitrile, Wt., %[1] | 2.9 | 3.4 | 3.1 | — | 3.1 | 3.6 | 3.0 | 3.0 | — | — | — |
| Total Grams of Product | 1,200 | 1,200 | 1,200 | 1,200 | 1,200 | 1,200 | 1,200 | 1,200 | 1,200 | 1,200 | 1,200 |
| Total Conversion of Monomer, Wt., %[2] | 88 | 84 | 80 | — | 86 | 83 | 86 | 86 | — | — | — |
| Polymer Content, Wt., %[3] | 21 | 20 | 20 | — | 20 | 20 | 20 | 20 | — | — | — |
| % Free NCO, Measured | — | 20.98 | 20.98 | — | 20.98 | 20.98 | — | — | — | — | — |
| % Free NCO, Calculated | 23.9 | 24.2 | 24.2 | — | 24.2 | 24.2 | 24.2 | 24.2 | — | — | — |
| Polymer/Isocyanate Properties | | | | | | | | | | | |
| Visual Inspection | good | good | good | gel | good | good | good | good | fair | fair | fair |
| Brookfield Viscosity at 25° C. | 1,128 | 7,040 | 3,000 | semisolid | 7,054 | 4,000 | 1,825 | 5,000 | 21,154 | 23,386 | semisolid |
| Filterability[4] | | | | | | | | | | | |
| A 150 Mesh | 100 | 100 | 100 | — | 100 | 100 | — | 100 | 100 | 29 | — |
| 325 Mesh | 1 | 53 | 28 | — | 1 | 56 | — | 3 | 12 | — | — |
| 700 Mesh | — | — | — | — | — | — | — | — | — | — | — |

| Example No. or Run | q | 62 | r | s | t | 63 | u | 64 | 65 | v | 66 |
|---|---|---|---|---|---|---|---|---|---|---|---|
| Wt., % Monomers | 23 | 20 | 20 | 23 | 20 | 23 | 23 | 21 | 21 | 18 | 21 |
| Ratio A/AM | 94/6 | 94/6 | 92/8 | 94/6 | 94/6 | 94/6 | 94/6 | 94/6 | 95/5 | 96/4 | 95/5 |
| Surfactant or precursor | — | — | — | — | — | — | OA | — | — | — | — |
| Wt., % Surfactant or precur. | — | — | — | — | — | — | — | — | — | — | — |
| Monomer Addition Time (hr) | 3 | 3 | 3 | 3 | 3 | 3 | 3 | 3 | 3 | 2½ | 3 |
| Residual Acrylonitrile, Wt., %[1] | — | — | — | — | — | 1.19 | 2.12 | 2.24 | 2.23 | 2.41 | 2.14 |
| Total Grams of Product | — | — | — | — | — | — | — | — | — | — | — |
| Total Conversion of Monomer, Wt., %[2] | — | — | — | — | — | 95 | 90 | 90 | 89 | 88 | 89 |
| Polymer Content, Wt., %[3] | — | — | — | — | — | 22 | 21 | 21 | 19 | 19 | 19 |
| % Free NCO, Measured | — | — | — | — | — | — | — | — | — | — | — |
| % Free NCO, Calculated | — | — | — | — | — | — | — | 23.9 | 24.5 | 24.5 | 24.5 |
| Polymer/Isocyante Properties | | | | | | | | | | | |
| Visual Inspection | good | good | fair | fair | good | fair | fair | good | good | good | good |
| Brookfield Viscosity at 25° C. | 17,468 | 14,000 | 6,707 | semisolid | 12,235 | 9,140 | 10,407 | 31,583 | 10,550 | 14,250 | 10,000 |

TABLE 5-continued

| Filterability[4] | | | | | | | | | | | |
|---|---|---|---|---|---|---|---|---|---|---|---|
| A 150 Mesh | 66 | 100 | 17 | 39 | 23 | 100 | 6 | 100 | 100 | 25 | 100 |
| 325 Mesh | 63 | 83 | — | — | — | 28 | — | 100 | 100 | — | 26 |
| 700 Mesh | — | 20 | — | — | — | — | — | 30 | 6 | — | — |

| Example No. or Run | w | x | 67 | 68 | y | 69 | z | aa | 70 | 71 | 72 |
|---|---|---|---|---|---|---|---|---|---|---|---|
| Wt., % Monomers | 21 | 21 | 21 | 21 | 17 | 17 | 17 | 17 | 23 | 20 | 20 |
| Ratio A/AM | 96/4 | 94/6 | 94/6 | 94/6 | 94/6 | 94/6 | 94/6 | 94/6 | 94/6 | 94/6 | 94/6 |
| Surfactant or precursor | — | — | — | NAME-I | — | NAME-II | → | → | — | — | S1 |
| Wt., % Surfactant or prec. | — | — | — | 2 | — | 2 | 2 | 1 | — | — | 1 |
| Monomer Addition Time (hr) | 3 | 3 | 3 | 3 | 3 | 3 | 3 | 3 | 3 | — | 3 |
| Residual Acrylonitrile, Wt., %[1] | 2.16 | 2.67 | 1.91 | 2.01 | 1.72 | 1.65 | 1.86 | 1.82 | — | 2.02 | 2.12 |
| Total Grams of Product | — | — | — | — | — | — | — | — | — | — | 800 |
| Total Conversion of Monomer, Wt., %[2] | 89 | 86 | 90 | 90 | 89 | 90 | 88 | 89 | — | 89 | 89 |
| Polymer Content, Wt., %[3] | 19 | 19 | 19 | 15 | 15 | 15 | 15 | 15 | — | 18 | 18 |
| % Free NCO, Measured | — | — | — | 22.4 | 24.1 | 23.8 | 22.5 | 22.4 | — | 22.64 | 22.54 |
| % Free NCO, Calculated | 24.5 | 24.5 | 24.5 | 24.5 | 25.7 | 25.7 | 25.7 | 25.7 | — | 24.60 | 24.6 |
| Polymer/Isocyanate Properties | | | | | | | | | | | |
| Visual Inspection | good | good | good | good | fair | good | fair | fair | fair | good | good |
| Brookfield Viscosity at 25° C. | 14,500 | 14,000 | 14,500 | 19,000 | 4,760 | 16,000 | 33,650 | 24,450 | 8,600 | — | — |
| Filterability[4] | | | | | | | | | | | |
| A 150 Mesh | 18 | 8 | 100 | 100 | 1 | 100 | 4 | 29 | — | — | — |
| 325 Mesh | — | — | 79 | 100 | — | 100 | — | — | — | — | — |
| 700 Mesh | — | — | — | 38 | — | 100 | — | — | — | — | — |
| B 150 Mesh | — | — | — | — | — | 100 | — | — | — | 100 | 100 |
| 325 Mesh | — | — | — | — | — | 100 | — | — | — | 43 | 100 |
| 700 Mesh | — | — | — | — | — | 100 | — | — | — | — | 12 |

| Example No. or Run | 73 | 74 | 75 | 76 | 77 | 78 | bb |
|---|---|---|---|---|---|---|---|
| Wt., % Monomers | 20 | 20 | 21 | 21.4 | 21.4 | 21 | 21 |
| Ratio A/AM | 94/6 | 96/6 | 94/6 | 94/6 | 96/6 | 94/6 | 94/6 |
| Surfactant or precursor | — | S1 | S1 | S2 | S2 | S3 | S3 |
| Wt., % Surfactant or precursor | — | 1 | 2 | 0.25 | 0.25 | 0.25 | 0.5 |
| Monomer Addition Time (hr) | — | 3 | 3 | 3 | 3 | 3 | 3 |
| Residual Acrylonitrile, Wt., %[1] | 2.29 | 2.08 | 2.39 | 2.07 | 2.11 | — | 2.12 |
| Total Grams of Product | 500 | 500 | 1,224 | 780 | 980 | 935 | 960 |
| Total Conversion of Monomer, Wt., %[2] | 88 | 89 | 89 | 90 | 91 | — | 94 |
| Polymer Content, Wt., %[3] | 18 | 18 | 18 | 21 | 21 | — | 21 |
| % Free NCO, Measured | — | — | 20.56 | 21.64 | 21.61 | 21.61 | 21.74 |
| % Free NCO, Calculated | 26.6 | 24.6 | 24.6 | 23.7 | 23.7 | — | 23.7 |
| Polymer/Isocyanate Properties | | | | | | | |
| Visual Inpection | good | good | fair | good | good | good | poor |
| Brookfield Viscosity at 25° C. | — | — | — | 24,250 | 17,750 | 30,000 | 24,150 |
| Filterability[4] | | | | | | | |
| A 150 Mesh | — | — | — | — | — | — | — |
| 325 Mesh | — | — | — | — | — | — | — |
| 700 Mesh | — | — | — | — | — | — | — |
| B 150 Mesh | 100 | 100 | — | 100 | 100 | 100 | 8 |
| 325 Mesh | 53 | 100 | — | 74 | 100 | 100 | — |
| 700 Mesh | — | 25 | — | 25 | 21 | 29 | — |

[1], [2], [3] same as in Table 1.
[4] same as in Table 4.

EXAMPLES 79 THROUGH 83

In these Examples and Runs cc through qq, the procedure described in Examples 1 through 8 was used in each case except that the polyisocyanate used in each instance is listed in Table 6 below and acrylic acid was used as the sole comonomer with acrylonitrile in each case. The total amounts of acrylic acid and acrylonitrile monomers used are listed in Table 6 below. In certain instances a surfactant or precursor as listed in Table 6 below was used in the amounts as listed (in Runs cc and mm, the surfactant or precursor was added to the reaction vessel before polymerization and in Run nn it was incorporated in the feed monomers). The amounts of the monomer mix initially used as seed are given in Table 6 and a three liter reaction flask was used in each case. In Runs nn and pp the monomer addition time was 4 hours and in Run oo it was 1½ hours. In all other Examples and Runs it was 3 hours.

In each instance the resulting products after vacuum stripping were analyzed and the properties measured are given in Table 6 below. In each of Examples 79 through 83, a polymer/polyisocyanate composition was obtained which had acceptable dispersion properties as exhibited by little or no graininess in films formed from said compositions. Also the viscosities of the compositions of Examples 79 through 81 were less than 8000 cps. The polymer particle sizes in Examples 79–83 were smaller and fell into a narrower particle size distribution range than those of the polyacrylonitrile homopolymer particles of subsequent Examples. Examples F and G in which the polyisocyanate used was composed of large amounts of or all TDI, the particle sizes of the resulting polymers were relatively large and agglomeration occurred to the extent that the dispersion stability was not considered to be adequate.

The poor filterability results for Runs cc through ee are probably due to undetected process abberations and possibly a faulty lot of polyisocyanates or monomers. The filterability of Run dd composition, however, was mer/polyisocyanate compositions for testing in hand-casting.

TABLE 6

| Example (or Run) No. | cc | 79 | dd | ee | 80 | ff | F | 81 | 82 | G | gg |
|---|---|---|---|---|---|---|---|---|---|---|---|
| Polyisocyanate | I191 | → | → | → | I143L | MDI | TDI | I143L | I181 | I58 | I191 |
| Wt., % Monomers | 21 | 17 | 17 | 17 | 21 | 21 | 21 | 21 | 16 | 21 | 15 |
| Ratio A/AA | 94/6 | 93/7 | 93/7 | 93/7 | 96/4 | 96/4 | 96/4 | 96/4 | 96/4 | 96/4 | 50/50 |
| Surfactant or precursor | MAME-I | — | — | — | — | — | — | — | — | — | — |
| Wt., % Surfactant or prec. | 2% | — | — | — | — | — | — | — | — | — | — |
| Wt., % Seed | 3 | 3 | 3 | 3 | 3 | 3 | 3 | 3 | 3 | 3 | 1 |
| Residual Acrylonitrile, Wt., %[1] | 2.1 | 1.59 | 1.77 | 1.83 | 1.99 | 1.79 | 1.1 | 1.74 | 2.27 | 0.31 | — |
| Total Grams of Product | 1,000 | 1,000 | 1,000 | 1,000 | 1,000 | 934 | 1,010 | 1,010 | 1,010 | 1,010 | 1,059 |
| Conversion, Acrylonitrile, Wt., %[2] | 89 | 90 | 89 | 88 | 90 | 91 | 94 | 91 | 85 | 98 | — |
| Conversion, Acrylic Acid, Wt., % | | | | | | | | | | | |
| Total % Conversion[3] | 89 | 90 | 89 | 88 | 90 | 91 | 94 | 91 | 85 | 98 | — |
| Polymer Content, Wt., %[3] | 19 | 16 | 15 | 15 | 19 | 19 | 20 | 19 | 14 | 21 | — |
| % Free NCO, Measured | — | 24.6 | 23.7 | 23.51 | 22.36 | 24.92 | — | 22.76 | 18.33 | 34.20 | — |
| % Free NCO, Calculated | 24.4 | 25.3 | 25.6 | 25.6 | 23.9 | 24.9 | 38.9 | 24.4 | 19.8 | 35.1 | — |
| Polymer/Isocyanate Properties | | | | | | | | | | | |
| Visual Inspection | poor | good | good | good | fair | fair | fair | good | fair | fair | gel |
| Brookfield Viscosity at 25° C. (cps) | Semisolid | 6,600 | 1,520 | 2,450 | 7,200 | Solid | 6,090 | 2,500 | Semisolid | Solid | — |
| Filterability[4] | | | | | | | | | | | |
| A 150 Mesh | 5 | 100 | 23 | 14 | 100 | — | 1 | 100 | 100 | 80 | — |
| 325 Mesh | — | 100 | 1 | — | 100 | — | — | 100 | 1 | — | — |
| 700 Mesh | — | 12 | — | — | 90 | — | — | 100 | — | — | — |
| B 150 Mesh | — | 100 | 20 | — | — | — | — | — | — | — | — |
| 325 Mesh | — | 100 | — | — | — | — | — | — | — | — | — |
| 700 Mesh | — | 17 | — | — | — | — | — | — | — | — | — |

| Example (or Run) No. | hh | ii | jj | kk | ll | mm | nn | oo | pp | qq | 83 |
|---|---|---|---|---|---|---|---|---|---|---|---|
| Polyisocyanate | I191 | → | → | → | 143L | I191 | → | → | → | → | → |
| Wt., % Monomers | 14 | 10 | 10 | 10 | 21 | 20 | 20 | 10 | 23 | 20 | 21 |
| Ratio A/AA | 25/75 | 50/50 | 75/25 | 25/75 | 94/6 | 96/4 | 96/4 | 75/25 | 94/6 | 94/6 | 97/3 |
| Surfactant or precursor | — | — | — | — | — | S4 | S4 | — | — | — | — |
| Wt., % Surfactant or prec. | — | — | — | — | — | 1.4 | 0.4 | — | — | — | — |
| Wt., % Seed | 1 | 1 | 1 | 1 | 3 | 3 | 3 | 1 | 3 | 3 | 3 |
| Residual Acrylonitrile, Wt., %[1] | — | 3.09 | 3.53 | 1.30 | 1.74 | — | 2.34 | 3.05 | — | 2.85 | 2.13 |
| Residual Acrylic Acid, Wt., % | — | 0.37 | 0.12 | 0.55 | — | — | — | — | — | — | — |
| Total Grams of Product | 1,045 | 1,000 | 1,000 | 1,000 | 1,010 | 1,000 | 1,000 | 1,000 | 1,200 | 800 | 1,000 |
| Conversion, Acrylonitrile, Wt., %[2] | — | 38 | 53 | 48 | 91 | — | 87 | — | — | 88 | 89.5 |
| Conversion, Acrylic Acid, Wt., % | — | 93 | 95 | 93 | — | — | 87 | — | — | — | 89.5 |
| Total % Conversion | — | 65 | 64 | 81 | 91 | — | 87 | — | — | 88 | 89.5 |
| Polymer Content, Wt., %[3] | — | 7 | 7 | 8 | 19 | — | 18 | — | — | 18 | 19 |
| % Free NCO, Measured | — | 26.66 | — | — | 22.76 | — | — | 27.13 | — | 23.21 | 22.65 |
| % Free NCO, Calculated | — | 28.0 | — | — | 23.9 | — | — | — | — | — | 24.3 |
| Polymer/Isocyanate Properties | | | | | | | | | | | |
| Visual Inspection | gel | solution | solution | solution | good | gel | — | solution | gel | viscous | good |
| Brookfield Viscosity at 25° C. (cps) | — | 2,300 | 330 | 36,000 | 5,800 | — | 4,850 | 460 | — | — | 19,000 |
| Filterability[4] | | | | | | | | | | | |
| A 150 Mesh | — | — | — | — | 12 | — | — | — | — | — | 100 |
| 325 Mesh | — | — | — | — | — | — | — | — | — | — | 10 |
| 700 Mesh | — | — | — | — | — | — | — | — | — | — | 12.3 |
| B Mesh | — | — | — | — | — | 1 | 11 | — | — | — | — |
| 325 Mesh | — | — | — | — | — | — | — | — | — | — | — |
| 700 Mesh | — | — | — | — | — | — | — | — | — | — | — |

[1] [2] and [3] see footnotes to Table 1
[4] see footnote to Table 4

20% which is adequate for some applications. The solid or semisolid nature of the compositions of Run ff and Example 82 can be overcome by warming the dispersion and is not unexpected since the starting polyisocyanates are highly viscous or semisolid to begin with or tend to crystallize at temperatures, near room temperature, viz MDI. Runs gg through kk and oo utilized relatively high amounts acrylic acid. The composition of Run qq was not completely characterized since it was conducted for the purpose of preparing additional poly-

EXAMPLES 84 THROUGH 95

The procedures of Examples 1 through 8 were followed except that in place of acrylamide and acrylic acid the comonomers listed in Table 7 were used in the weight ratio of acrylonitrile to comonomer listed in Table 7 and the weight percent of total monomers shown in Table 7 were used. In Runs mm-1 and nn-1 and Examples 90 through 95 the seeding procedure was used as described in regard to Examples 1 through 8 except that the amounts of seed monomer and seed times given in Table 7 were used. In Runs oo1 and pp-1 and Examples 84 through 89, no seeding procedure was used. The monomer addition times and cook-out times and reaction flask sizes specified in Table 7 were used. The polyisocyanates used was I191 except in Example 85 in which I198D was used as the polyisocyanate. The product was analyzed and its properties were measured and the results are given in Table 7 below.

In each of the compositions of Examples 84 through 95 fair to good appearances resulted and moderate viscosities were obtained with the exception of Example 87 which resulted in a semisolid. The composition of Example 87 was made from about 28% monomer including the acrylonitrile and DVB and would probably result in a liquid composition if less DVB were used. The DVB does not appear to reduce particle size.

Runs mm-1 through pp-1 were made utilizing styrene producing very seedy materials because of the excessive solubility of styrene polymers in the polyisocyanate which promotes the growth of large particles.

TABLE 7

| Example (or Run) No. | mm-1 | nn-1 | oo-1 | pp-1 | 84 | 85 | 86 | 87 |
|---|---|---|---|---|---|---|---|---|
| Wt., % Monomers | 16 | 16 | 16 | 20 | 17 | 17.2 | 17.2 | 28 |
| Comonomer | S | S | S | S | DVB | DVB | DVB | DVB |
| Acrylonitrile/Comonomer Ratio | 70/30 | 90/10 | 95/5 | 95/5 | 97/3 | 97/3 | 96/4 | 96/4 |
| Seed Monomer (Wt., % of Reaction Mixture) | 2 | 2 | — | — | — | — | — | — |
| Seed Time (hr.) | 0.5 | 0.5 | — | — | — | — | — | — |
| Monomer Addition Time | 2 | 1 | 1.5 | 3 | 0.75 | 1 | 1 | 1 |
| Cookout Time (hr.) | 0.5 | 2 | 2 | — | 1.5 | 1.5 | 1.5 | 3 |
| Reaction Flask Size (ml) | 2,000 | 1,000 | 1,000 | 1,000 | 500 | 500 | 500 | 500 |
| Residual, Acrylonitrile[1] | — | — | — | — | 0.1 | 1.19 | 1.38 | 1.45 |
| Residual, Comonomer | — | — | — | — | — | — | — | — |
| Percent Conversion of Acrylonitrile[2] | — | — | — | — | 99 | 93 | 92 | 95 |
| Comonomer | — | — | — | — | 99 | 93 | 92 | 95 |
| Combined Monomers | — | — | — | — | 99 | 93 | 92 | 95 |
| Polymer Content[3] | — | — | — | — | 16.7 | 16.1 | 16.1 | 25.3 |
| Product Properties | | | | | | | | |
| Visual Inspection | very seedy | → | → | → | good | good | good | good |
| Hoeppler Viscosity at 25° C. | — | 3,500 | 3,100 | 10,000 | 1,193 | 994 | 1,519 | Semisolid |
| Filterability[4] | | | | | | | | |
| A 150 Mesh Screen | — | — | — | — | — | — | — | — |
| B 150 Mesh Screen | — | — | — | — | — | — | — | — |
| 325 Mesh Screen | — | — | — | — | — | — | — | — |
| 700 Mesh Screen | — | — | — | — | — | — | — | — |

| Example (or Run) No. | 88 | 89 | 90 | 91 | 92 | 93 | 94 | 95 |
|---|---|---|---|---|---|---|---|---|
| Wt., % Monomers | 22 | 22 | 22 | 20 | 20 | 21 | 23 | 23 |
| Comonomer | DVB | DVB | DVB | MAA | MAA | MAA | AA | AA |
| Acrylonitrile/Comonomer Ratio | 94/6 | 96/4 | 96/4 | 97/3 | 94/6 | 96/4 | 93/7 | 97/3 |
| Seed Monomer (Wt., % of Reaction Mixture) | — | — | 2.5 | 5 | 5 | 2 | 2 | 2 |
| Seed Time (hr.) | — | — | 0.5 | 0.5 | 0.5 | 0.5 | 0.5 | 0.5 |
| Monomer Addition Time | 1 | 1 | 1.5 | 1.0 | 1.0 | 3 | 3 | 3 |
| Cookout Time (hr.) | 2 | 2 | 2 | 2.0 | 2.0 | 2 | 2 | 2 |
| Reaction Flask Size (ml) | 500 | 500 | 2,000 | 500 | 500 | 3,000 | 3,000 | 3,000 |
| Residual, Acrylonitrile[1] | 1.5 | 1.36 | 0.1 | 1.40 | 2.14 | 2.53 | 2.0 | 2.0 |
| Residual, Comonomer | — | — | — | — | — | — | — | — |
| Percent Conversion of Acrylonitrile[2] | 93 | 94 | 99 | 93 | 89 | 87 | 91 | 91 |
| Comonomer | 93 | 94 | 99 | 93 | 89 | 87 | 91 | 91 |
| Combined Monomers | 93 | 94 | 99 | 93 | 89 | 87 | 91 | 91 |
| Polymer Content[3] | 20.2 | 20.9 | 21.9 | 19 | 18 | 19 | 21 | 21 |
| Product Properties | | | | | | | | |
| Visual inspection | good | good | ok | good | good | ok | ok | ok |
| Hoeppler Viscosity at 25° C. | 1,653 | 6,107 | 5,350 | 3,728 | 4,672 | 13,448 | 8,417 | 5,727 |
| Filterability[4] | | | | | | | | |
| A 150 Mesh Screen | — | — | — | — | — | 100 | — | — |
| B 150 Mesh Screen | — | — | — | — | — | — | 100 | 100 |
| 325 Mesh Screen | — | — | — | — | — | — | 7 | 1 |
| 700 Mesh Screen | — | — | — | — | — | — | — | — |

[1] [2] [3] see footnotes in Table 1
[4] see footnote in Table 4

EXAMPLES 96 AND 97

The continuous process procedures of Examples 9 through 11 were carried out utilizing the materials and conditions set forth in Table 8A below. The products obtained as a result of these Examples and Runs are given in Table 8B below.

The polymer/polyisocyanate dispersions produced in Examples 96 and 97 were highly stable and were characterized by desirably low viscosities. Runs qq through ss experienced difficulties because of temperature and pressure fluctuations and solids build-up in the reactor. In fact, in Run qq the reactor became plugged.

TABLE 8

| Example (or Run) No. | qq | rr | ss | 96 | 97 |
|---|---|---|---|---|---|
| Polyisocyanate | I191 | I191 | I191 | I191 | I143-L |
| Ratio Acrylonitrile/Second Monomer | 100/0 | 100/0 | 94/6 | 94/6 | 94/6 |
| Second Monomer | None | None | Acrylamide[7] | Acrylic Acid[8] | Acrylic Acid[8] |
| Acrylonitrile Distilled | No | No | Yes | No | No |
| Feed Stream Containing VAZO 64 | Monomer | Monomer | Isocyanate | Isocyanate | Isocyanate |
| Isocyanate Filtration[5] | None | 150-M. | 150-M., B.C. | 150-M., B.C. | 200-M., A.C. |
| Start-up, Procedure used[6] | Lab. | Lab. | Plant | Plant | Plant |
| Time Isocyanate Fed Before Start Of Monomers, Min. | — | — | 69 | 63 | 56 |
| Reactor Temperature When Monomers Started, °C. | 135 | 113 | 126 | 126 | 127 |
| Initial Monomer Conc., Wt., % Of Total Feed | 17.5 | 15.9 | 14.3 | 12.0 | 17.8 |
| No. Of Monomer Flow Increases To Reach Run Conc. | 1 | 0 | 4 | 5 | 5 |
| Time, Start Of Monomer Feed To Start Of Line-Out, Min. | 27 | 20 | 33 | 35 | 39 |

| Sample Period, Hrs. After Start Of Line-Out | 0.25 to 0.75 | 0.75 to 1.25 | 1.50 to 2.25 | 2.25 to 3.00 | 1.25 to 3.25 | 1.50 to 3.75 | 3.75 to 5.00 | 1.50 to 3.82 | 3.82 to 5.00 |
|---|---|---|---|---|---|---|---|---|---|
| Avg. Isocyanate (+ Catalyst) Feed Rate, gm/hr | 2194 | 2214 | 1451 | 1472 | 1456 | 1480 | 1492 | 1453 | 1547 |
| Avg. Monomer Mix (+ Catalyst) Feed Rate, gm/hr | 564 | 516 | 283 | 289 | 352 | 406 | 406 | 401 | 401 |
| Avg. Product Rate, gm/hr | 2750 | 2715 | 1740 | 1744 | 1803 | 1887 | 1883 | 1850 | 1948 |
| Avg. Residence Time, min. | 12.0 | 12.1 | 19.0 | 18.7 | 18.0 | 17.5 | 17.4 | 17.8 | 16.9 |
| Total Monomer Conc., Wt. % Of Total Feed | 20.45 | 18.78 | 16.31 | 16.43 | 19.26 | 21.53 | 21.39 | 21.63 | 20.59 |
| Azo Catalyst Conc., Wt. % of Total Feed | 1.05 | 0.96 | 1.10 | 1.11 | 1.00 | 0.99 | 0.99 | 1.00 | 1.01 |
| Avg. Reaction Temperature, °C. | 119 | 120 | 111 | 111 | 124.7 | 125.6 | 124.7 | 125.0 | 125.7 |
| Material Balance, Wt. % | 99.7 | 99.6 | 101.0 | 99.0 | 98.6 | 100.1 | 99.2 | 99.8 | 100.0 |
| Unreacted Acrylonitrile in Product, Wt. %[1] | 2.75 | 4.36 | 3.45 | 2.90 | 4.12 | 5.29 | 5.38 | 4.71 | 5.53 |
| Unreacted Second Monomer in Product, Wt. %[1] | — | — | — | — | 0.26 | 0.32 | 0.32 | 0.28 | 0.33 |
| Acrylonitrile Conversion, Wt. %[2] | 85.9 | 75.6 | 77.2 | 81.3 | 77.5 | 73.8 | 73.5 | 76.9 | 71.4 |
| Reaction Performance Comments | Reactor plugged 72 min. after start of line-out | | Wide temp. & press. fluctuations, significant solids build-up in reactor | | Temp. & press. fluctuations, some solids build-up in reactor | Control good, reactor clean | | Control good, reactor clean | |

| Example (or Run) No. | qq-1 | qq-2 | rr-1 | rr-2 | ss | 96-1 | 96-2 | 97-1 | 97-2 |
|---|---|---|---|---|---|---|---|---|---|
| Sample Period, Hrs. After Start of Line-Out | 0.25 to 0.75 | 0.75 to 1.25 | 1.50 to 2.25 | 2.25 to 3.00 | 1.25 to 3.25 | 1.50 to 3.75 | 3.75 to 5.00 | 1.50 to 3.82 | 3.82 to 5.00 |
| Stripping Conditions, Approx. Temperature, °C. | 130 | 130 | 130 | 130 | 130 | 60 | 60 | 60 | 60 |
| Stripping Conditions, Approx. Time, Hrs. | 1.08 | 1.08 | 1.08 | 1.25 | 2.0 | 9.0 | 6.0 | 4.0 | 4.0 |
| Polyacrylonitrile, Calc., Wt. % | 17.15 | 14.1 | 12.2 | 12.8 | 14.68 | 15.84 | 15.67 | 16.46 | 14.69 |
| Polymer of Second Monomer, Calc., Wt. %[3] | — | — | — | — | 0.94 | 1.01 | 1.00 | 1.05 | 0.94 |
| Total Polymer, Wt. %[3] | 17.15[1] | 14.1[1] | 12.2 | 12.8 | 15.62 | 16.85 | 16.67 | 17.51 | 15.63 |
| Hoeppler Viscosity at 25° C., cps | 8,434 | 8,092 | 1,253 | 1,710 | 9,000 | — | 217 | — | 115 |
| Free NCO, Measured, % | 24.82 | 25.74 | — | — | — | — | 24.04 | — | 23.92 |
| Calculated % | 24.7 | 24.4 | 26.3 | 26.1 | 25.40 | 25.03 | 25.08 | 24.43 | 24.98 |
| Filtration Hindrance | | | | | | | | | |
| 2/1 Dilution, Diluent | I191 | I191 | I191 | I191 | — | Dioxane | I191 | Dioxane | I143-L |
| 150-Mesh, Time to see screen, sec. | >1200 | >1200 | >1200 | >1200 | — | 15 | 30 | 10 | 17 |
| % through | 8.3 | 2.5 | 8.7 | 2.2 | — | 100 | 100 | 100 | 100 |
| 325-Mesh, Time to see screen, sec. | — | — | — | — | — | 15 | 180 | 20 | >1200 |
| % through | — | — | — | — | — | 100 | 100 | 100 | 37 |
| 700-Mesh, Time to see screen, sec. | >1200 | — | — | >1200 | — | 40 | 600 | >1200 | — |
| % through | 8 | — | — | 0.6 | — | 100 | 100 | 31 | — |
| Centrifugible Solids, Top Layer, Vol., % | 87 | 86 | 72 | 74 | — | 1 | — | 25 | |
| Second Layer From Top., Vol., % | 6 | 5 | 18 | 16 | — | 88 | — | 63 | |
| Third Layer From Top., Vol., % | — | — | — | — | — | 2 | — | 4 | |
| Bottom Layer, Vol., % | 7 | 9 | 10 | 10 | — | 9 | — | 8 | |

(1) (2) (3) see footnotes in Table 1
[5] Isocyanate was filtered through 150-mesh screen (150-M) either before catalyst dissolution (B.C.) or after catalyst dissolution (A.C.)
[6] In the "Lab" procedure the reactor is filled with the polyisocyanate, heated to a temperature above reaction temperature, and then both the polyisocyanate and monomer/catalyst feeds are started simultaneously. In the "Plant" procedure the reactor is heated while the polyisocyanate/catalyst is continuously pumped. When the temperature is slightly above reaction temperature, the monomer feed is started.
[7] Monomer mix containing the acrylonitrile and acrylamide was passed through filter paper.
[8] Freshly distilled and inhibited acrylic acid.

EXAMPLES 98 THROUGH 107

The procedures of Examples 1 through 8 were used in these Examples utilizing the reaction temperature, catalyst amounts and acrylonitrile monomer amounts set forth in Table 9 below. No comonomers were used in these Examples. In each case, the seeding procedure of Examples 1 through 8 was used except that 2.3 weight percent of acrylonitrile was used as the seed monomer, the seeding time was one hour, the monomer addition time for the remaining monomers was two hours and the cook-out time was also two hours at the reaction temperatures given. The resulting products were analyzed and their properties are given in Table 9 below.

The compositions produced by these Examples were also tested for shelf stability by permitting them to stand on the shelf and observing whether or not any layering had occurred after extended periods. It was found that none of these compositions layered or exhibited any other sign of gross instability after standing four months on the shelf. Glass slide films were somewhat grainy and not smooth and electron micrographs showed these compositions to have a large, non-spherical particles and a broad particle size distribution range.

EXAMPLES 108 THROUGH 127

The procedures of Examples 1 through 8 were used in these Examples wherein, however, TBPO was used in Examples 108 and 109 in amounts of 1.7 and 2 weight percent, respectively. The amounts of acrylonitrile monomer employed are listed as well as the other reaction conditions and product properties. In Examples 108 and 111 the seeding procedure was not used. The properties of the resulting products were determined and set forth in Table 10 below.

The compositions of these Examples were tested for shelf stability by allowing them to stand on the shelf for extended periods of time observing the compositions to determine whether or not any layering had occurred or any signs of instability had arisen. The compositions of Examples 108, 111, 112, 114, 115, 117, 120 and 121 showed good shelf stability, i.e., there was no layering or any other sign of instability after standing for a period of four months.

The compositions produced by Examples 109, 110, 113, 116, 118, 119 and 122–127 had fair shelf stability, i.e., no layering occurred for four months at which time a very slight amount of layering began to occur.

None of the compositions of these Examples displayed any gross instability on standing, although glass slide films were somewhat grainy and not smooth. Electron micrographs showed these compositions to have relatively large, non-spherical particles and a relatively broad particle size distribution range.

TABLE 9

|  | Example No. | | | | | | | | | |
| --- | --- | --- | --- | --- | --- | --- | --- | --- | --- | --- |
|  | 98 | 99 | 100 | 101 | 102 | 103 | 104 | 105 | 106 | 107 |
| Reaction Temperature | 90 | 90 | 90 | 90 | 110 | 110 | 110 | 110 | 110 | 110 |
| Wt. % VAZO-64 | 0.5 | 0.5 | 1 | 1 | 0.5 | 0.5 | 0.5 | 1 | 1 | 1 |
| Wt. % Acrylonitrile Monomer | 18 | 23 | 18 | 23 | 18 | 23 | 23 | 18 | 18 | 23 |
| Residual Acrylonitrile[1] | 1.59 | 2.31 | 0.1 | 0.81 | 2.92 | — | 3.10 | — | 1.75 | 1.85 |
| Percent Conversion, Acrylonitrile[2] | 91.2 | 90.0 | 99.5 | 96.5 | 83.8 | — | 86.5 | — | 90.3 | 92.0 |
| Polymer Content[3] | 16.7 | 21.2 | 17.9 | 22.4 | 15.5 | — | 20.5 | — | 16.5 | 21.5 |
| Free NCO | 24.4 | 22.8 | 24.1 | 22.3 | 24.8 | 23.3 | 23.3 | — | — | 22.7 |
| Polymer Content[4] | 19.3 | 24.6 | 20.3 | 26.3 | 18.0 | 23.0 | 23.0 | — | — | 24.9 |
| Product Properties | | | | | | | | | | |
| Visual Inspection | fair | fair | ok | good | good | fair | fair | fair | ok | ok |
| Shelf Stability | good | good | good | good | good | good | good | good | good | good |
| Brookfield Viscosity at 25° C. | 3,750 | — | 1,160 | 5,806 | 2,616 | 3,050 | — | 3,050 | — | 6,800 |
| Hoeppler Viscosity at 45° C. | 1,186 | 1,668 | 482 | 1,794 | 771 | 1,038 | — | 667 | — | 1,504 |

[1] [2] [3] see footnotes in Table 1
[4] These polymer contents were calculated from reduction in free NCO of polymer/isocyanate.

TABLE 10

| | 108 | 109 | 110 | 111 | 112 | 113 | 114 | 115 | 116 | 117 | 118 | 119 | 120 | 121 | 122 | 123 | 124 | 125 | 126 | 127 |
|---|---|---|---|---|---|---|---|---|---|---|---|---|---|---|---|---|---|---|---|---|
| Catalyst | TBPO | TBPO | VAZO-64 | → | → | → | → | → | → | → | VAZO-64 | → | → | → | → | → | → | → | → | → |
| Wt. % Catalyst | 1.7 | 2 | 1 | 1 | 1 | 1 | 1 | 1 | 1 | 1 | 1 | 1 | 1 | 1 | 1 | 1 | 1 | 1 | 1 | 1 |
| Wt. % Acrylonitrile Monomer | 11 | 16 | 16 | 21 | 22 | 22 | 19 | 19 | 18 | 23 | 26 | 29 | 8 | 13 | 31 | 34 | 18 | 23 | 26 | 29 |
| Seed Monomer (grass) | — | 16 | 25 | — | 20 | 20 | 20 | 20 | 30 | 30 | 30 | 30 | 30 | 30 | 30 | 30 | 24 | 24 | 24 | 24 |
| Seed Monomer, Wt. % | | | | | | | | | | | | | | | | | | | | |
| Reaction Mixture | | | | | | | | | | | | | | | | | | | | |
| Seed Time (hr.) | 1.6 | 1.6 | 2 | — | 2 | 2 | 2 | 2 | 3 | 3 | 4 | 4 | 3 | 3 | 4 | 4 | 2.4 | 2.4 | 3.4 | 3.4 |
| Monomer Addition Time (hr.) | ¾ | ¾ | ¾ | — | ¾ | ¾ | ¾ | ¼ | 1 | 1 | 1 | 1 | 1 | 1 | 1 | 1 | 1 | 1 | 1 | 1 |
| Cookout Time (hr.) | 2¼ | 2¼ | 3 | 3 | 3¼ | 3¼ | ¼ | ¼ | 2 | 2 | 3 | 3 | 1 | 3 | 3 | 3 | 2 | 2 | 3 | 3 |
| Reaction Flask Size (ml) | 4 | 4 | 3 | 2 | 2 | 2 | ¼ | ¼ | 2 | 2 | 2 | 2 | 2 | 2 | 2 | 2 | 2 | 2 | 2 | 2 |
| Residual Acrylonitrile Monomer[1] | 1,000 | 2,000 | 2,000 | 2,000 | 500 | 3,000 | 3,000 | 3,000 | 3,000 | 3,000 | 3,000 | 3,000 | 3,000 | 3,000 | 3,000 | 3,000 | 3,000 | 3,000 | 3,000 | 3,000 |
| Percent Conversion of Acrylonitrile[2] | 2.73 | 1.87 | — | — | 2.31 | 1.26 | 1.31 | 0.1 | 0.1 | 0.81 | 1.5 | 1.79 | 0.84 | 1.10 | 1.64 | 1.10 | 1.17 | 0.99 | 1.04 | 1.42 |
| Polymer Content, Monomer Analysis[3] | 82 | 88.3 | — | — | 90.4 | 98.7 | 98.7 | 99.5 | 99.4 | 96.5 | 94.2 | 93.8 | 89.5 | 91.5 | 94.7 | 96.8 | 93.5 | 95.7 | 96.0 | 95.0 |
| Free NCO Content (calc.) | 14.0 | 14.0 | — | — | 20.3 | 21.8 | 18.9 | 18.9 | 17.9 | 22.4 | 24.5 | 27.2 | 7.2 | 11.9 | 29.8 | 33.5 | 17.0 | 22.2 | 25.2 | 28 |
| Free NCO Content (measured) | 25.8 | 25.8 | — | — | 23.9 | 23.5 | 24.3 | 24.3 | 24.6 | 23.3 | 22.6 | 21.8 | 27.8 | 26.4 | 21.1 | 19.9 | 24.9 | 23.3 | 22.4 | 21.6 |
| Polymer Content (Base Free) | — | — | — | — | — | 22.24 | — | 23.12 | 24.1 | 22.3 | 21.61 | 20.64 | 27.18 | 25.54 | 19.4 | 19.0 | 24.1 | 22.5 | 21.4 | 20.2 |
| NCO reduction | — | — | — | — | — | 26.4 | — | 23.5 | 20.3 | 26.2 | 28.5 | 31.7 | 10.1 | 15.5 | 36.0 | 37.2 | 19.7 | 25 | 28.7 | 32 |
| Products Properties | | | | | | | | | | | | | | | | | | | | |
| Visual Inspection | good | good | good | good | good | ok | ok | ok | ok | good | ok | ok | good | good | ok | ok | good | ok | ok | ok |
| Shelf Stability (4 mos.) | good | ok | ok | good | good | ok | good | good | ok | good | ok | ok | good | good | ok | ok | ok | ok | ok | ok |
| Brookfield Viscosity at 25° C. | — | 3,400 | 4,200 | 4,200 | — | — | 2,772 | — | 1,160 | — | — | — | — | 2,580 | — | — | — | — | — | — |
| Hoeppler Viscosity | | | | | | | | | | | | | | | | | | | | |
| at 25° C. | — | — | — | 3,700 | 3,639 | 3,207 | — | 3,854 | — | — | 2,387 | 4,250 | 310 | — | 11,378 | 13,038 | 1,254 | 4,240 | 4,336 | — |
| at 45° C. | — | — | — | 1,300 | 1,230 | 1,190 | — | 1,200 | 482 | 1,794 | 949 | 2,350 | — | — | 3,239 | 3,788 | 497 | 1,497 | 1,460 | — |
| at 65° C. | — | — | — | 500 | 686 | 519 | — | 519 | — | — | 540 | 1,171 | — | — | 1,150 | 1,395 | 240 | 670 | 660 | — |

[1] [2] [3] see footnotes to Table 1

EXAMPLES 128 AND 129

The procedures of Examples 1 through 8 were carried out with the exception that acrylonitrile was the only monomer used and it was used in the amount specified in Table 11 below. The weight percent of seed acrylonitrile and seed times as well as time for the addition of the remaining monomer and the cook-out times are also specified in Table 11. The products were analyzed and the product properties are given in Table 11.

The compositions produced by Examples 128 and 129 were quite stable and had low viscosities. Runs tt through xx produced compositions that are useful in the production of increased flex modulus polyurethanes even though the filterability was relatively low; for example, Run uu was found to provide a high flex modulus polyurethane when reacted with an active hydrogen organic compound having two or more active hydrogen groups.

Various properties of the resulting products were measured and the results are given in Table 12.

The compositions of Examples 130 through 132 are stable dispersions which are useful in the production of high flex modulus polyurethane foams. Run yy was made with I181 which is a prepolymer MDI which tends to be solid or highly viscous at or near room temperature and heating of the composition produced in this Run probably would render it fluid suitable for use in polyurethane manufacture. In Runs zz through ccc the low filterabilities probably result from the shorter monomer addition times which could result in larger polymer particles or agglomerates thereof. A further slowing of the monomer addition time could improve the filterability and provide useful stable dispersions. Example H is clearly unsuitable because of its poor appearance indicating the occurrence of extensive layering as well as low filterability. Examples J and K illustrate the inability of small amounts of other surfac-

TABLE 11

| Example No. | tt | uu | vv | ww | xx | 128 | 129 |
|---|---|---|---|---|---|---|---|
| Reaction Temperature | 90 | 90 | 90 | 90 | 90 | 90 | 90 |
| Wt. % A | 19 | 21 | 21 | 26 | 23 | 23 | 23 |
| Wt. % Seed Monomers | 4 | 4 | 2 | 2 | 4 | 2 | 2 |
| Seed Time (hr.) | 0.5 | 0.5 | 0.5 | 0.5 | 0.5 | 0.5 | 0.5 |
| Monomer Addition Time (hr.) | 2 | 2 | 3 | 3 | 3 | 3 | 3 |
| Cookout Time (hr.) | 2.0 | 2.5 | 2 | 2 | 2 | 2 | 2 |
| Residual, Acrylonitrile (1) | — | 1.14 | 1.59 | 2.2 | 3.2 | 1.7 | 1.39 |
| % Conversion of Acrylonitrile (2) | — | 94.6 | 92.4 | 92 | 86 | 93 | 94 |
| % Polymer Content (3) | ~18 | 20 | 20 | 24 | 20 | 22 | 22 |
| Free NCO (calculated) | 24.6 | 24 | 24 | 22.8 | 24 | 23.4 | 23.4 |
| Free NCO (measured) | 22.4 | — | — | — | — | — | 22.4 |
| Polymer Properties | | | | | | | |
| Visual Inspection | ok | ok | good | good | ok | ok | ok |
| Hoeppler Viscosity at 25° C. (cps) | 3,936 | 3,000 | 3,803 | 2,189 | 2,580 | 580 | 2,854 |
| Filterability (4) | | | | | | | |
| A 150 Mesh Screen, % thru | 66 | 7 | 89 | 76 | 20 | — | — |
| B 150 Mesh Screen | — | — | 100 | 100 | 21 | 100 | 100 |
| 325 Mesh Screen | — | — | 81 | 24 | — | 1 | 2 |
| 200 Mesh Screen | — | — | — | — | — | — | — |

(1) (2) (3) see footnotes to Table 1
(4) see footnote (4) to Table 4

EXAMPLES 130 THROUGH 132

The procedures of Examples 1 through 8 were used except that acrylonitrile was the only monomer used and the polyisocyanates as listed in Table 12 below were employed. The amounts of acrylonitrile and various other process conditions are given in Table 12.

tants in addition to polyacrylonitrile formed in situ in TDI to provide dispersions of adequate filterability. Runs ddd and eee and Example I were incompletely characterized as to filterability and Runs fff and ggg contained relatively high amounts of polyacrylonitrile for that system.

TABLE 12

| Example No. or Run | 130 | yy | 131 | 132 | zz | aaa | bbb | ccc |
|---|---|---|---|---|---|---|---|---|
| Polyisocyanate | I191 | I181 | I191 | I191 | I191 | I143L | I143L | I191 |
| Wt. % Monomer | 23 | 20 | 29 | 25 | 23 | 23 | 22 | 21 |
| Monomer Purification | None | → | → | → | RD | RD | None | None |
| Wt. % Seed | 3 | → | → | → | → | → | → | → |
| Seed Time (hr.) | ½ | → | → | → | → | → | → | → |
| Monomer Addition Time, hr. | 4 | 4 | 4 | 4 | 3 | 3 | 3 | 3 |
| Reaction Flask Size, ml | 3,000 | → | → | → | 3,000 | → | → | → |
| Residual Acrylonitrile (1) | 3.7 | 3.0 | 4.5 | 4.0 | 0 | 1.54 | 1.73 | 2.26 |
| Total Grams of Product | 1,500 | 2,000 | 1,500 | 1,400 | 700 | 700 | 700 | 700 |
| Conversion of Acrylonitrile, Wt. % (2) | 84 | 85 | 84 | 84 | — | 94 | 92 | 89 |
| Polymer Content, Wt. % (3) | 20 | 18 | 26 | 22 | — | 22 | 22 | 19 |
| % Free NCO, Measured | 21.79 | — | 19.95 | 21.56 | — | — | — | — |
| % Free NCO, Calculated | 24.08 | — | 22.3 | 23.5 | — | 23.0 | 23.0 | 24.4 |
| Polymer/Isocyanate Properties | | | | | | | | |
| Visual Inspection | ok | poor | ok | ok | ok | ok | ok | ok |
| Brookfield Vis. at 25° C. | 3,391 | semisolid | 1,924 | 15,751 | 2,266 | 3,169 | 2,536 | 6,648 |
| Filterability (4) | | | | | | | | |
| 150 Mesh | 100 | — | 100 | 100 | 3 | 37 | 3 | 3 |
| 325 Mesh | 100 | — | 3 | 100 | — | — | — | — |
| 700 Mesh | 3 | — | — | — | — | — | — | — |

TABLE 12-continued

| Example No. or Run | ddd | H | I | J | K | eee | fff | ggg |
|---|---|---|---|---|---|---|---|---|
| Polyisocyanate | I191 | TDI | I58 | I11 | I191 | I9 | I10 | |
| Wt. % Monomer | 17 | 21 | 17 | 21 | 21 | 10 | 25 | 25 |
| Monomer Purification | RD | None | → | → | → | → | → | → |
| Wt. % Seed | 3 | → | → | → | → | 2 | 1 | 2 |
| Seed Time (hr.) | ½ | → | → | → | → | → | → | → |
| Monomer Addition Time, hr. | 3 | 3 | 2½ | 3 | 3 | 2 | 1 | 2 |
| Reaction Flask Size, ml | 3000 | → | → | → | → | → | 500 | 500 |
| Residual Acrylonitrile (1) | 1.76 | 0.63 | — | 0.43 | 0.72 | 2.73 | — | — |
| Total Grams of Product | 1,000 | 1,010 | 1,010 | 1,010 | 1,010 | 1,000 | 250 | 250 |
| Conversion of Acrylonitrile Wt. % (2) | 90 | 97 | — | 98 | 70 | — | — | — |
| Polymer Content, Wt. % (3) | 16 | 20 | — | 20 | 20 | 7.5 | — | — |
| % Free NCO, Measured | 24.85 | 36.91 | — | 29.98 | 29.55 | 26.7 | — | — |
| % Free NCO, Calculated | 25.3 | 38.48 | — | 31.1 | 31.1 | 37.8 | — | — |
| Polymer/Isocyanate Properties | | | | | | | | |
| Visual Inspection | ok | poor | ok | good | good | good | poor | poor |
| Brookfield Vis. at 25° C. | 2,100 | 1,200 | v.viscous | 5,080 | 7,800 | 1,352 | semisolid | semisolid |
| Filterability (4) | | | | | | | | |
| 150 Mesh | — | 9 | — | — | 98 | — | — | — |
| 325 Mesh | — | — | — | — | — | — | — | — |
| 700 Mesh | — | — | — | — | — | — | — | — |

(1), (2), (3) and (4) Same as in Table 4.

EXAMPLES 133 THROUGH 140

These Examples illustrate the production of polymer/polyisocyanate compositions of improved stability and high quality from a polyisocyanate blend, I58, containing 80 pbw TDI and 30 pbw MDI by means of ethylenically unsaturated copolymer precursors.

The ethylenically unsaturated copolymeric precursors, CP-1 through CP-4 used in the production of polymer/polyisocyanate compositions of these and subsequent Examples were prepared. In each of the preparations of CP-1 through CP-4, 350 g of toluene were heated to 100° C. in a flask equipped with a condenser and a monomer mixture containing 2.5 g of VAZO-64 and 150 g of a mixture of methyl methacrylate and allyl acrylate in the respective ratios given in Table 13 below was slowly added to the toluene through a dropping funnel over a period of one hour with continuous stirring of the mixture. After completion of addition of the monomer mixture, the resulting reaction mixture was stirred and held at 100° C. for an additional two hours. Total solids of copolymeric precursor was determined by removal of toluene and unreacted monomers by heating at 100° C. in a forced air oven for 16 hours. Monomer conversions were calculated and are given with the total solids contents in Table 13. The number average molecular weights and weight average molecular weights were estimated using GPC based on polystyrene standards and are given in Table 13.

TABLE 13

| | CP-1 | CP-2 | CP-3 | CP-4 |
|---|---|---|---|---|
| Precursor | | | | |
| Monomer Content, wt. % | 30 | 30 | 30 | 30 |
| Methyl Methacrylate/Allyl Acrylate Ratio | 98/2 | 96/4 | 96/4 | 94/6 |
| Total Solids | 28.5 | 27.5 | 27.5 | 28.1 |
| Monomer Conversion (wt. %) | 95 | 91.7 | 91.7 | 93.7 |
| Polymer | | | | |
| GPC Analysis (polystyrene standards) | | | | |
| $M_n$ | 5,600 | 5,400 | 5,300 | 5,700 |
| $M_w$ | 17,100 | 19,800 | 19,300 | 24,500 |

In the preparation of the polymer/polyisocyanate compositions the procedures of Examples 1-8 were followed using however the types and amounts of materials and process conditions noted in Table 14. In all cases 1% catalyst and 21% total monomers were used (base on the total weight of monomers and polyisocyanate). In Examples 135–140 and Runs iii and jjj, all of the precursor was added to the polyisocyanate before addition and polymerization of the monomers. In Examples 138–140 and Run jjj no seeding was employed. In Examples 134–140 and Run jjj the toluene added to polyisocyanate I58 with the precursor was stripped out before so that substantially no vinyl polymerization occurred in the presence of toluene.

The materials produced in Examples L-R were unstable because the vinyl polymerization was conducted in the absence of an ethylenically unsaturated copolymeric precursor. The materials produced by Examples S-V were unstable because the vinyl polymerizations were carried out in the presence of toluene which is less of a solvent for the vinyl polymer than the polyisocyanates thus lessening the stability.

Examples 133 and 140 and Run hhh illustrate the effect of a peroxide catalyst LU-11 which favors more grafting which in turn improves the stability to the extent that the de-stabilizing effects of toluene are overcome. Run iii resulted in a gel because, it is believed that the amount of allyl acrylate polymerized in the precursor was sufficient to crosslink and gel the mixture. This was overcome in Example 137 by using the same amount of precursor which contained a smaller amount of polymerized allyl acrylate.

Examples 133–140 illustrate the preparation of dispersions of improved stability and high quality from polyisocyanate mixtures containing very large amounts of TDI.

TABLE 14

| Example No. or Run | L | M | N | O | P | Q | R | S | T | U | V |
|---|---|---|---|---|---|---|---|---|---|---|---|
| Reaction Temperature, °C. | 90 | 90 | 60 | 120 | 70 | 70 | 70 | 70 | 70 | 70 | 70 |
| Catalyst (VAZO)* | 64 | 64 | 52 | 52 | 64 | 52 | → | → | → | → | → |

TABLE 14-continued

| Example No. or Run | | | | | | | | | | | |
|---|---|---|---|---|---|---|---|---|---|---|---|
| Wt. % Catalyst | 1 | → | → | → | → | → | → | → | → | → | → |
| Wt. % Monomer(s) | 21 | → | → | → | → | → | → | → | → | → | → |
| Comonomer | — | AM | — | AM | — | — | AM | — | AM | — | AM |
| Ratio, Acrylonitrile/Comonomer | | 96/4 | | 96/4 | | | 96/4 | | 96/4 | | 96/4 |
| Precursor | None | → | → | → | → | → | → | CP-2 | CP-2 | CP-1 | CP-1 |
| Wt. % | — | — | — | — | — | — | — | 2 | 2 | 2 | 2 |
| Monomer Ratio, MMA/Al | | | | | | | | 96/4 | 96/4 | 98/2 | 98/2 |
| Seed Time (hr.) | ½ | → | → | → | → | → | → | → | → | → | → |
| Monomer Addition Time | 3 | 3½ | 4 | 4 | 3 | 4 | 4 | 4 | 4 | 4 | 4 |
| Residual Acrylonitrile (1) | 1.14 | 1.32 | 0.46 | 0.56 | — | 0.98 | — | | | | |
| Residual Acrylamide (1) | | | | | | | | | | | |
| % Conversion Acrylonitrile (2) | 94.6 | 93.7 | 97.8 | | | 95.3 | | | | | |
| % Conversion Acrylamide | | | | | | | | | | | |
| Total Conversion Monomers | 94.6 | 93.7 | 97.8 | | | 95.3 | | | | | |
| % Polymer Content (3) | 20.1 | 19.9 | 20.5 | | | 20.2 | | | | | |
| % Free NCO, Measured | — | — | — | — | — | 32.86 | 32.47 | — | — | 32.8 | 32.0 |
| % Free NCO, Calculated | | | | | | 35.7 | | | | | |
| Δ Free NCO | | | | | | 2.8 | | | | | |
| Polymer/Isocyanate Properties | | | | | | | | | | | |
| Visual Inspection, immediately | fair | fair | good | good | fair | good | good | good | good | fair | fair |
| Visual Inspection, standing | us/l | us/l | us/l | us/l | us/l | us/l | us/l | us/l | us | us/l | us/l |
| Film Appearance on Glass Slide | sl/gr | gr | sm/gl | sm/gl | gr | sm/gl | gr | gr | sl/gr | sl/sd | sd |
| Brookfield Viscosity at 25° C. | 800 | 570 | 1157 | 2950 | 2000 | 1472 | 1112 | 2056 | 564 | 1340 | 1182 |
| Filterability (4) | | | | | | | | | | | |
| 150 Mesh Screen | 100 | 74 | 100 | 100 | 94 | 100 | 26 | 100 | 100 | 76 | 84 |
| 325 Mesh Screen | 2 | 0 | 73 | 81 | 0 | 34 | — | 84 | 100 | 17 | 15 |
| 700 Mesh Screen | | | | | | | | | | | |

| Example No. or Run | 133 | hhh | 134 | 135 | 136 | iii | 137 | 138 | 139 | 140 | jjj |
|---|---|---|---|---|---|---|---|---|---|---|---|
| Reaction Temperature, °C. | 70 | 70 | 70 | 70 | 70 | 70 | 70 | 70 | 70 | 70 | 90 |
| Catalyst (VAZO)* | LU-11 | LU-11 | 52 | → | → | → | → | → | → | LU-11 | 64 |
| Wt. % Catalyst | 1 | → | → | → | → | → | → | → | → | → | → |
| Wt. % Monomer(s) | 21 | → | → | → | → | → | → | → | → | → | → |
| Comonomer | — | AM | AM | AM | — | — | — | — | — | — | — |
| Ratio, Acrylonitrile/Comonomer | | 96/4 | 96/4 | 96/4 | | | | | | | |
| Precursor | None | None | CP-2 | CP-2 | CP-4 | CP-4 | CP-3 | CP-4 | CP-4 | CP-3 | CP-3 |
| Wt. % | — | — | 2 | 2 | 2 | 4 | 4 | | | 2 | 2 |
| Monomer Ratio, MMA/Al | | | 94/4 | 96/4 | 94/6 | 94/6 | 96/4 | 94/6 | 94/6 | 96/4 | 96/4 |
| Seed Time (hr.) | ½ | → | → | → | → | → | → | 0 | 0 | 0 | 0 |
| Monomer Addition Time | 4 | 4 | 4 | 4 | 4 | 4 | 4 | 4 | 4 | 3.5 | 3.5 |
| Residual Acrylonitrile (1) | 1.75 | 3.38 | — | — | — | — | — | | | 3 | — |
| Residual Acrylamide (1) | | | | | | | | | | | |
| % Conversion Acrylonitrile (2) | 91.6 | 83.9 | | | | | | | | | |
| % Conversion Acrylamide | | | | | | | | | | | |
| Total Conversion Monomers | 91.6 | 83.9 | | | | | | | | | |
| % Polymer Content (3) | 19.5 | 18.2 | | | | | | | | | |
| % Free NCO, Measured | 32.95 | 32.7 | | | | | | | | | |
| % Free NCO, Calculated | 36.0 | 36.2 | 32.2 | 32.14 | — | — | — | 32.49 | — | | |
| Δ Free NCO | 3.0 | 3.5 | | | | | | | | | |
| Polymer/Isocyanate Properties | | | | | | | | | | | |
| Visual Inspection, immediately | good | good | good | good | good | gelled | good | good | good | good | good |
| Visual Inspection, standing | ok/sl | good/sl | good/sl | good/sl | good/sl | | good/sl | good/sl | good/sl | good/sl | good/sl |
| Film Appearance on Glass Slide | sm/gl | sd | sm/gl | sm/gl | sm/gl | | sl/sd | sm/gl | sm/gl | sm/gl | gr/sd |
| Brookfield Viscosity at 25° C. | 910 | 2600 | 390 | 668 | 350 | | 202 | 286 | — | 390 | 177 |
| Filterability (4) | | | | | | | | | | | |
| 150 Mesh Screen | 100 | 100 | 100 | 100 | 100 | 100 | 100 | 100 | 100 | 100 | 100 |
| 325 Mesh Screen | 11 | 35 | 36 | 100 | 7 | | 69 | 8 | 60 | 26 | 1 |
| 700 Mesh Screen | | | | 62 | | | | | | | |

*Except Ex. 133 and 140 and hhh where LU-11 was used
(1) (2) and (3) same as in Table 1
(4) The polymer/isocyanate was diluted with dioxone (200 g polymer/isocyanate to 400 g dioxane) and filtered successively through 150, 325 and 700 mesh screens.
(5) Abbreviations:
us/l = unstable with a layer of isocyanate at the bottom
sl = small layer at bottom
sl/gr = slightly grainy
gr = grainy
sm/gl = smooth, glossy
sl/sd = slightly seedy
sd = seedy
gr/sd = grainy and seedy

EXAMPLES 141 AND 142

In each of these Examples, the procedure of Example 138 was followed in which a 70/30 mixture of acrylonitrile (294 g) and vinylidene chloride (126 g) and VAZO-52 (20 g) catalyst was added dropwise to polyisocyanate I58 over a period of four hours while maintaining the reaction mixture at 70° C. The amount of monomers used was 21% and the amount of catalyst was 1% based on the total weight of monomers and polyisocyanate. In Example 142, however, 2% of precursor CP-4 was mixed with the polyisocyanate before the addition of the monomer-catalyst mixture. In Example 141, 246 grams and, in Example 142, 206 grams, of the monomer-catalyst mixture was not fed due to the development of a precipitant in the mixture. After completion of the addition, the respective reaction mixtures were cooked out and worked up in the manner disclosed in Examples 1–8. Properties of the resulting polymer/polyisocyanate compositions are given in Table 15.

TABLE 15

| Example No. | 141 | 142 |
|---|---|---|
| % FNCO | 35.1 | 34.52 |
| Visual Inspection | Good | Good |
| Visual Inspection, Standing | Good/sl | Good/sl |
| Film Appearance on Glass Slide | sm/gl | sm/gl |
| Brookfield viscosity, 25° C. | 2000 | 450 |
| Filterability (1) | | |
| 150 Mesh | 100 | 100 |
| 325 Mesh | 100 | 100 |
| 700 Mesh | 17 | 52 |

(1) In dioxane

EXAMPLES 143–146

These Examples illustrate the production of polymer/polyisocyanate compositions of improved stability and high quality from a polyisocyanate blend, I58, which contains large amounts of TDI by means of ethylenically unsaturated copolymer precursors. The precursors CP-5 through CP-10 used in these Examples were prepared in a manner similar to that described for CP-1 through CP-4 in Examples 133–140 except that the solvents set forth in Table 16 were used in the amount of 70/30 weight parts of solvent to monomers. In CP-7 and CP-8, however, the polymerization was conducted at about 80° C., the reflux temperature of benzene. In CP-9 and CP-10, a chain transfer agent, mercaptoacetic acid (MCA) was mixed with the monomer mixture in the amounts given in Table 16. The respective ratios of MMA to Al in each preparation are given in Table 16. Monomer conversions, total solids (identified in Table 17 for each Example and Run) were added to the reaction vessel and in the case of the precursors containing benzene and toluene solvent the resulting mixture was kept at 70° C. under vacuum to strip the solvent. Then one sixth of the catalyst was added and a mixture of the remaining I58, remaining catalyst and acrylonitrile were added slowly over a period of three hours while maintaining the reaction mixture at 70° C. Thereafter, the reaction mixture was heated for an additional 2 hours at 70° C. A sample was removed for testing and the remaining product was vacuum stripped for at least 1.5 hours at 70° C. In each Example there was used 21% acrylonitrile, 1% catalyst and sufficient precursor to provide 2% (1.8% in Run kkk) of MMA-Al copolymer based on the combined weights of acrylonitrile and polyisocyanate including that in the precursors CP-5 and CP-6 in the cases of Examples 143 and 144.

Properties of the resulting polymer/polyisocyanate dispersions are given in Table 17. These Examples illustrate the preparation of good quality dispersions of improved stability. The graininess and poor filterability of Run kkk could be improved by reducing the amount of Al which, when used in excess, promotes inter-particle polymerization to result in larger particles and/or causes agglomeration. A comparison with Example 145 illustrates that slightly lesser amounts of Al in the same system produces good quality dispersions of improved stability. Example 146 also illustrates the use of a chain transfer agents, which theoretically terminates polymer chains and start new ones to result a greater number of lower molecular weight chains of the precursor, to overcome the inter-particle polymerization and/or agglomerate promoting effects of the relatively larger amounts of Al and to provide good quality, dispersions of improved stability. Run mmm could result in a more stable dispersion of good quality if the amount of chain transfer agent used in the manufacture of the precursor were increased as illustrated in Example 146.

TABLE 17

| Example No. or Run | 143 | 144 | 145 | kkk | 146 | mmm |
|---|---|---|---|---|---|---|
| Precursor | CP-5 | CP-6 | CP-7 | CP-8 | CP-9 | CP-10 |
| % FNCO | 32.6 | 32.7 | 32.0 | 33.4 | 32.1 | 32.25 |
| Visual Inspection | Good | Fair | Fair | Fair | Good | Good |
| Film Appearance on Glass Slide | sm/gl | sm/sl/sd | sm/gl | gr | sm/sl/sd | sd |
| Brookfield viscosity, 25° C. | 1500 | 1430 | 730 | 585 | 1380 | 518 |
| Filterability (1) | | | | | | |
| 150 Mesh | 100 | 100 | 100 | 1 | 100 | — |
| 325 Mesh | 33 | 5 | 21 | — | 46 | — | and number average molecular weights of the resulting copolymers are also given in Table 16.

TABLE 16

| Precursor | CP-5 | CP-6 | CP-7 | CP-8 | CP-9 | CP-10 |
|---|---|---|---|---|---|---|
| Solvent | TDI | I58 | Benzene | Benzene | Toluene | Toluene |
| MMA/Al | 96/4 | 96/4 | 96/4 | 94/6 | 94/6 | 94/6 |
| Wt. % MCA* | — | — | — | — | 9.3 | 4.7 |
| Monomer Conversion % | | | | | | |
| Total Solids % | | | 30.7 | 33 | 34.1 | 33.8 |
| $M_n$ | 32,300 | 28,510 | 12,450 | 13,660 | | |

*based on total weight of monomers

In each of Examples 143–146 and Runs kkk and mmm, two thirds of the I58 and all of the precursor

EXAMPLES 147 THROUGH 149

In these Examples and Examples W through EE the procedure outlined in regard to Examples 1 through 8 was used in which the reaction temperature was 90° C. In each case the isocyanate was as indicated in Table 18 below and the catalyst used was VAZO 64 in amounts of 1% based on the combined weights of polyisocyanate and monomers. The total weight percent monomers is also given for each case in Table 18 and these percentages are based on combined weight on the monomers and polyisocyanate. In each case 3 weight percent of the monomer mixture was used as seed and was reacted with polyisocyanate for a seed time of ½ hour. Thereafter, the remaining amount of monomer mixture was added dropwise over a period of 3 hours and after completion of the addition the resulting mixture was cooked out for 2 hours. A 3000 milliliter reaction vessel was used in each case. The results for each Example are given in Table 18. It is easily noted from these results that in each case TDI failed to provide a suitable polymer/polyisocyanate dispersion in any instance even in those instances in which acrylonitrile was polymerized in TDI (Example X) or where acrylic acid and acrylonitrile were copolymerized in TDI, and in each other TDI preparation. On the other hand those dispersions made with I191 and the acrylonitrile polymers had fair to good appearances, moderate viscosity and good to excellent filterability.

acrylonitrile in TDI in the presence of 1% catalyst as listed in Table 19. The polymerization was carried out at 70° C. except for Example JJ which was conducted at 90° C. In Examples DD and EE acrylamide was copolymerized with the acrylonitrile and in all cases the total amount of monomers polymerized was 21 wt.% based on the combined weight of TDI and monomers. The resulting polymer/polyisocyanates were analyzed and properties are given in Table 19. In every case, the resulting material was unstable on standing and formed a layer at the bottom. Upon proplonged standing these

TABLE 18

| Example No. | 147 | 148 | 149 | W | X | Y |
|---|---|---|---|---|---|---|
| Isocyanate | I191 | I191 | I191 | TDI | TDI | I191 |
| Wt., % Monomer(s) | 21 | 21 | 21 | 21 | 21 | 20 |
| Comonomer(s) | A/MAM | A/MAM | A/MAM | A/AA | A | S |
| Ratio Acrylonitrile/Comonomer | 96/4 | 95/5 | 94/6 | 96/4 | — | — |
| Residual Acrylonitrile (1) | 1.02 | — | — | 1.10 | 0.63 | — |
| Residual, Other Monomer (1) | — | 1.97 | 2.20 | — | — | 0.45 |
| % Conversion Acrylonitrile (2) | 95 | 90 | 89 | 94 | 92 | 98 |
| % Conversion, Other Monomer | | | | | | |
| Total % Conversion (3) | 95 | 90 | 89 | 94 | 97 | 98 |
| % Polymer Content (3) | 20 | 19 | 19 | 20 | 20 | 20 |
| % Free NCO, Measured | 22.40 | 22.68 | 22.69 | — | 36.91 | — |
| % Free NCO, Calculated | 24.0 | 24.3 | 24.3 | — | 38/4 | — |
| Polymer/Isocyanate Properties | | | | | | Sol. 90 |
| Visual Inspection | fair | good | good | poor | poor | Insol. R. T. |
| Brookfield Viscosity at 25° C. | 13,340 | 18,000 | 25,500 | 690 | 1,200 | — |
| Filterability (4) | | | | | | |
| A 150 Mesh | 100 | — | — | — | 9 | — |
| 325 Mesh | 100 | — | — | — | — | — |
| 700 Mesh | 50 | — | — | — | — | — |
| B 150 Mesh | 100 | 100 | 100 | 1 | — | — |
| 325 Mesh | 100 | 72 | 100 | — | — | — |
| 700 Mesh | 50 | 7.5 | 18 | — | — | — |
| Example No. | Z | nnn | AA | ooo | BB | ppp |
| Isocyanate | TDI | I191 | TDI | I191 | TDI | I191 |
| Wt., % Monomer(s) | 20 | 20 | 20 | 20 | 20 | 20 |
| Comonomer(s) | S | MMA | MMA | MAN | MAN | MAN/AA |
| Ratio Acrylonitrile/Comonomer | — | — | — | — | — | 90/10 |
| Residual Acrylonitrile (1) | — | — | — | — | — | — |
| Residual Other Monomer (1) | 0.67 | — | — | — | — | — |
| % Conversion Acrylonitrile (2) | 97 | — | — | — | — | — |
| % Conversion, Other Monomer | | | | | | |
| Total % Conversion (3) | 97 | — | — | — | — | — |
| % Polymer Content (3) | 19 | — | — | — | — | — |
| % Free NCO, Measured | — | — | — | — | — | — |
| % Free NCO, Calculated | — | — | — | — | — | — |
| Polymer/Isocyanate Properties | | | | | | |
| Visual Inspection | Sol. | Sol. | Sol. | Lumpy | Lumpy | Poor |
| Brookfield Viscosity at 25° C. | 13 | 19,000 | 50 | | | |
| Filterability (4) | | | | | | |
| A 150 Mesh | — | — | — | — | — | — |
| 325 Mesh | — | — | — | — | — | — |
| 700 Mesh | — | — | — | — | — | — |
| B 150 Mesh | — | — | — | — | — | — |
| 325 Mesh | — | — | — | — | — | — |
| 700 Mesh | — | — | — | — | — | — |

(1), (2), (3) and (4) same as in Table 1.

EXAMPLES CC THROUGH LL

In each of these Examples the procedure set forth in Examples 1 through 8 were followed to polymerize materials could cake at the top due to surfacing of the polymer particles. None of these materials were suitable because of instability problems.

TABLE 19

| Example No. | CC | DD | EE | FF | GG | HH | JJ | KK | LL |
|---|---|---|---|---|---|---|---|---|---|
| Catalyst | VAZO-52 | → | → | → | → | UL-11 | VAZO-64 | VAZO-52 | → |
| Comonomer(s) | — | AM | AM | — | — | — | — | VCl₂ | → |
| Ratio, Acrylonitrile/Comonomer | — | 96/4 | 96/4 | — | — | — | — | 70/30 | → |
| Precursor | — | — | CP-3 | CP-3 | CP-4 | CP-3 | CP-3 | CP-4 | — |
| Wt. % | | 2 | 2 | 2 | 2 | 2 | 2 | 6.65 | |
| Monomer Ratio | | 96/4 | 96/4 | 96/6 | 94/6 | 94/6 | 70/30 | | |
| Monomer Addition Time (hrs.) | | 4 | 4 | 4 | 3½ | 3½ | 3 | 3 | |
| Residue Acrylonitrile (1) | | | | | | | | | |
| Residual Acrylamide (1) | | | | | | | | | |

TABLE 19-continued

| Example No. | CC | DD | EE | FF | GG | HH | JJ | KK | LL |
|---|---|---|---|---|---|---|---|---|---|
| % Conversion Acrylonitrile (2) | | | | | | | | | |
| % Conversion Acrylamide | | | | | | | | | |
| Total Conversion of Monomers, % | | | | | | | | | |
| % Vinyl Polymer Content (3) | | | | | | | | | |
| % Free NCO, Measured | 37.7 | 36.49 | 35.66 | | | | | 37.2 | 37.9 |
| % Free NCO, Calculated | | | | | | | | | |
| Polymer/Isocyanate Properties | | | | | | | | | |
| Visual Inspection, Immediately | ok | ok | ok | ok | ok | ok | good | fair | fair |
| Visual Inspection, Standing | us/l | us/l | us/l | us/l | us/l | us/l | ok/l | — | — |
| Film Appearance on Glass Slide | sm/gl sl/sd | sm/gl | sm/gl | sd | gr, sd | gr, sd | gr, sd | sm | gr/sd |
| Brookfield Viscosity at 25° C. | 4600 | 848 | 2268 | 324 | 378 | 450 | 250 | 490 | 607 |
| Filterability (4) | | | | | | | | | |
| 150 Mesh Screen | 100 | 100 | 100 | 25 | 4 | 3 | 2 | 50 | 100 |
| 325 Mesh Screen | 0 | 0 | 0 | — | — | — | — | — | 18 |
| 700 Mesh Screen | | | | — | — | — | — | | |

(1), (2), (3) and (4) same as in Table 1
(5) In Examples Nos. EE-JJ the toluene was stripped from the isocyanate/precursor mixture before polymerization

EXAMPLES 150 THROUGH 193 Polyurethane Elastomers

Polyurethane elastomers were produced from the polyols, hydroxy-type extenders and the isocyanate reactants, i.e. the polyisocyanates or polymer/polyisocyanates identified in the following Tables 20-27. Dibutyltin dilaurate catalyst, in the amount of 0.01 to 0.03 wt.% based on the total weight of polyol and extender was used in each case. The polyol, extender and catalyst were mixed and heated at 60° C. for one hour under vacuum to remove dissolved gases. The isocyanate reactant was similarly vacuum stripped of dissolved gases. The ratio of polyol to extender was selected on the basis of the hardness desired for the polyurethane. The amount of isocyanate component used is expressed in terms of isocyanate index, i.e. an index of 100 designates that the isocyanate component is used in such amount that provides a number of isocyanate groups equal to the number of hydroxyl groups provided by the amount of polyol-extender blend used. Thus, when a 105 isocyanate index is used, 1.05 equivalent weights of isocyanate component is used per equivalent weight of the polyol-extender blend. In all Examples 150-182 and KK-FFF an isocyanate index of 105 was used.

The preparation of elastomers was carried out by mixing the appropriate amount (e.g. one equivalent weight) of polyol-extender blend containing the catalyst with the appropriate amount of isocyanate component (e.g., 105 equivalent weight), stirring under vacuum for about one minute and pouring into a preheated glass mold constructed of two glass pieces and Teflon spacers. The filled glass mold was then heated in an oven at 100° C. for 16 hours to provide the elastomer which was then cut and tested pursuant to the following ASTM methods:

| Test | Procedure |
|---|---|
| Hardness | ASTM 2240 |
| Tensile strength | ASTM D-412 |
| Elongation | ASTM D-412 |
| Die C Tear | ASTM D-624 |
| Flex modulus A 75 | ASTm D-790 |
| Izod impact | ASTM D-256 |
| Multiple | Flex Modulus at −20° F./ Flex Modulus at 138° F. |

Sag—The sag test is used to measure the resistance of RIM urethanes to drooping at elevated temperatures. There is no ASTM designation at the present time. The test involves clamping a sample (usually 1"×6" varying thickness), so that 4" is allowed to be unsupported. The clamped sample is then placed in an oven for one hour at 250° F. The heat causes the material to droop. The difference between the height of the unsupported end of the sample before and after the test is called the sag value. Most automotive specifications require a sag value of less than 0.5" under the conditions noted above. Sag is closely related to the thickness of the sample tested. For accurate results, make all sag specimens the same thickness.

The elastomers produced by Examples 150-193 had higher flexural modulii than comparative elastomers produced from corresponding polyisocyanates containing no dispersed polymer particles. The other physical properties of the elastomers of Examples 150-193 were comparable to the physical properties of said comparative elastomers.

TABLE 20

| Example No. | MM | 150 | 151 | NN | 152* | 153 | 154 |
|---|---|---|---|---|---|---|---|
| Isocyanate Component (1) | | | | | | | |
| Isocyanate identification | 1191 | Ex. 1 | Ex. 2 | 1191 | Ex. 3 | Ex. 4 | Ex. 5 |
| Monomer(s) | o | AN/AA/AM | AN/AA/AM | o | AN/AA/AM | A/AA/AM | AN/AM |
| Monomers ratio | o | 94/2/6 | 94/2/4 | o | 94/2/4 | 94/1/5 | 94/6 |
| Viscosity | | 2,550 | 2,650 | | 1,300 | 3,800 | 20,000 |
| Monomer content | 0 | 21 | 21 | 0 | | | |
| Polymer content | 0 | 19 | 19 | 0 | 19 | 19 | 19 |
| Calculated NCO No. | | 22.0 | 22.1 | | 22.1 | 22.0 | 22.0 |
| Measured NCO No. | 30 | 24.3 | 24.3 | 30 | 26.3 | 26.3 | 24.3 |
| Δ NCO | 0 | 2.3 | 2.3 | 0 | 2.2 | 2.3 | 2.3 |
| Tensile Properties | | | | | | | |
| No. plaques/No. test pieces | 2/6 | | 3/9 | 2/6 | — | 3/9 | 2/6 |
| Shore D hardness | 80 | | | 81 | — | 81 | 81 |

TABLE 20-continued

| Example No. | MM | 150 | 151 | NN | 152* | 153 | 154 |
|---|---|---|---|---|---|---|---|
| Tensile strength, psi | 6,131 | | 6,431 | 5,889 | — | 6,495 | 6,473 |
| Elongation, % | 122 | | 92 | 109 | — | 75 | 83 |
| Die "C" tear, pli | 901 | | 803 | 995 | — | 789 | 862 |
| Flex Modulus ($\times 10^{-3}$) psi | | | | | | | |
| at 75° F. | 221 | | 254 | 209 | — | 259 | 262 |
| Δ 75 | — | | 33 | — | — | 50 | 53 |
| Sag (250° F.) | 0.5 | | 0.3 | 0.7 | — | 0.53 | 0.45 |
| Die Izod | 5.1 | | 3.2 | — | — | 2.4 | |

*Reaction preparation gelled.
(1) Polyol 4 was used as the polyol reactant and Polyol 3 was used as extender in ratio of Polyol 4/Polyol 3 of 70/30.

TABLE 21

| Example No. | OO | 155 | 156 | 157 |
|---|---|---|---|---|
| Isocyanate Component (1) | | | | |
| Isocyanate identification | I191 | Ex. 9 | Ex. 10 | Ex. 11 |
| Monomers | — | A/AA | A/AA/AM | A/AA/AM |
| Monomers ratio | — | 94/6 | 94/1/5 | 94/1/5 |
| Polymer/content | 0 | 20.5 | 20.7 | 26.9 |
| Calculated free NCO | 30 | 23.80 | 23.17 | 21.36 |
| Measured free NCO | 30 | 22.97 | 22.22 | 21.89 |
| Δ NCO | 0 | 0.83 | 0.97 | 0.53 |
| Physical Properties | | | | |
| No. plaques/No. test pieces | 2/6 | 3/9 | 3/9 | 3/9 |
| Shore D hardness | 80 | 83 | 82 | 83 |
| Tensile strength, psi | 6173 | 6487 | 6558 | 7081 |
| Ultimate elongation, % | 123 | 84 | 76 | 86 |
| Die "C" Tear. pli | 929 | 713 | 746 | 718 |
| Flex modulus $\times 10^{-3}$ psi | | | | |
| at −20° F. | 343 | 405 | 404 | 423 |
| at 75° F. | 226 | 249 | 254 | 278 |
| at 158 | 104 | 132 | 147 | 158 |
| Δ 75 | — | 23 | 28 | 52 |

(1) same as (1) of Table 20

TABLE 22

| Example No. | PP | 158 | 159 |
|---|---|---|---|
| Isocyanate Component (1) | | | |
| Isocyanate identification | I191 | Ex. 30 | Ex. 13 |
| Monomer(s) | | AN/AM/HEA | AN/AM/HPMA |
| Viscosity | | 26,400 | 9,000 |
| Measured NCO No. | | 21.74 | 21.87 |
| Monomer ratio | | 93/6/1 | 94/4/2 |
| Tensile Properties | | | |
| No. plaques/No. test pieces | | 2/6 | 4/12 |
| Shore D hardness | 80 | 82 | 81 |
| Tensile strength | 6935 | 6144 | 6024 |
| Elongation, % | | 42 | 83 |
| Die "C" tear | 979 | 855 | |
| Flex Modulus ($\times 10^{-3}$), psi | | | |
| at 75° F. | 208 | 270 | 244 |
| Δ 75 | | 49 | 36 |
| Sag (250° F.) | 0.6 | 0.4 | 0.03 |

(1) Same as (1) of Table 20

TABLE 23

| Example No. | 160 | 161 | OO | 162 | RR | 163 | 164 | SS | 165 | TT | 166 | UU |
|---|---|---|---|---|---|---|---|---|---|---|---|---|
| Isocyanate Component | | | | | | | | | | | | |
| Isocyanate Identif. | Ex. 44 | Ex. 46 | I191 | Ex. 51 | I191 | Ex. 52 | Ex. 130 | I191 | Ex.127 | I191 | Ex. 51 | I191 |
| Comonomer | AM | AM | — | AM | — | AM | — | — | — | — | AM | — |
| Acrylonitrile/Acrylamide Ratio | 94/6 | 94/6 | — | 94/6 | — | 94/6 | 100/0 | — | 100/0 | — | 94/6 | — |
| Wt. % Vinyl Polymer (in Polymer/Isocyanate) | 22 | 22 | 0 | 22 | 0 | 22 | 22 | 0 | 22 | 0 | 20 | 0 |
| Heoppler Viscosity at 25° C. | 3,899 | 2,875 | — | 5,366 | — | 10,367 | 3,391 | — | 2,852 | — | 5,366 | — |
| Free Isocyanate | 20.58 | 20.75 | 30.0 | 21.01 | 30.0 | 20.3 | 21.79 | — | 22.16 | 30.0 | 21.01 | 30.0 |
| Polyol 4/Polyol 3 (1) | 70/30 | → | → | → | → | → | → | → | → | → | 65/35 | 65/35 |
| Physical Properties | | | | | | | | | | | | |
| No. plaques Average (2) | 3 | 3 | 2 | 4 | 2 | 2 | 2 | 2 | 2 | 2 | 4 | 2 |
| No. Test Pieces Averaged | 24 | 23 | 16 | 16 | 8 | 8 | 12 | 12 | 6 | 6 | 16 | 8 |
| Shore D Hardness | — | — | — | 83 | 79 | 83 | — | — | — | — | 83 | 82 |
| Tensile Strength | — | — | — | 6873 | 5651 | 7547 | — | — | — | — | 7411 | 6471 |
| Ultimate Elongation | — | — | — | 71 | 117 | 62 | — | — | — | — | <1 | 50 |
| Die "C" Tear | — | — | — | 472 | 1013 | 434 | — | — | — | — | 645 | 887 |
| Flex Modulus $\times 10^{-3}$ | | | | | | | | | | | | |
| at 75° F. | 270 | 269 | 191 | 247 | 178 | 270 | 248 | 202 | 247 | 199 | 300 | 251 |
| Δ 75 | 79 | 78 | — | 69 | — | 79 | 46 | — | 48 | — | 49 | — |
| Sag (1 hr. at 250° F.) | — | — | — | 0.50 | 0.35 | 0.30 | — | — | — | — | 0.43 | 0.30 |

TABLE 23-continued

| Example No. | 160 | 161 | OO | 162 | RR | 163 | 164 | SS | 165 | TT | 166 | UU |
|---|---|---|---|---|---|---|---|---|---|---|---|---|
| Izod Impact (ft. lbs.) | 2.7 | 2.8 | 7.14 | 3.4 | 6.60 | — | 1.64 | 4.97 | 1.2 | — | 2.49 | 5.78 |

[1] Polyol 4 was used as the polyol reactant and Polyol 3 was used as the extender

TABLE 24

| Example No. | 167 | VV | 168 | 169 | 170 | 171 | WW | XX | YY | ZZ | 172 | 173 |
|---|---|---|---|---|---|---|---|---|---|---|---|---|
| Isocyanate Component[1] | | | | | | | | | | | | |
| Isocyanate Identif. | Ex. 37 | I191 | Ex. 38 | Ex. 39 | Ex. 40 | Run uu | Run j | Ex. 41 | I191 | I191 | Ex. 42 | Ex. 44 & 46* |
| Comonomer | $VCl_2$ | — | $VCl_2$ | $VCl_2$ | $VCl_2$ | None | $VCl_2$ | $VCl_2$ | — | — | $VCl_2$ | AM |
| Monomers ratio (A/$VCl_2$) | 70/30 | | 70/30 | 60/40 | 50/50 | 100/0 | 0/100 | 30/70 | | | 80/20 | 94/6 |
| Isocyanate viscosity | 1,577 | | 955 | 1,194 | 2,138 | 3,803 | 7,828 | 1,334 | | | 1,091 | 3,387 |
| Monomer content | 23 | | 20 | 23 | 23 | 21 | 20 | 20 | 0 | 0 | 23 | 23 |
| Polymer content | 21 | | 18 | 21 | 20 | 19 | 19 | 19 | — | | | |
| Measured NCO No. | 23.1 | 30 | 23.8 | 23.1 | 23.6 | 22.9 | 23.8 | 23.6 | | 30 | 22.2 | 20.7 |
| Tensile Properties | | | | | | | | | | | | |
| No. plaque/No. test pieces | 2/6 | 3/6 | 2/6 | 2/6 | 2/6 | 2/6 | ½ | 2/6 | 2/6 | 2/16 | 3/24 | 5/38 |
| Tensile strength | 7,000 | 5,965 | 6,234 | 6,470 | 6,448 | 7,173 | 4,428 | 4,136 | 5,407 | — | — | — |
| Shore D hardness | 82 | 80 | 82 | 82 | 82 | 82 | 80 | 78 | 80 | — | — | — |
| Ultimate elongation | 33 | 116 | 36 | 68 | 55 | 13 | 10 | 14 | 110 | — | — | — |
| Die "C" tear | 485 | 105 | 597 | 448 | 445 | 589 | 302 | 941 | 890 | — | — | — |
| Flex Modulus ($\times 10^{-3}$) | | | | | | | | | | | | |
| at 75° F. | 241 | 217 | 227 | 230 | 223 | 254 | 165 | 150 | 165 | 192 | 251 | 270 |
| Δ 75° F. | 24 | | 10 | 13 | 6 | 41 | 0 | −15 | — | — | 59 | 78 |

*Polymer/polyisocyanates of these Examples were combined.
[1] same as [1] of Table 20.

TABLE 25

| Example No. | AAA | 174 | BBB | 175 | CCC | DDD | 176 | 177 | EEE | 178 |
|---|---|---|---|---|---|---|---|---|---|---|
| Isocyanate Component[1] | | | | | | | | | | |
| Isocyanate Identif. | I191 | Ex. 96 | Run ee | Ex. 79 | I191 | I143L | Ex. 97 | Ex. 81 | I191 | Ex. 83 |
| Base isocyanate | I191 | I191 | I191 | I191 | I191 | I143L | I143L | I143L | I191 | I191 |
| Monomer(s) | | AA | AA | AA | | | AA | AA | | AA |
| Monomer ratio | | 94/6 | 97/3 | 97/3 | | | 94/6 | 96/4 | | 97/3 |
| Isocyanate viscosity | | | | | | | | | | 19,000 |
| Monomer content | | 21 | 17 | 17 | | | 21 | 21 | | 21 |
| Polymer content | O | 16 | 16 | 16 | | | 17 | 17 | | 19 |
| Calculated NCO No. | | 25.2 | 25.2 | 25.2 | | | 24.5 | 24.5 | | 2 |
| Measured NCO No. | | 24.1 | 23.5 | 24.5 | | | 23.9 | 22.3 | | 22.6 |
| Physical Properties | | | | | | | | | | |
| No. plaques/No. test pieces | 2/6 | 2/6 | —* | 2/6 | 2/6 | 2/6 | 2/6 | ½ | 3/9 | 3/9 |
| Shore D hardness | 79 | 82 | — | 82 | | 76 | 77 | 77 | 80 | 82 |
| Tensile strength, psi | 6,027 | 6,650 | — | 6,336 | 5,552 | 4,521 | 4,783 | 5,120 | 6,935 | 6,173 |
| Elongation, % | 118 | 43 | — | 87 | 79 | 97 | 61 | 77 | 77 | 77 |
| Die "C" tear | 935 | | — | 412 | 560 | 856 | 456 | 406 | 979 | 406 |
| Flex Modulus ($\times 10^{-3}$) psi | | | | | | | | | | |
| at 75° F. | 195 | 219 | — | 216 | 190 | 144 | 160 | 178 | 208 | 240 |
| Δ 75° F. | — | 24 | — | 26 | | | 16 | 34 | — | 32 |
| Sag (250° F.) | 0.3 | 0.3 | — | | | 0.35 | 0.35 | 0.1 | 0.6 | 0.3 |

*Reaction mixture formed a physical gel that prohibited pouring mixture into the mold.
[1] Same as [1] of Table 20.

TABLE 26

| Example No. | FFF | 179 | 180 | GGG | 181 | 182 |
|---|---|---|---|---|---|---|
| No. of Samples Averaged | 2 | 1 | 1 | 2 | 1 | 1 |
| Polyol/Extender Ratio[1] | 70/30 | 70/30 | 70/30 | 65/35 | 65/35 | 65/35 |
| Isocyanate Identification | I191 | Ex.113 | Ex.115 | I191 | Ex.113 | Ex.115 |
| % Polymer in Isocyanate | 0 | 22 | 19 | 0 | 22 | 19 |
| Physical Properties | | | | | | |
| Shore D Hardness | 74 | 78 | 80 | 80 | 81 | 81 |
| Tensile Strength, psi | 4,265 | 5,748 | 5,947 | 5,388 | 5,683 | 5,673 |
| Ultimate Elongation, % | 111 | 72 | 50 | 60 | 30 | 25 |
| Die "C" Tear, pli | 727 | 520 | 462 | 739 | 350 | 385 |
| Flex Modulus, psi | | | | | | |
| at −20° F. | 282 | 299 | 351 | 331 | 408 | 374 |
| at 75° | 105 | 153 | 135 | 170 | 186 | 201 |
| at 158° | 14 | 56 | 62 | 50 | 75 | 91 |
| Sag (1 hr. at 250° F.) | 0.42 | 0.35 | 0.25 | 0.35 | 0.15 | 0.20 |
| Multiple (−20/158° F.) | 20 | 5.3 | 5.7 | 6.6 | 5.4 | 4.1 |

[1] Polyol 2/Polyol 3
[2] 0.03% dibutyltin dilaurate catalyst based on total weight of polyol and extender.

TABLE 27

| Example No. | HHH | 183 | 184 | JJJ | 185 | 186 | 187 | 188 | 189 | 190 | 191 | 192 | 193 |
|---|---|---|---|---|---|---|---|---|---|---|---|---|---|
| No. of Samples Averaged | 10 | 2 | 2 | 2 | 1 | 1 | 2 | 2 | 3 | 3 | 2 | 3 | 3 |
| Polyol/Extender Ratio (1) | 30/70 | 30/70 | 30/70 | 65/35 | 65/35 | 65/35 | 70/30 | → | → | → | → | → | → |
| Isocyanate Identif. | 0191D* | Ex.113 | Ex.115 | 0191D* | Ex.113 | Ex.115 | Ex.118 | Ex.119 | Ex.120 | Ex.121 | (3) | Ex.122 | Ex.123 |
| % Polyacrylonitrile | 0 | 22 | 19 | 0 | 22 | 19 | 24 | 27 | 7 | 12 | 4 | 30 | 34 |
| Cat. Conc., %(2) | 0.03 | 0.01 | 0.01 | 0.03 | 0.01 | 0.01 | 0.01 | 0.01 | 0.01 | 0.02 |  | 0.01 | 0.01 |
| Physical Properties |  |  |  |  |  |  |  |  |  |  |  |  |  |
| Shore D Hardness | 79 | 82 | 81 | 82 | 84 | 83 | 80 | 79 | 79 | 82 | 80 | 83 | 83 |
| Tensile Strength, psi | 5,440 | 7,358 | 7,150 | 7,545 | 5,455 | 4,205 | 6,954 | 7,045 | 6,143 | 7,384 | 6,267 | 5,705 | 3,404 |
| Ultimate Elongation | 81 | 25 | 22 | 48 | 25 | 10 | 22 | 10 | 81 | 26 | 66 | 6 | 3 |
| Die "C" Tear | 800 | 327 | 343 | 852 | 253 | 252 | 447 | 425 | 869 | 647 | 852 | 335 | 324 |
| Flex Modulus, psi |  |  |  |  |  |  |  |  |  |  |  |  |  |
| at −20° C. | 377 | 416 | 444 | 452 | 367 | 453 | 365 | 388 | 376 | 350 | 377 | 347 | 371 |
| at 75° C. | 168 | 231 | 219 | 241 | 249 | 249 | 178 | 211 | 168 | 189 | 187 | 252 | 221 |
| at 158° C. | 55 | 80 | 80 | 58 | 116 | 112 | 93 | 114 | 90 | 100 | 100 | 107 | 114 |
| Sag (1 hr. at 250° C.) | 0.33 | 0.18 | 0.2 | 0.28 | 0.25 | 0.1 | 0.23 | 0.55 | 0.38 | 0.60 | 0.45 | 0.43 | 0.33 |
| Multiple (−20/158° F.) | 5.9 | 5.2 | 5.6 | 7.7 | 3.2 | 4.0 | 3.6 | 3.4 | 5.6 | 3.5 | 3.8 |  |  |

*A modified diphenylmethane diisocyanate having a free NCO content of 28%, an equivalent weight of 148 and a viscosity of 36 cps obtained from The Upjohn Company.
(1)Polyol 4/Polyol 3
(2)Catalyst, dibutyltin dilaurate concentrations based on total weight of both Polyols 3 and 4
(3)Polymer/polyisocyanate of Ex. 120 was diluted with I191.

EXAMPLES 194 THROUGH 198 Polyurethane Foams

High resiliency molded polyurethane foams were produced from polyols and isocyanate reactants, i.e., the polyisocyanates or polymer/polyisocyanates identified in the following Tables 28 and 29. The ingredients of the foam formulations and their amounts are listed in Tables 28 and 29. Those ingredients not heretofore described are described as follows:

Amine Catalyst 1—A blend of 30 wt.% bis (2-dimethylaminoethyl) ether in 70 wt.% dipropylene glycol.

Amine Catalyst 2—A solution of 33 wt.% of 3-dimethylamino-N,N-dimethylpropionamide in 67 wt.% of $C_9H_{19}C_6H_4(OC_2H_4)_9OH$.

DABCO-33LV

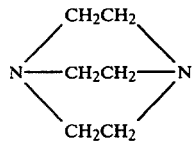

Silicone Surfactant II—a poly(dimethylsiloxane)-poly(oxyalkylene) block copolymer.

In each case, the surfactant, polyols and the isocyanate reactant were weighed into an 8-liter, baffled stainless steel beaker and mixed 60 seconds at 2000 rpm with two 2.5 inch 6 blade turbine stirrers (placed 2.5 inches apart at the base of the shaft). Stirring was stopped for fifteen seconds to de-gas and was continued again for five seconds. Water, DABCO and the amine catalysts were added and mixing continued an additional five seconds. The dibutyltin dilaurate was then added and mixing continued for five seconds. The foaming mixture was poured into a 24"×24"×20" paper-lined box and foam rise time was recorded. The foam was allowed to cure overnight at room temperature.

The following test procedures were used to measure the physical properties of the foams:

| Test | Procedure |
|---|---|
| Indentation Load Deflection (ILD) | ASTM D1564-69 |
| Compression Set | ASTM D1564-69 |

-continued

| Test | Procedure |
|---|---|
| Tensile Strength | ASTM D1564-69 |
| Elongation | ASTM D1564-69 |
| Tear Resistance (Strength) | ASTM D1564-69 |
| Resiliency, Ball Rebound | ASTM D1564-71 |

Air Porosity

A specimen of foam ½ inch in thickness is compressed between two pieces of flanged plastic tubing 2-¼ inches in diameter (ID). This assembly then becomes a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen, cubic feet per minute per square foot.

Rise Time

The interval of time from the formation of the complete foam formulation to the attainment of the maximum height of the foam.

Support Factor or Load Ratio
is equal to the 65% ILD value divided by the 25% ILD value.

Humid Aging—described in ASTM D-3574, Standard Method of Test for Flexible Urethane Foam.

HACS—described in ASTM D-3574, Standard Method of Test for Flexible Urethane Foam.

HALL—described in ASTM D-3574, Standard Method of Test for Flexible Urethane Foam.

FMVSS—Federal Motor Vehicle Safety Standard No. 302.

California Vertical Burn Tests—California Bulletin 117, issued by the California Department of Consumer Affairs, Bureau of Home Furnishings, Sacramento, California. In this test, the shorter the char length the better, a char length of six inches or less generally being considered to pass and the shorter the duration of the after flame the better, an after flame of 5 seconds or less generally being considered to pass.

The results of these tests are listed in Tables 28 and 29.

The foams produced by Examples 194-198 were characterized by improved identation load deflection (ILD) values compared to foams produced from corresponding polyisocyanates containing no dispersed polymer particles. ILD is a measure of flex modulus and increased ILD means an increased flex modulus. The data in the following tables also show no substantial deterioration in the other physical properties of foams made pursuant to Examples 194-198.

TABLE 28

| Example No. | HHH | 194 | 195 |
|---|---|---|---|
| Formulations, pbw | | | |
| Polyol 2 | 60 | 60 | 100 |
| Polyol 5 | 40 | 40 | — |
| Water | 2.6 | | |
| Amine Catalyst 1 | 0.10 | | |
| DABCO-33LV | 0.35 | | |
| Amine Catalyst 2 | 0.30 | → | → |
| Dibutyltin dilaurate | 0.015 | | |
| Silicone Surfactant II | 1.5 | | |
| Isocyanate I58, 103 Index | 33.34 | | |
| Polymer/Polyisocyanate, Ex. 138, 103 Index | — | 46.13 | 46.76 |
| Formulation Polymer Content, pbw | 8.4 | 17.5 | 9.2 |
| Mold Exit Time, secs. | 63 | 60 | 66 |
| Foam Weight, grams | 716 | 774 | 795 |
| Foam Cure Characteristics | ok | ok | ok |
| Foam Demold Characteristics | Tight | Sl. Tight | Very Tight |
| Physical Properties | | | |
| Density, core, lb/ft³ | 2.60 | 2.81 | 2.78 |

TABLE 28-continued

| Example No. | HHH | 194 | 195 |
|---|---|---|---|
| Porosity, ft³/min/ft² | 23 | 24 | 29 |
| Resiliency, % ball rebound | 61 | 64 | 64 |
| ILD (lb/50 in²) | | | |
| 25% | 31.1 | 48.0 | 37.1 |
| 65% | 83.5 | 125.5 | 96.9 |
| 25% Return, % | 81.4 | 81.5 | 83.8 |
| Support Factor | 2.68 | 2.61 | 2.61 |
| Tensile Strength, lb/in² | 20.6 | 23.1 | 18.0 |
| Elongation, % | 149 | 112 | 114 |
| Tear Resistance, lb/in | 1.46 | 1.71 | 1.26 |
| 75% Compression Set, $C_d$, % | 12.9 | 11.2 | 10.1 |
| Humid Aging (5 hrs. at 120° C.) | | | |
| 50% Compression Set, $C_d$, % | 21.3 | 20.5 | 18.2 |
| 50% CLD Load Loss, % | 20.3 | 21.7 | 27.3 |

TABLE 29

| Example No. | LLL | 196 | 197 | 198 | MMM | NNN |
|---|---|---|---|---|---|---|
| Polyol 2 | 60 | | | | | |
| Polyol 5 | 40 | | | | | |
| Water | 2.6 | | | | | |
| Amine Catalyst 1 | 0.10 | → | → | → | → | → |
| DABCO 33LV | 0.35 | | | | | |
| Amine Catalyst 2 | 0.30 | | | | | |
| Dubutyltindilaurate | 0.015 | | | | | |
| Silicone Surfactant II | 1.5 | 1.5 | 1.5 | 3.0 | 1.5 | 1.5 |
| Isocyanate I58, 1031 | 33.3 | | | | | |
| Ex. 141, 1031 | | 41.2 | | | | |
| Ex. 142, 1031 | | | 43.3 | 43.3 | | |
| Ex. KK, 1031 | | | | | 39.5 | |
| Ex. LL, 1031 | | | | | | 40.3 |
| Mold Exit Time, secs. | 66 | 65 | 63 | 57 | 53 | 53 |
| Density, lb/ft³ | 2.55 | 2.78 | 2.76 | 2.73 | 2.64 | 2.72 |
| Air Porosity, ft³/min/ft² | 27 | 32 | 13 | 15 | 6 | 5 |
| Resiliency, % ball rebound | 64 | 65 | 59 | 61 | 48 | 51 |
| ILD (lb/50 in.²), 4-inch | | | | | | |
| 25% | 37.2 | 46.5 | 72.3 | 52.9 | 68.0 | 70.76 |
| 65% | 97.8 | 125.0 | 154.3 | 135.5 | 154.5 | 160.0 |
| 25% Recovery, % | 83.2 | 82.8 | 81.6 | 81.4 | 79.3 | 79.3 |
| Support Factor | 2.63 | 2.69 | 2.13 | 2.56 | 2.27 | 2.27 |
| Tensile Strength, lb/in.² | 22.5 | 25.4 | 12.7 | 26.5 | 26.2 | 29.7 |
| Elongation, % | 150 | 141 | 73 | 115 | 155 | 168 |
| Tear Resistance, lb/in. | 1.52 | 171 | 1.90 | 1.74 | 3.68 | 3.55 |
| 75% Compression Set, $C_d$, % | 7.9 | 8.3 | 5.4 | 9.3 | 7.1 | 7.0 |
| HACS, % | 20.9 | 19.2 | 14.3 | 23.9 | 11.2 | 10.5 |
| HALL, % | 16.7 | 17.0 | 18.3 | 18.7 | 13.1 | 13.3 |
| FMVSS No. 302 | | | | | | |
| Burn Rate, in./min. | 0 | 0 | 0 | 0 | 0 | 0 |
| California Bulletin 117 | | | | | | |
| Car Length, in., avg. | 2.6 | 2.5 | 2.9 | 2.6 | 9.6 | 9.4 |
| After flame, sec., avg. | 0 | 0 | 1.2 | 1.3 | 28.6 | 29.4 |
| After Glow, sec., avg. | 0 | 0 | 0 | 0 | 0 | 0 |

EXAMPLES 199 AND 200

In Example 199, the procedures and equipment as described in Examples 9 through 11 were used under the conditions specified in Table 30. In Example 200, a twostage reactor was used in which the first stage was a continuously stirred tank reactor as described in Examples 9-11 and the second stage was a 550 cc column fitted to the first stage. In Example 200, the residence time in each stage was 12 minutes for a total of 24 minutes and the conditions given in Table 30 were used. In each case the isocyanate was filtered through a 150-mesh screen, after dissolution of catalyst in Example 199 and before dissolution of catalyst in Example 200.

The properties of the produced compositions are given in Table 30. The centrifugible solids results of the stripped products in both instances indicated a good appearance for the products, i.e., equivalent to a smooth glossy film in the glass slide test.

TABLE 30

| Example No. | 199 | 200 |
|---|---|---|
| Isocyanate | I191 | I191 |
| Reaction Temperature, °C. | 125 | 135 |
| Residence Time, min. | 12 | 24 |
| VAZO-64 Conc., Wt. % in Feed | 0.81 | 1.1 |
| Monomer Content in Feed, Wt. % | 31.38 | 33.72 |
| Ratio of A/AA/AM, Wt. % | 94/2/4 | 94/2/4 |
| Isocyanate + VAZO-64 Feed Rate, gm/hr | 1841 | 1818 |
| Monomer Feed Rate, gm/hr | 842 | 925 |
| Product Weight, gm/hr | 2673 | 2714 |
| Material Balance, % | 99.63 | 98.94 |
| Stripping (Batch) Temperature, °C. | 90 | 90–100 |
| Residual Acrylonitrile in Unstripped Product, Wt. % | 3.86 | — |
| Acrylamide in Unstripped Product, Wt.% | — | — |
| Acrylic Acid in Unstripped Product, Wt.% | — | — |
| TMSN in Unstripped Product, Wt.% | 0.3 | — |
| Volatiles collected during stripping, Wt. %[1] | 5.6 | 4.76 |
| Conversions, Acrylonitrile, % | 86.96 | — |
| Acrylamide, % (assumed)[2] | 100 | — |
| Acrylic Acid, % (assumed)[2] | 100 | — |
| Combined, %[2] | 87.74 | — |
| Combined (from volatiles collected), %[3] | 82.14 | 86.13 |
| Polyacrylonitrile, Cal., Wt. %[4] | 26.21 | — |
| Polymer of Acrylic Acid, Cal., Wt. %[4] | 0.65 | — |
| Polymer of Acrylamide, Calc., Wt.%[4] | 1.3 | — |
| Total Polymer, Calc., Wt%[4] | 28.66 | — |
| Total Polymer, (calc. from volatiles collected), Wt. %[5] | 27.28 | 31.03 |
| Calculated FNCO, Wt. % (from free-monomer analysis)[6] | 20.82 | — |
| Calculated FNCO, Wt.% (from volatiles collected)[7] | 21.23 | 19.89 |
| Measured FNCO, % | 19.44 | 17.95 |
| Brookfield Viscosity, cps at 25° C. | 2120 | 1603 |
| Centrifugible Solids, unstripped sample, Wt. % | 35.74 | 23.86 |
| Top Layer Before Stripping % | 8.9 | 0 |
| Appearance of Top Layer | Dark Brown Liquid | — |
| Centrifugible Solids, Stripped, Wt.% | — | 5.34 |
| Top Layer, % | 3.8 | 0 |
| Appearance of Top Layer | Hard Cake | — |
| Middle Layer, % | 88.7 | 0 |
| Bottom Layer, % | 7.5 | 100 |
| Filtration Hindrance,[8] | | |
| 150-Mesh Screen, Time to see screen, sec. | 49 | 75 |
| , % through | 100 | 100 |
| , solids on screen, ppm | 65 | 118 |
| 325-Mesh Screen, Time to see screen, sec. | 400 | 600 |
| , % through | 88 | 82.5 |
| , solids on screen, ppm | 23 | 73 |

[1] Volatiles were collected in a cold trap during stripping, weighed and expressed as a percentage of unstripped product.
[2] Conversions were calculated from feed rates, material balance and free monomer (residual) analysis of unstripped product. Since conversions of AA and AM were assumed, calculated combined conversion was slightly higher than actual values.
[3] Calculated from volatiles collected during stripping and total monomer content in fee.
[4] Calculated from feed rates, free monomer analysis and material balance.
[5] Calculated from monomer content of unstripped product or in feed and volatiles collected during stripping.
[6] Calculated from measured FNCO of the isocyanate used and polymer content as calculated from feed rates, free monomer analysis and material balance.
[7] Calculated from measured FNCO of isocyanate used and polymer content as calculated from volatiles collected during stripping.
[8] 2/1 dilution with I191.

EXAMPLES 201 THROUGH 211
POLYURETHANE ELASTOMERS

Polyurethane elastomers were produced from the polyols, extender and isocyanate reactants, i.e., I191 or polymer/polyisocyanates identified in Table 31 using the catalyst and procedure described in Examples 150-193. The resulting elastomers were cut and tested pursuant to the ASTM methods identified in Examples 150-193.

The elastomers produced by Examples 201–211 had higher hardness, tensile strength and flexural moduli than comparative elastomers produced from corresponding polyisocyanates containing no dispersed polymer, i.e., Examples OOO-RRR although elongation and tear resistance were lower. The data also illustrate that considerably less chain extender (polyol 6) is needed for the polymer/polyisocyanates as compared to I191 to provide equivalent flex modulii, compare Example 202 with Example RRR, Example 201 with Example QQQ or Example 208 with Example OOO.

TABLE 31

| Example No. | OOO | PPP | QQQ | RRR | 201 | 202 | 203 | 204 | 205 | 206 | 207 | 208 | 209 | 210 | 211 |
|---|---|---|---|---|---|---|---|---|---|---|---|---|---|---|---|
| Formulation: | | | | | | | | | | | | | | | |
| Polyol 4 | — | — | — | — | — | — | — | — | — | — | — | 80 | 70 | 65 | 60 |
| Polyol 2 | 70 | 65 | 60 | 55 | 70 | 65 | 60 | 55 | 70 | 60 | 50 | — | — | — | — |
| Polyol 6[1] | 30 | 35 | 40 | 45 | 30 | 35 | 40 | 45 | 30 | 40 | 50 | 20 | 30 | 35 | 40 |
| I191 (Index) | 104 | 104 | 104 | 104 | — | — | — | — | — | — | — | — | — | — | — |
| Ex.199 Polymer/isocyanate[2] | — | — | — | — | 104 | 104 | 104 | 104 | | | | — | — | — | — |
| Ex.200 Polymer/isocyanate[3] | — | — | — | — | — | — | — | — | 104 | 104 | 104 | 104 | 104 | 104 | 104 |
| Vinyl polymer content, wt.%[4] | 0 | 0 | 0 | 0 | 17.3 | 18.2 | 19.0 | 19.7 | 15.6 | 17.3 | 18.5 | 21.2 | 21.3 | 21.3 | 21.4 |
| Physical Properties | | | | | | | | | | | | | | | |
| Hardness, Shore D | 74 | 78 | 80 | 83 | 79 | 82 | 84 | 85 | 78 | 83 | 80 | 75 | 75 | 82 | 80 |
| 100% Modulus, psi | 4320 | — | — | — | — | — | — | — | — | — | — | — | — | — | — |
| Yield Strength, psi | — | 4700 | 5290 | 7210 | — | 6230 | 7670 | 8520 | — | — | — | — | — | — | — |
| Tensile Strength, psi | 4590 | 4830 | 5500 | 6500 | 5280 | 6285 | 7350 | 8320 | 6170 | 7610 | 7320 | 5310 | 7110 | 7280 | — |
| Elong. at Yield, % | — | — | 15 | 15 | — | 14 | 12 | 13 | | | | — | — | — | — |
| Ult. Elong., % | 116 | 80 | 50 | 25 | 55 | 41 | 51 | 32 | 73 | 10 | 10 | 77 | 27 | 12 | — |
| Die "C" Tear, pli | 700 | 681 | 730 | 800 | 558 | 626 | 625 | 666 | 500 | — | — | 360 | 321 | 300 | — |
| Flex Modulus, psi | | | | | | | | | | | | | | | |
| at −29° C. | 250 | 270 | 300 | 350 | 304 | 373 | 418 | 431 | 321 | 404 | 455 | 297 | 400 | 445 | 472 |
| 24 | 108 | 167 | 200 | 240 | 188 | 241 | 288 | 320 | 173 | 268 | 323 | 136 | 260 | 305 | 330 |
| 70 | 49 | 90 | 100 | 108 | 92 | 134 | 173 | 208 | 94 | 179 | 234 | 55 | 154 | 200 | 225 |
| Multiple | 5.10 | 3.00 | 3.00 | 3.24 | 3.30 | 2.78 | 2.41 | 2.07 | 3.41 | 2.25 | 1.94 | 5.40 | 2.59 | 2.22 | 2.09 |

TABLE 31-continued

| Example No. | OOO | PPP | QQQ | RRR | 201 | 202 | 203 | 204 | 205 | 206 | 207 | 208 | 209 | 210 | 211 |
|---|---|---|---|---|---|---|---|---|---|---|---|---|---|---|---|
| Sag (1 hr at 121° C.), in. | 0.5 | 0.4 | 0.4 | 0.4 | 0.2 | 0.3 | 0.2 | 0.3 | 0.4 | 0.4 | 0.5 | 0.4 | 0.6 | 0.6 | 0.6 |

(1)Used as extender.
(2)Containing 28.6 wt.% A/AA/AM terpolymer.
(3)Used in a blend of 85 wt. parts of polymer/isocyanate of Example 200 (containing 31 wt.% A/AA/AM terpolymer) and 15 wt.% parts of 1191 so that the A/AA/AM terpolymer content of the blend was 26.4 wt.%.
(4)Based on the total weight of polyol, extender and 1191 or polymer/isocyanate.

What is claimed is:

1. In a polymer/polyisocyanate composition which is convertible by reaction with a poly(active hydrogen) organic compound to form a polyurethane product wherein the polyisocyanate of said composition is normally liquid at a temperature at which said composition is converted to said polyurethane product and the polymer of said polymer/polyisocyanate is formed in situ in the polyisocyanate thereof from a polymerizable ethylenically unsaturated monomer and is essentially insoluble therein, the improvement providing more stable dispersions of small particles of said polymer in the polyisocyanate, comprising, an improved dispersion of said polymer prepared by the in situ polymerization of acrylonitrile or mixtures of acrylonitrile and one or more ethylenically unsaturated monomers copolymerizable with acrylonitrile in a liquid polyisocyanate material having a free NCO content of at least 10 wt. % consisting essentially of (1) polymeric forms of a diarylalkylene diisocyanate having the formula:

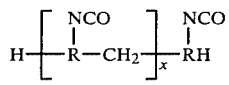

in which R is a trivalent aromatic group and x is a number having an average value of 1.1 to 5, (2) mixtures of a diarylalkylene diisocyanate, a carbodiimide of the formula: OCNR'N=C=NR'NCO and a diarylalkylene diisocyanate trifunctional trimeric cycloadduct of the formula:

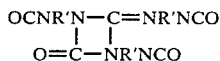

wherein R' is a divalent arylenealkylenearylene group, or (3) mixtures of polyisocyanates (1) and (2) above, said ethylenically unsaturated monomer(s) in an effective amount improving the affinity of the resulting polymer particles for said polyisocyanate and restricting agglomeration of said polymer particles in said polyisocyanate to provide a dispersion which forms films containing less than 10% seeds, the remaining area being glossy, or 5% seeds, the remaining area being semi-glossy, said percentages being on an area basis.

2. Composition as claimed in claim 1 wherein said polyisocyanate material consists essentially of (1) polymeric diphenylmethylene diisocyanate having the formula:

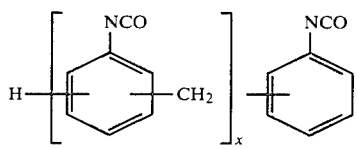

in which x is a number having an average of 1.1 to 5, (2) a mixture of diphenylmethylene diisocyanate, its carbodiimide having the formula: OCNR"N=C=NR"NCO, and its trifunctional trimeric cycloadduct having the formula:

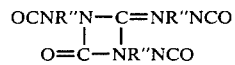

wherein R" is a

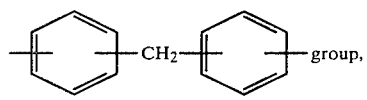

or (3) mixtures of polyisocyanates (1) and (2) above.

3. In a polymer/polyisocyanate composition which is convertible by reaction with a poly(active hydrogen) organic compound having two or more active hydrogens to a polyurethane product wherein the polyisocyanate of said composition is normally liquid at the temperature at which said composition is convertible to said polyurethane product and the polymer of said composition is formed in situ in said polyisocyanate thereof from a polymerizable ethylenically unsaturated monomer and is essentially insoluble therein, the improvement providing more stable dispersions of small particles of said polymer in the polyisocyanate, comprising, an improved dispersion of said polymer prepared by the in situ polymerization of a major amount of acrylonitrile and a minor amount of one or more ethylenically unsaturated monomer(s) polymerizable with acrylonitrile in a liquid organic polyisocyanate material having a free NCO content of at least 10 wt.% and comprising at least about 20 wt. % of (1) polymeric diphenylmethylene diisocyanate having the formula:

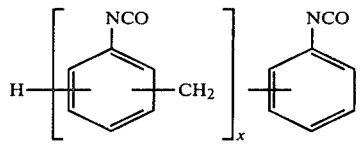

in which x is a number having an average of 1.1 to 5, (2) a mixture of diphenylmethylene diisocyanate, its carbodiimide having the formula: OCNR"N=C=NR"NCO, and its trifunctional trimeric cycloadduct having the formula:

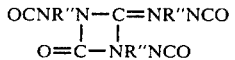

wherein R" is a

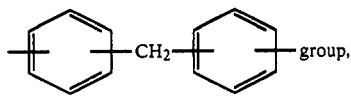 group, or (3) mixtures of polyisocyanates (1) and (2) above, convertible by reaction with poly(active hydrogen) organic compound to a polyurethane product, said ethylenically unsaturated monomer(s) in an effective amount improving the affinity of the resulting polymer particles for said polyisocyanate and restricting agglomeration of said polymer particles in said polyisocyanate to provide a dispersion which forms films containing less than 10% seeds, the remaining area being glossy, or 5% seeds, the remaining area being semi-glossy, said percentages being on an area basis.

4. Composition as claimed in claim 3 wherein said polyisocyanate is a mixture of 4,4'-diphenylmethylene diisocyanate, its carbodiimide of the formula: OCNR"N=CNR"NCO, and its trifunctional trimeric cycloadduct of the formula:

$$\begin{array}{c} OCNR"N-C=NR"NCO \\ | \quad | \\ O=C-NR"NCO \end{array}$$

wherein R" is a

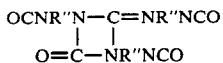 group, said mixture having a calculated equivalent weight of about 144 and a free isocyanate content of about 29.2 wt.%.

5. Composition as claimed in claim 3 wherein said polyisocyanate is a polymeric diphenylmethylene diisocyanate of the formula:

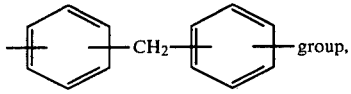

wherein x is a number, having a calculated equivalent weight of about 140 and a free isocyanate content of about 30 wt.%.

6. Composition as claimed in claim 3 wherein said polyisocyanate is a polymeric diphenylmethylene diisocyanate of the formula:

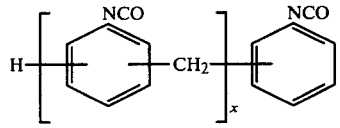

wherein x is a number, having a calculated equivalent weight of about 135 and a free isocyanate content of about 31 wt.%.

7. Composition as claimed in claim 3 wherein said polyisocyanate is a mixture of the polyisocyanate recited in claim 5 and the polyisocyanate recited in claim 6, said mixture having a calculated equivalent weight of about 140 and a free isocyanate content of about 30 wt.%.

8. Composition as claimed in claim 3 wherein said polyisocyanate comprises at least about 20 wt.% 4,4'-diphenylmethylene diisocyanate and up to about 80 wt.% tolylene diisocyanate.

9. Composition as claimed in claim 8 wherein said polymer is a copolymer of at least about 94 wt.% acrylonitrile and up to about 6 wt.% of an ethylenically unsaturated copolymer of at least about 94 wt.% methyl methacrylate and not more than about 6 wt.% of allyl acrylate.

10. Composition as claimed in claim 3 wherein said polymer is a terpolymer of acrylonitrile and two monomers selected from the group consisting of acrylamide, acrylic acid, hydroxyethyl acrylate and hydroxypropyl methacrylate.

11. Composition as claimed in claim 3 wherein said polymer is a terpolymer of acrylonitrile, acrylamide and a monomer selected from the class consisting of acrylic acid, hydroxyethyl acrylate and hydroxypropyl methacrylate.

12. Composition as claimed in claim 3 wherein said polymer is a copolymer of acrylonitrile and a monomer selected from the class consisting of acrylamide, vinylidene chloride, acrylic acid, methacrylic acid, divinylbenzene, hydroxyethyl acrylate, and hydroxypropyl methacrylate.

13. Composition as claimed in claim 3 wherein said polymer is a terpolymer of about 89 to about 97 wt.% acrylonitrile, about 2 to about 8 wt.% acrylamide, and about 1 to about 3 wt.% acrylic acid based on the total weight of the three monomers.

14. Composition as claimed in claim 3 wherein said polymer is a copolymer of about 10 to about 90 wt.% acrylonitrile and about 10 to about 90 wt.% of vinylidene chloride based on the total weight of the two monomers.

15. Composition as claimed in claim 3 wherein said polymer is a copolymer of about 80 to about 99 wt.% acrylonitrile and about 1 to about 20 wt.% acrylamide based on the total weight of both monomers.

16. Composition as claimed in claim 3 wherein said polymer is a copolymer of about 85 to about 99.5 wt.% acrylonitrile and about 0.5 to about 15 wt.% acrylic acid based on the total weight of the two monomers.

17. Composition as claimed in claim 3 wherein said polymer is a copolymer of about 90 to about 99 wt.% acrylonitrile and about 1 to about 10 wt.% methacrylic acid based on the total weight of the two monomers.

18. Composition as claimed in claim 3 wherein said polymer is a copolymer of about 90 to about 99 wt.% acrylonitrile and about 1 to about 10 wt.% divinylbenzene based on the total weight of the two monomers.

19. Composition as claimed in claim 3 wherein said polymer is a copolymer of about 98 to about 99.5 wt.% acrylonitrile and about 0.5 to about 2 wt.% hydroxyethyl acrylate based on the total weight of the two monomers.

20. Composition as claimed in claim 3 wherein said polymer is a copolymer of about 97 to about 99 wt.% of acrylonitrile and about 1 to about 3 wt.% of hydroxypropyl methacrylate based on the total weight of the two monomers.

21. Compositions as claimed in claim 3 wherein said polymer is a copolymer of about 95 to about 99 wt.% acrylonitrile and about 1 to about 5 wt.% of dodecyl methacrylate based on the total weight of the two monomers.

22. Composition as claimed in claim 3 wherein said polymer is a terpolymer of about 90 to about 97 wt.% acrylonitrile, about 2 to about 7 wt.% acrylamide, and about 1 to about 3 wt.% hydroxypropyl methacrylate based on the total weight of the three monomers.

23. Composition as claimed in claim 3 wherein said polymer is a terpolymer of about 91 to about 97.5 wt.% acrylonitrile, about 2 to about 7 wt.% acrylamide and about 0.5 to about 2 wt.% hydroxyethylacrylate based on the total weight of the three monomers.

24. Composition as claimed in claim 15 wherein said copolymer is a copolymer of about 90 to about 99 wt.% acrylonitrile and about 1 to about 10 wt.% acrylamide based on the total weight of the two monomers.

25. Composition as claimed in claim 15 wherein said copolymer is a copolymer of about 94 to about 97 wt.% acrylonitrile and about 3 to 6 wt.% acrylamide based on the total weight of the two monomers.

26. Composition as claimed in claim 16 wherein said copolymer is a copolymer of about 94 to about 99.5 wt.% acrylonitrile and about 0.5 to about 6 wt.% acrylic acid or methacrylic acid based on the weight of the two monomers.

27. Composition as claimed in claim 26 wherein said copolymer is a copolymer of about 96 to about 98 wt.% of acrylonitrile and about 2 to about 4 wt.% of acrylic acid or methacrylic acid based on the weight of the two monomers.

28. In a process for producing a liquid polymer/polyisocyanate composition which is convertible by reaction with a poly(active hydrogen) organic compound to a polyurethane product wherein the polyisocyanate of said composition is normally liquid at the temperature at which said composition is converted to said polyurethane product and said polymer is formed in situ in said polyisocyanate from one or more polymerizable ethylenically unsaturated monomers and is essentially insoluble therein, the improvement utilizing acrylonitrile or major amounts of acrylonitrile and minor amounts of one or more polymerizable ethylenically unsaturated monomer copolymerizable therewith and providing more stable dispersions of small particles of said polymer in said polyisocyanate, comprising, polymerizing acrylonitrile or major amounts of acrylonitrile and minor amounts of one or more polymerizable ethylenically unsaturated monomers copolymerizable therewith in a liquid polyisocyanate material having a free NCO content of at least 10 wt.% and consisting essentially of (1) polymeric forms of a diarylalkylene diisocyanate having the formula

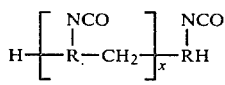

in which R is a trivalent aromatic group and x is a number having an average value of 1.1 to 5, (2) mixtures of a diarylalkylene diisocyanate, a carbodiimide of the formula: OCNR'N=C=NR'NCO, and a diarylalkylene diisocyanate trifunctional trimeric cycloadduct of the formula:

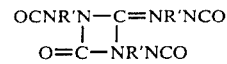

wherein R' is a divalent arylenealkylenearylene group, or (3) mixtures of polyisocyanates (1) and (2) above, in an amount of about 10 to about 40 wt.% of acrylonitrile or acrylonitrile and said monomer(s) based on the total weight of acrylonitrile, said monomer(s) and said polyisocyanate in the presence of about one half to about 6 wt.% of a free radical catalyst on the same weight basis at a temperature ranging from about 25° C. to about 200° C. to form said composition in which said polymer is formed in situ from acrylonitrile and said monomer or monomers and is dispersed in said polyisocyanate, said ethylenically unsaturated monomer(s) in an effective amount improving the affinity of the resulting polymer particles for said polyisocyanate and restricting agglomeration of said polymer particles in said polyisocyanate to provide a dispersion which forms films containing less than 10% seeds, the remaining area being glossy, or 5% seeds, the remaining area being semi-glossy, said percentages being on an area basis.

29. Process as claimed in claim 28 wherein said monomers copolymerizable with acrylonitrile are acrylamide and acrylic acid or methacrylic acid.

30. Process as claimed in claim 29 wherein said polyisocyanate is (1) polymeric forms of a diarylalkylene diisocyanate having the formula:

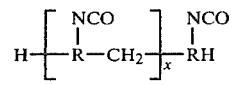

in which R is a trivalent aromatic group and x is a number having an average value of 1.1 to 5, (2) mixtures of a diarylalkylene diisocyanate, a carbodiimide of the formula: OCNR'N=C=NR'NCO, and a diarylalkylene diisocyanate trifunctional trimeric cycloadduct of the formula:

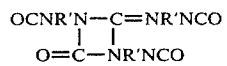

wherein R' is a divalent arylenealkylene group, or (3) mixtures of polyisocyanates (1) and (2) above.

31. Process as claimed in claim 28 wherein said free radical catalyst is an azo bis(alkyronitrile).

32. Process as claimed in claim 28 wherein said free radical catalyst is 2,2'-azo-bis-isobutyronitrile.

33. Process as claimed in claim 28 wherein said free radical catalyst is tert.butyl peroctoate.

34. A method for producing a polyurethane elastomer by reacting a mixture comprising (a) a polymer/polyisocyanate composition as claimed in claim 1 and (b) a poly(active hydrogen) organic compound, in the presence of (c) a catalyst for the reaction of (a) and (b) to produce the polyurethane.

35. A method for producing a polyurethane elastomer by reacting a mixture comprising (a) a polymer/polyisocyanate composition as claimed in claim 3 and (b) a poly(active hydrogen) organic compound, in the presence of (c) a catalyst for the reaction of (a) and (b) to produce the polyurethane.

36. Method as claimed in claim 35 wherein the polymer/polyisocyanate is that claimed in claim 15.

37. Method as claimed in claim 35 wherein the polymer/polyisocyanate is that claimed in claim 16.

38. Method as claimed in claim 35 wherein the polymer/polyisocyanate is that claimed in claim 17.

39. Method as claimed in claim 35 wherein the polymer/polyisocyanate is that claimed in claim 18.

40. A method for producing a polyurethane foam by reacting and foaming a mixture comprising (a) the polymer/polyisocyanate composition claimed in claim 1, (b) a poly (active hydrogen) organic compound, (c) a catalyst for the reaction of (a) and (b) to produce the polyurethane, (d) a blowing agent and (e) a foam stabilizer.

41. A method as claimed in claim 40 wherein the foam is a flexible foam, the reaction and foaming are performed by the one-shot technique, the poly(active hydrogen) organic compound contains an alkylene oxide adduct of a polyhydroxyalkane, and the blowing agent is water.

42. Method as claimed in claim 41 in which said polymer/polyisocyanate composition is that claimed in claim 16.

43. Polyurethane elastomer as claimed in claim 34.

44. Polyurethane elastomer as claimed in claim 35.

45. Polyurethane elastomer as claimed in claim 36.

46. Polyurethane elastomer as claimed in claim 37.

47. Polyurethane foam as claimed in claim 4.

* * * * *

UNITED STATES PATENT AND TRADEMARK OFFICE
CERTIFICATE OF CORRECTION

PATENT NO. : 4,283,500
DATED : August 11, 1981
INVENTOR(S) : George H. Armstrong It is certified that error appears in the above—identified patent and that said Letters Patent is hereby corrected as shown below:

Claim 36, line 2, please delete "15" and insert therefor -- 13 --.

Claim 37, line 2, please delete "16" and insert therefor -- 14 --.

Claim 38, line 2, please delete "17" and insert therefor -- 15 --.

Claim 39, line 2, please delete "18" and insert therefor -- 16 --.

Claim 47, line 1, please delete "4" and insert therefor -- 40 --.

Signed and Sealed this

First Day of December 1981

[SEAL]

Attest:

GERALD J. MOSSINGHOFF

Attesting Officer    Commissioner of Patents and Trademarks